(12) United States Patent
Jørgensen et al.

(10) Patent No.: US 7,103,772 B2
(45) Date of Patent: Sep. 5, 2006

(54) PERVASIVE, USER-CENTRIC NETWORK SECURITY ENABLED BY DYNAMIC DATAGRAM SWITCH AND AN ON-DEMAND AUTHENTICATION AND ENCRYPTION SCHEME THROUGH MOBILE INTELLIGENT DATA CARRIERS

(75) Inventors: Jimi T. Jørgensen, Jyderup (DK); Craig L. Damon, Skibby (DK); Jan Pathuel, Herlev (DK); Christopher L. Arlaud, Helsinge (DK)

(73) Assignee: Giritech A/S, Albertslund (DK)

( * ) Notice: Subject to any disclaimer, the term of this patent is extended or adjusted under 35 U.S.C. 154(b) by 37 days.

(21) Appl. No.: 10/428,895

(22) Filed: May 2, 2003

(65) Prior Publication Data

US 2005/0262343 A1    Nov. 24, 2005

(51) Int. Cl.
*H04L 9/00*    (2006.01)

(52) U.S. Cl. ............................. 713/168; 726/3; 726/11; 726/12

(58) Field of Classification Search ................ 713/168, 713/201; 380/201, 30; 709/223, 201, 224–225, 709/203; 455/442, 410–411; 370/328, 395.21, 370/392; 726/3, 11–12
See application file for complete search history.

(56) References Cited

U.S. PATENT DOCUMENTS 5,363,369 A * 11/1994 Hemmady et al. .......... 370/392
6,332,193 B1 * 12/2001 Glass et al. ................. 713/170
6,405,203 B1 *  6/2002 Collart ......................... 707/10
6,732,278 B1 *  5/2004 Baird et al. ................. 713/201
6,839,353 B1 *  1/2005 DeJager ................. 370/395.21

* cited by examiner

Primary Examiner—Kim Vu
Assistant Examiner—T. B. Truong
(74) Attorney, Agent, or Firm—Qin Shi

(57) ABSTRACT

Methods and systems are provided for improving security, efficiency, access control, administrative monitoring, reliability as well as integrity of data transmission and remote application sharing over a network. Secure, stable network connections and efficient network transactions among multiple users are supported by an improved client-server architecture. A datagram schema is provided, which enables dynamic datagram switching in support of a multitude of applications and network services. Mobile intelligent data carriers are provided, allowing for the implementation of an authentication and encryption scheme. They may be used to target deliver applications to authorized user, thereby controlling the access to not only data but also applications. Biometrics and other suitable authentication methodologies may be employed in delivering the pervasive, user-centric network security solutions disclosed. The methods and systems of this disclosure maybe advantageously implemented in any enterprise network environment to support a wide spectrum of business, research, and administrative operations.

108 Claims, 8 Drawing Sheets

PERVASIVE, USER-CENTRIC NETWORK SECURITY ENABLED BY DYNAMIC DATAGRAM SWITCH AND AN ON-DEMAND AUTHENTICATION AND ENCRYPTION SCHEME THROUGH MOBILE INTELLIGENT DATA CARRIERS

BACKGROUND OF THE DISCLOSURE

1. Field of the Embodiments

The present disclosure relates in general to digital network communications. Specifically, the present disclosure relates to secure data transmission and secure provision of remote application services in an open or closed network setting. More specifically, methods and integrated systems are provided in various embodiments for improving security, efficiency, access control, administrative monitoring, and reliability as well as integrity of data transmission and remote application sharing over a network. The disclosed methods and systems employ a datagram schema that enables dynamic datagram switching in network transactions that supports a multitude of applications and network services. Mobile intelligent data carriers are provided in various embodiments that allow for implementation of an authentication and encryption scheme that is transparent to a user. The pervasive, user-centric network security enabled by the disclosed methods and systems may be advantageously deployed in, among other things, the financial and banking environment, the national security and military information technology (IT) systems, the healthcare management networks, the IT infrastructure for legal and other professional consultation services, and various online commercial transaction systems. The systems and methods according to this disclosure may be implemented in connection with biometric and other suitable authentication means.

2. Description of the Related Art

The digital revolution, accompanied by globalization, is transforming people's life in an unprecedented way. The growth and evolution of the Internet fuels the expansion of the existing businesses while fostering the emergence of new enterprises cross nation lines. In today's global economy, the viability of a business or research institution turns in a large part on its efficiency in processing and managing information. Data transmission and management is thus playing an increasingly vital role in a variety of industries. Not unexpectedly, engineers and business visionaries have been faced with a significant challenge to institute secure network systems that enable stable and efficient data transmission, effective access control, and remote sharing and management of application resources among distributed computers in service to multiple users.

Various network configurations have been in use in institutional IT infrastructures. Ethernet, token ring, and client-server architecture, for example, are widely adopted. Related technologies for data encryption and compression are similarly known and have been utilized to facilitate secure data transmission. However, the existing network systems frequently suffer from such problems as interception of data transactions and loss of network connections, among other things. Often, once a connection is lost, it is difficult to quickly restore it, let alone to accurately reestablish the parameters of the lost connection thereby ensuring the integrity of the reconnection. Inevitably in these situations, data may be lost and data transmission will need to start over. And yet, sometimes, the loss may be permanent if one cannot trace and gather a threshold level of information to allow rescue. This lack of stability greatly compromises the fidelity of data transmission and thus poses a fatal problem for distributive data processing and management. Significant costs are incurred in coping with such failure in an institutional setting. In fact, an entire industry can be disadvantaged by such a problem, as manifested in the difficulties encountered in the recent years by on-line electronic businesses.

The problem of instable—hence unreliable—network communications is compounded by a want of comprehensive, robust, user-friendly, and cost-efficient network security solutions for safeguarding information dissemination and application management in a distributive enterprise IT environment. Consequently, the private businesses and public institutions alike suffer significant financial losses from security breaches and uncoordinated information and application management. A great deal of money is also wasted on inefficient IT security solutions.

Drawbacks of the current network security solutions are manyfold. In the main, four aspects are noteworthy: First, there is lacking an integrated system that can secure an entire network without severely limiting business growth. Organizations are forced to employ a multiplicity of products from different vendors to fulfill different security functions. Each of these products only solves a discreet aspect of the overall network security needs. For example, a firewall does not encrypt data being transmitted across the Internet; an Intrusion Detection System (IDS) cannot validate and ensure that the person who enters an authorized login name and password to open a Virtual Private Network (VPN) connection is in fact the intended user; and, a VPN doesn't help an IT department monitor user rights and access policies. Thus, no existing system or method is capable of singularly protecting every aspect of a network. Resorting to multiple security products from competing vendors, public and private enterprises alike are faced, at the minimum, with the problem of incompatibility. Maintaining a fluctuating number of peripheral security devices and software packages can also be extremely complex and overly expensive. And, on the whole, such patchwork solution is less than effective in protecting institutional IT framework.

Secondly, the existing focus is on securing devices and data. Such system-centric approach fails to safeguard the point of access from individual users who use the devices. This inherent problem with the current approach will become more and more conspicuous as the number of devices and degree of user mobility increases—an inevitable as the world is transitioning into pervasive computing.

To appreciate the inherent flaws in the system-centric systems, one can consider the various scenarios of cyber-crimes. It is understood by an ordinary Internet user today that every single form of cyber-crime involves the attempt of the attacker to disguise its identity, whether masquerading as someone else or covering its trail over the routings. One reason why such attack too often succeeds is because the techniques used to establish and verify the user's identity today are fallible. For example, most passwords are easy to break; they are often too obvious or are stored on a device that can be easily compromised. The existing infrastructure supporting digital certificates and public/private keys is also relatively easy to abuse. Therefore, the existing ways for identifying the users of a network device and securing the device vis-à-vis these users—hence system-centric—presents inherent security liabilities. A high level of security can never be achieved when the identity of those who attempt to access the protected network cannot be effectively pinpointed. A major paradigm shift thus seems warranted for better network security. That is, the focal point needs to shift from protecting the devices and data to protecting the users. A true user-centric scheme for establishing and validating user identities—thereby enabling mobile access and event-based, user-centric security—is desirable.

Third, the existing IT security solutions are too complex for ordinary users. Average users are expected to perform complicated security procedures, which often result in errors and security lapses in the enterprise IT environment. For example, VPNs are not plug'n'play straightforward to install, operate, or maintain. Encrypting emails involves extra work so very few ever bother to do it. Even selecting and remembering a good password is too much trouble for most average users. Relying on people who are not IT experts to perform complicated security procedures simply doesn't work. An ordinary user may find ways to bypass the security procedures or outright ignore them. Further, for many IT departments, maintaining and operating a deluge of software patches may drain the available resources and exceed their capacities. Therefore, an effective yet simple security paradigm is in need.

And finally, like in any other fields, certain inertia exists in the IT security industry. Changes and new methodologies to some extent are resisted. The existing way of doing things prevails and dominates the market of network security solutions, both on the provider and the consumer side. In this regard, the VPN is a useful example. Originally it was designed to provide a secure tunnel between two secure environments. The technology was then modified to meet the needs of remote or mobile users. It now relies on non-technical users to execute complex IT security procedures. Consequently, although the VPN still creates secure tunnels through the Internet, the client end can be easily—and frequently is—compromised. Such adherence to the existing technologies—and the band-aid approach connected thereto—leaves the users with dissatisfactory solutions and at the same time significantly sets back the development of true innovative systems and methods for securing network communications.

For the aforementioned reasons, there is a need for a new network security paradigm that delivers the desired reliability, efficiency, and user-friendliness. The kind of security solution that can sustain the needs of distributive IT framework and support pervasive computing and information processing must address the fallacies of the existing systems. A skilled network engineer or a learned user of business IT networks will be able to appreciate the importance of better IT security solutions. To that end, a brief review of the history of institutional computing and IT networks will be useful.

The first computers were mainframes. These complex monolithic devices required a protected environment to function properly. They could only be operated by skilled technicians who were charged with highly specialized knowledge. Access to them was limited and they offered limited connectivity with other devices. As a result, they were easy to secure.

The advent of the personal computer (PC), the evolution of networking technology and, particularly, the recent explosive growth of the Internet transformed the way people use and relate to computers. The size of the computer devices decreased. These machines became easily moveable. The user-friendly graphical interfaces made it possible for non-technical individuals to operate them. The computers were connected to create computer networks, allowing for fast and easy information and application sharing. The Internet brought the network connectivity to its acme—the true global connectivity that is affordable to the mass. In addition to the desktop and laptop PCs, personal digital assistant (PDAs), Tablet PCs, and mobile phones grew popular with people who need network access while not in their home or office.

The rapid advance of technologies and expansion of business needs as such presented an unprecedented challenge for the IT departments around the world. An ever-increasing amount of data—accessible from a vast number of devices—needs to be protected. And, such protection must be instituted against the backdrop of the broadband "always-on" connections. Also noteworthy is the regulatory initiative in various countries addressing privacy and information ownership concerns over the Internet. Clearly, a network security solution that is technically robust and comprehensive business-wise is needed, especially in view of the next inevitable phase of the IT evolution, one marked by pervasive computing. All analog devices are being and will be replaced by digital counterparts. Televisions, telephones, CDs and DVDs, cameras, video cameras, and computer game platforms alike will—if not already—all support Internet access. As data access becomes possible everywhere and all the time, the need for protecting proprietary corporate data and sensitive private information becomes more pressing and, the level of difficulty in meeting such needs correspondingly elevates.

In sum, reflecting on the evolution of the organizational IT infrastructure and the current deficiencies in secure network communications, one of ordinary skilled will appreciate the need for systems and methods that improve the security, stability, efficiency, and flexibility of network data transmission and, connected thereto, the need for a new network paradigm for secure and reliable enterprise information management and application sharing.

SUMMARY OF THE VARIOUS EMBODIMENTS

It is therefore an object of this disclosure to provide systems and methods for improving the reliability, flexibility, simplicity, and efficiency of secure data transmission and application sharing over a network. Particularly, the methods and systems disclosed herein enable an improved client-server architecture that supports secure, flexible network connections and reliable, efficient network transactions among multiple users. This IT network platform delivers pervasive security—i.e., security on demand with variegated network connecting devices—and it is user-centric—secures the users not the devices the users use to connect to the network. In certain embodiments, the pervasive and user-centric security may be instituted with the presently disclosed systems and methods anytime, anywhere, using any network device.

A datagram schema is provided in certain embodiments, which allows for the implementation of dynamic datagram switching in support of a multitude of applications and network services. In other embodiments, various mobile intelligent data carriers are provided, allowing for the implementation of an authentication and encryption scheme that is transparent to a user. The pervasive, user-centric network security according to this disclosure may be advantageously deployed in any enterprise IT environment around the world where a distributive computer network is used, including, for example, governments, militaries, manufacturers, and in financial service, insurance, consulting, healthcare, and pharmaceutical industries. According to various embodiments, this IT security platform may facilitate a broad array of business operations, including, inter alia, inventories, sales, customer services, marketing and advertisement, teleconferencing, and remote sharing of a variety of applications. The systems and methods of this disclosure may be implemented in connection with biometric and other suitable authentication methodologies in certain embodiments.

The present disclosure thus provides a network security platform that is distinctive compared to the existing patchwork solutions. A holistic approach is taken and a single solution is provided that allows organizations to protect the entire network, even as the network dynamically extends its resources to users anywhere in the world and through any connection device or application interface. The network security platform of this disclosure focuses on securing the user, not the various network devices used by the user. Such user-centric scheme affords unprecedented simplicity and flexibility, which, in turn, lends improved user-friendliness to the network security platform according to this disclosure. The enhanced security is transparent to the user. And yet, the professionals in the IT departments are charged with the complete control over all user access. The user activities may be effectively monitored as needed.

In accordance with this disclosure, there is provided, in one embodiment, a system of secure network connectivity between one or more users and at least one network server. The secure network connectivity is user-centric and supports pervasive security. The term user-centric means that the system secures the one or more users instead of one or more devices employed by the users to connect to the network server. The pervasive security is security on demand, using one or more connecting devices. The system comprises: (A) at least one intelligent data carrier, issued to the one or more user, wherein the intelligent data carrier comprises at least (i) one memory, capable of storing digital information, (ii) one input-output apparatus, capable of inputting and outputting digital information, and (iii) one processor, capable of processing the digital information stored in the memory and connecting to a computer device thereby transmitting the digital information via the input-output apparatus. The intelligent data carrier is capable of establishing the identities of the one or more user through an authentication and encryption scheme; and (B) a dynamic datagram switch for dynamic allocation and swapping of datagrams for a multiplicity of applications in service to the one or more users.

According to one embodiment, the intelligent data carrier is mobile. According to another embodiment, the intelligent data carrier is selected from the group consisting of USB key, Compact Flash, Smart Media, Compact Disk, DVD, PDA, firewire device, token device.

According to yet another embodiment, the authentication and encryption scheme comprises the following sequential steps: a) a request being caused to forward from the intelligent data carrier to the network server that the intelligent data carrier be authenticated; b) the network server presenting to the intelligent data carrier a plurality of authentication methods; c) the intelligent data carrier selecting one authentication method from the plurality through an event; d) the network server sending the intelligent data carrier a demand, based on the selected method, for authentication data from the intelligent data carrier; e) the network server transforming the authentication data received from the intelligent data carrier into one or more data authentication object, each of data authentication objects is a data vector object, capable of being analyzed using one or more classifiers; f) the network server analyzing the data authentication object, according to the one or more classifiers, thereby determining the result of the authentication; and g) the network server sending the result to the intelligent data carrier, indicating a successful or failed authentication attempt.

According to a further embodiment, the event in step c) is a click of a mouse, a touch on a screen, a keystroke, a touch on a screen, an utterance, or any suitable notification means. According to still a further embodiment, the demand in step e) comprises at least one of a pseudo random and true random password. The pseudo random password is generated based on a mathematically pre-calculated list, and a true random password is generated by sampling and processing a source of entropy outside of the system.

According to another embodiment, the randomization is performed with at least one seed from an indeterministic source, which is a source that is not capable of being predicted from the parameters surrounding the network server or the intelligent data carrier. According to yet another embodiment, the randomization is performed with one or more random generators and one or more independent seeds.

According to a further embodiment, the analyzing in step f) comprises one or more analysis rules. In a still further embodiment, the one or more analysis rule comprises classification according to the one or more classifiers of step e).

According to another embodiment, the randomization in data vector objects is performed in connection with the one or more classifiers.

According to yet another embodiment, the classification comprises speaker verification, wherein the data object vector involves two classes, the target speaker and the impostor. Each speaker is characterized by a probability density function. The determining in step f) is a binary decision problem.

According to a further embodiment, the one or more classifiers in step e) comprise a super classifier. More than one data vector objects exist for event level authentication. The determining in step (f) is based on superior or random sum computed from the data vector objects.

According to a still further embodiment, the super classifier is used for physical biometrics, which comprises at least one of voice recognition, fingerprints, handprints, blood vessel patterns, DNA tests, retinal or iris scan, and face recognition.

According to another embodiment, the super classifier is used for performance biometrics, which comprises habits or patterns of individual behaviors.

According to yet another embodiment, the determining of step f) is performed by computing the sum, superiority, or probability from one or more data authentication objects, based on the one or more classifiers of step e).

According to a further embodiment, the authentication and encryption scheme comprises asymmetrical and symmetrical multi-cipher encryption. In a still further embodiment, the encryption uses at least one of output feedback, cipher feedback, cipher block chaining, and cipher forwarding.

According to another embodiment, the authentication and encryption scheme uses Secure Key Exchange (SKE). In yet another embodiment, SKE employs a public key system. In still another embodiment, SKE employs Elliptic Curve Cryptosystem (ECC) private keys. In a further embodiment, the encryption is based on Advanced Encryption Standard (AES) Rijndael.

According to a still further embodiment, the multiplicity of applications is selected from the group consisting of window-based remote terminal server applications, applications on 3270/5250 terminal emulators for mainframe, digital video, audio, and text based communications, and directly embedded applications. In another embodiment, the directly embedded applications are selected from the group consisting of database applications, data analysis tools, Custom Relation Management (CRM) tools, and Enterprise Resource Planning (ERP) packages, and any combination thereof.

According to another embodiment, the dynamic datagram switch comprises a datagram schema and a parser. The datagram schema comprises two or more datagrams, belonging to one or more datagram types. The datagram is capable of carrying information for managing and controlling network connections and network data transmission. Each datagram type comprises a plurality of functions. The parser is capable of parsing the one or more datagram types.

According to yet another embodiment, the datagram schema comprises at least one major datagram type and within the one major datagram type, at least one minor datagram type.

According to still another embodiment, the parser is capable of parsing a matrix of datagram types. In a further embodiment, the matrix comprises a first multiplicity of major datagram types and in each major datagram type of the first multiplicity, a second multiplicity of minor datagram types. In a still further embodiment the first multiplicity is 256 and the second multiplicity is 256.

According to another embodiment, the major datagram type is selected from the group consisting of (i) the server messages and connection control datagram, capable of authenticating and controlling user connections, (ii) the content datagram, capable of managing the transmission of the content data, (iii) the broadcast datagram, capable of managing the real-time point-to-point, point-to-multipoint, and multipoint-to-multipoint data transmission, and (iv) the connection proxy datagram, capable of passing proxy data between the network server and the intelligent data carrier.

In yet another embodiment, the server messages and connection control datagram comprises minor datagram types such as: (i) the authentication request datagram, capable of initiating an authentication request, (ii) the authentication reply datagram, capable of sending a response upon a request of authentication, and (iii) the authentication result datagram, capable of sending the result of an authentication session.

In still another embodiment, the content datagram comprises minor datagram types such as: (i) the normal content datagram, capable of transmitting the content data, (ii) the remote logging datagram, capable of communicating with the network server and establishing a login session, and (iii) the remote data collector datagram, capable of transmitting data from a remote connection.

In a further embodiment, the content datagram further comprises minor datagram types such as: (iv) the content approval request datagram, capable of requesting verification of the content data transmitted, and (v) the content approval reply datagram, capable of responding to a request of verification of the content data transmitted.

In a still further embodiment, the connection proxy datagram comprises minor datagram types such as: (i) proxy data to server, capable of passing proxy data to the network server from the intelligent data carrier, and (ii) proxy data from server, capable of passing the proxy data from the network server to the intelligent data carrier.

According to another embodiment, each datagram in the datagram schema has a generic layout comprising (A) the header fields for (i) the major datagram type, (ii) the minor datagram type, (iii) the datagram length, and (iv) the datagram checksum, and (B) the datagram payload, carrying the content data in transmission. In yet another embodiment, the datagram comprises one or more additional header fields.

According to still another embodiment, the major datagram type is the instant message type and the minor datagram type is selected from the group consisting of the file transmission type, the audio-video transmission type, the instant mail message type, and the remote data collection type.

According to a further another embodiment, each datagram in the datagram schema is carried within a TCP packet. In a still further embodiment, the generic layout of the datagram follows a TCP header.

According to another embodiment, the system of secure network connectivity further comprises one or more radar connector, capable of monitoring and controlling network connections. In yet another embodiment, the radar connector is further capable of detecting the lost connection and initializing contact to the network server thereby reestablishing the connection. According to still another embodiment, in the system of secure network connectivity, the network server and the intelligent data carrier each is connected to one radar connector.

According to a further embodiment, the system of secure network connectivity further comprises one or more injector, capable of connecting one or more existing networks to the network server and transmitting data between the existing network and the intelligent data carrier via the network server. The existing network is wired or wireless, with one or more digital devices. In a still further embodiment, the digital device is at least one of a computer, a Personal Digital Assistant (PDA), a digital mobile phone, a digital audio-video player, and a digital camera. In another embodiment, the one or more injector each is connected to a radar connector.

In accordance with the present disclosure, there is provided, in another embodiment, a client-server communication system, which comprises at least one server and at least one client. Each client is an intelligent data carrier, which comprises at least (i) one memory, capable of storing digital information, (ii) one input-output apparatus, capable of inputting and outputting digital information, and (iii) one processor, capable of processing the digital information stored in the memory and connecting to a computer device thereby transmitting digital information via the input-output apparatus. The intelligent data carrier is capable of establishing the identities of one or more user through an authentication and encryption scheme for secure data transmission between the server and the client.

According to another embodiment, the secure data transmission through the client-server communication system supports user centric and pervasive security. The user-centric security refers to securing one or more users instead of one or more devices employed by the users to connect to the network server. The pervasive security is security on demand, using one or more connecting devices.

According to yet another embodiment, the intelligent data carrier used in the client-server communication system is mobile. In still another embodiment, the intelligent data carrier is selected from the group consisting of USB key, Compact Flash, Smart Media, Compact Disk, DVD, PDA, firewire device, token device.

According to still another embodiment, the server in the client-server communication system further comprises a dynamic datagram switch for dynamic allocation and swapping of datagrams for a multiplicity of applications in service to one or more clients. In a further embodiment, the dynamic datagram switch comprises a datagram schema and a parser. The datagram schema comprises two or more datagrams, belonging to one or more datagram types. The datagram is capable of carrying information for managing and controlling network connections and network data transmission. The parser is capable of parsing a plurality of datagram types.

According to a still further embodiment, the client-server communication system further comprises one or more injector, capable of connecting the server to one or more existing networks and transmitting data between the existing networks and the client via the server. The existing network is wired or wireless, which comprises one or more digital devices. In another embodiment, the digital device is a computer, a Personal Digital Assistant (PDA), a mobile phone, a digital audio-video player, and a digital camera. According to yet another embodiment, in the client-server communication system, each server, client, and injector is further connected to a radar connector, capable of monitoring and controlling network connections. In still another embodiment, the radar connector is further capable of detecting the lost connection and initializing contact to the network server thereby reestablishing the connection.

According to a further embodiment, the server in the client-server communication system further comprises an encrypted virtual file system, capable of secure storage of data in a virtual file system for each client.

In accordance with the present disclosure, there is provided, in yet another embodiment, an intelligent data carrier, which comprises at least (i) one memory, capable of storing digital information, (ii) one input-output apparatus, capable of inputting and outputting digital information, and (iii) one processor, capable of processing the digital information stored in the memory and connecting to a computer device thereby transmitting digital information via the input-output apparatus. The intelligent data carrier is capable of establishing the identities of one or more user through an authentication and encryption scheme for secure data transmission in a network.

According to another embodiment, the secure data transmission using the intelligent data carrier is characterized by user centric and pervasive security. The user-centric security refers to securing one or more users instead of one or more devices employed by the users to connect to the network server. The pervasive security is security on demand, using one or more connecting devices. In yet another embodiment, the intelligent data carrier is mobile. In still another embodiment, the intelligent data carrier is selected from the group consisting of USB key, Compact Flash, Smart Media, Compact Disk, DVD, PDA, firewire device, token device.

In accordance with the present disclosure, there is provided, in still another embodiment, the method for establishing user-centric, pervasive network security. The method comprises issuing to each of the one or more users an intelligent data carrier; and providing a dynamic datagram switch for dynamic allocation and swapping of datagrams for a multiplicity of applications in service to the one or more users. In various embodiments, the method performs authentication, encryption, and randomization in connection to data vector objects, in the same manner as that in the aforementioned system of secure network connectivity. Super classifiers are used, particularly in certain embodiments, for physical biometrics, which comprises at least one of voice recognition, fingerprints, handprints, blood vessel patterns, DNA tests, retinal or iris scan, and face recognition. And, in other embodiment, super classifiers are used for performance biometrics, which comprises habits or patterns of individual behaviors.

According to another embodiment, the dynamic datagram switch used in the method of establishing user-centric, pervasive network security comprises a datagram schema and a parser. The datagram schema comprises two or more datagrams, belonging to one or more datagram types. The datagram is capable of carrying information for managing and controlling network connections and network data transmission. The datagram type comprises a plurality of functions. The parser is capable of parsing the one or more datagram types.

According to yet another embodiment, the datagram schema comprises at least one major datagram type and within the one major datagram type, at least one minor datagram type. According to still another embodiment, the parser is capable of parsing a matrix of a first multiplicity of major datagram types and in each major datagram type of the first multiplicity, a second multiplicity of minor datagram types.

According to a further embodiment, the datagram in the datagram schema has a generic layout, which comprises (A) the header fields for (i) the major datagram type, (ii) the minor datagram type, (iii) the datagram length, and (iv) the datagram checksum, and (B) the datagram payload, carrying the content data in transmission. In a still further embodiment, the datagram comprises one or more additional header fields. According to another embodiment, each datagram in the datagram schema is carried within a TCP packet. In yet another embodiment, the generic layout of the datagram follows a TCP header.

According to yet another embodiment, the method further comprises providing one or more radar connector, capable of monitoring and controlling network connections, wherein the network server and the intelligent data carrier each is connected to one the radar connector. In still another embodiment, the radar connector is further capable of detecting the lost connection and initializing contact to the network server thereby reestablishing the connection.

According to a further embodiment, the method further comprises providing one or more injector, capable of connecting one or more existing networks to the network server and transmitting data between the existing network and the intelligent data carrier via the network server. The existing network is wired or wireless, which comprises one or more digital devices. In still a further embodiment, the digital device is a computer, a Personal Digital Assistant (PDA), a digital mobile phone, a digital audio-video player, and a digital camera. In another embodiment, the one or more injector each is connected to a radar connector.

In accordance with the present disclosure, there is provided, in a further embodiment, a method for target delivering one or more applications to an authorized user. The method comprises: (A) issuing to the user an intelligent data carrier, which has at least one memory, one input-output apparatus, and one processor, which is capable of establishing the identities of the user through an authentication and encryption scheme; and (B) providing a computer device connecting to a network on which a network server sits. The intelligent data carrier is capable of docking to the connecting device and being authenticated by the network server based on the authentication and encryption scheme. The one or more applications are capable of being launched off the intelligent data carrier once the user is successfully authenticated.

According to another embodiment, the one or more application is preloaded on the intelligent data carrier or installed on the network server.

According to yet another embodiment, the computer device is connected to the network via wired or wireless means. In still another embodiment, the computer device is at least one of a desktop or laptop computer, a personal digital assistant (PDA), a digital mobile phone, a digital TV, and any network-enabled digital audio-video device.

According to a further embodiment, the one or more applications are selected from the group consisting of database applications, data analysis tools, Customer Relation Management (CRM) tools, Enterprise Resource Planning (ERP) packages, window-based remote terminal server applications, applications on 3270/5250 terminal emulators for mainframe, digital video, audio, and text based communications, and any combination thereof.

According to a still further embodiment, the intelligent data carrier is mobile. In another embodiment, the intelligent data carrier is selected from the group consisting of USB key, Compact Flash, Smart Media, Compact Disk, DVD, PDA, firewire device, token device.

According to yet another embodiment, the method for target delivering user applications further comprises a dynamic datagram switch for dynamic allocation and swapping of datagrams for a multiplicity of applications in service to one or more authorized users.

In accordance with the present disclosure, there is provided, in a still further embodiment, a system of secure network connectivity between one or more users and at least one network server, wherein the secure network connectivity is user-centric and supports pervasive security. The system comprises at least one intelligent data carrier, issued to the one or more user. The intelligent data carrier comprises at least one memory, one IP apparatus, and one processor. It is capable of establishing the identities of the one or more user through an authentication and encryption scheme and supporting a multiplicity of applications in service to the one or more users. The authentication and encryption scheme comprises the following sequential steps: (a) a request being caused to forward from the intelligent data carrier to the network server that the intelligent data carrier be authenticated, (b) the network server presenting to the intelligent data carrier a plurality of authentication methods, (c) the intelligent data carrier selecting one authentication method from the plurality through an event, (d) the network server sending the intelligent data carrier a demand, based on the selected method, for authentication data from the intelligent data carrier, (e) the network server transforming the authentication data received from the intelligent data carrier into one or more data authentication object, wherein each data authentication object is a data vector object, capable of being analyzed using one or more classifiers, (f) the network server analyzing the data authentication object, according to the one or more classifiers, thereby determining the result of the authentication, and (g) the network server sending the result to the intelligent data carrier, indicating a successful or failed authentication attempt.

In accordance with the present disclosure, there is provided, in another embodiment, a method for establishing user-centric, pervasive network security. The method comprises issuing to each of the one or more users an intelligent data carrier. The intelligent data carrier comprises at least one memory, one IP apparatus, and one processor. It is capable of establishing the identities of the one or more user through an authentication and encryption scheme and supporting a multiplicity of applications in service to the one or more user. The authentication and encryption scheme comprises a series of aforementioned steps.

In accordance with the present disclosure, there is provided, in yet another embodiment, a client-server communication system. The communication system comprises at least one server and at least one client. Each client is an intelligent data carrier that comprises at least one memory, one IO apparatus, and one processor. The intelligent data carrier is capable of establishing the identities of the one or more user through an authentication and encryption scheme and supporting a multiplicity of applications in service to the one or more user. The authentication and encryption scheme comprises a series of aforementioned steps.

According to certain embodiments, the dynamic allocation and swapping in the dynamic datagram switch employed in the secure network system and method is performed in real time. According to other embodiments, the dynamic allocation and swapping comprises the use of memory pointers of two or more datagrams.

DETAIL DESCRIPTION OF THE VARIOUS EMBODIMENTS

Brief Discussions Of Relevant Terms

Figure 1:
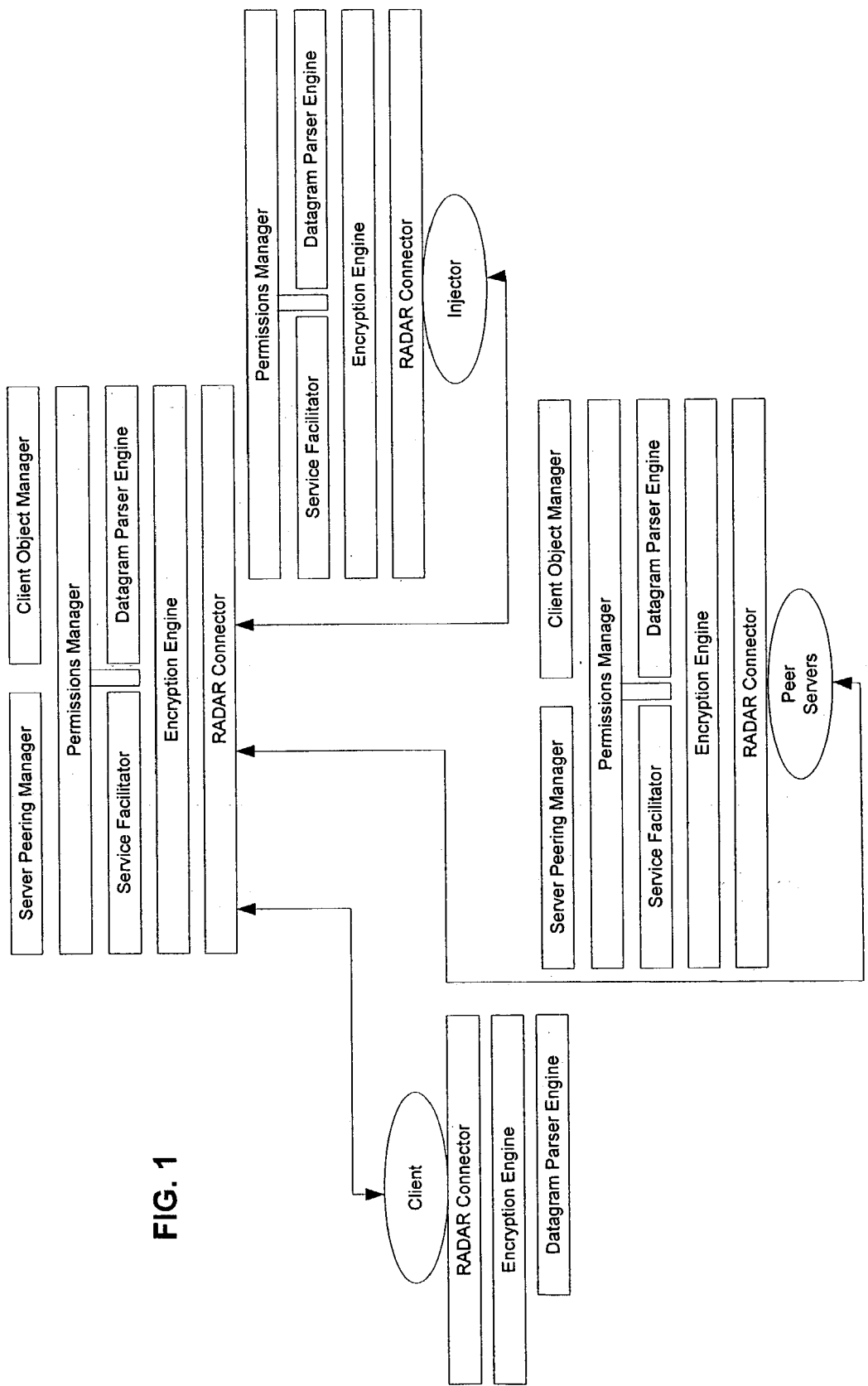
FIG. 1 depicts the interactions between a client, a server, and an injector according to one embodiment of this disclosure.

The following terms, network, client, server, data, data vector object (also referred to as data object vector, object vector), classifier, decision-making, deterministic analysis, object based deterministic analysis (also referred to as object analysis), random number, random number generator, seed, randomization, probability, probability density function, authentication, private key, public key, Elliptic Curve Cryptography (ECC), ECC signature, parser, packet, header, TCP, UDP, firewall, Universal Serial Bus (USB), Apple Serial Bus (ASB), Serial Port, Parallel Port, token, firewire, as well as other relevant terms throughout the present disclosure, are to be understood consistently with their typical meanings established in the relevant art, i.e. the art of mathematics, computer sciences, information technology (IT), physics, statistics, artificial intelligence, digital networks, network communications, Internet technologies, cryptography, encryption and decryption, compression and decompression, classification theories, prediction modeling, decision making, voice recognition, and biometrics.

The following terms, Secure Key Exchange (SKE), Advance Encryption Standard (AES), Public Key Infrastructure (PKI), Encrypted Virtual File Systems (EVFS), Virtual Private Network (VPN), Intrusion Detection System (IDS), Demilitarized Zone (DMZ), Personal Digital Assistant (PDA), USB key, USB token, USB dongle, Parallel Port dongle, Serial Port dongle, firewire device, token device, Smart Card, Smart Media, Compact Flash, Smart Digital Media, DVD, Compact Disk, Multiprotocol Label Switching Standard (MPLS), Lightweight Directory Access Protocol (LDAP), Electronic Data Exchange (EDI), Internet Relay Chat (IRC), Cyclic Redundancy Checksum (CRC), Terminal Identifier (TID), as well as other relevant terms throughout the present disclosure, are to be understood consistently with their typical meanings established in the IT industries, electronic or online commerce, and particularly the network security and any related fields.

A network, as used herein, refers to any group of networking enabled devices interconnected via fiber optic cables or any other medium that is suitable for transmitting digital and/or non-digital information over a distance. A network may be an open network, such as the Internet, or a closed network, such as an enterprise intranet system. The network-enabled device, also referred to as network-connecting device, connecting device, or device, may be a, computer, a digital mobile phone, a PDA, a digital camera, a digital audio-video communicator, or any other devices that may be connected to a network via wire or wireless means. The network-connecting device may be a client or a server as referred to in this disclosure. In one embodiment, the connecting device may also refer to a host computer for a mobile client such as an intelligent data carrier. See the discussion infra on the client as an intelligent data carrier. In certain embodiments, a network may include one or more such clients and one or more such servers. In other embodiments, a network also includes one or more injectors, discussed infra in the detailed description of this disclosure.

As used herein, a Virtual Private Network (VPN) applies security procedures and tunneling to achieve privacy in network transactions while sharing public network infrastructure such as the Internet. Tunneling refers to the transmission of the protected data—such as those proprietary to a business or private to an individual—through a public network. The routing nodes in the public network are unaware that the transmission is part of a private network. Tunneling is typically accomplished by encapsulating the private network data and protocol information within the public network transmission units so that the private network protocol information appears to the public network as data. Tunneling enables using the Internet to transmit data on behalf of a private network. Numerous tunneling protocols have been developed, among which some examples are the Point-to-Point Tunneling Protocol (PPTP), developed by Microsoft and several other companies; generic routing encapsulation (GRE), developed by Cisco Systems; and the Layer Two Tunneling Protocol (L2TP). Tunneling, and the use of a VPN, does not substitute for encryption in ensuring secure data transmission. Encryption may be used in connection to and within the VPN.

Biometrics, as used in the present disclosure, refers to the individual characteristics—physical or behavioral—that are used to establish user identities in order to authenticate a user and properly authorize or deny access to a protected institution network or a protected source of information. Physical biometrics comprises voice recognition (i.e., speaker verification), fingerprints, handprints, blood vessel patterns, DNA tests, retinal or iris scan, and face recognition, among other things. Performance biometrics comprises habits or patterns of individual behaviors.

Data, as used herein, refers to any information capable of being transmitted over a network. Data is used interchangeably in various embodiments with the term digital information or information. The content data refers to any data that is designated for transmission by a user over a network. For example, in a financial institution or a bank, the customer account information constitutes one type of content data that may be transmitted among one or more clients and servers used or operated by various authorized account managers and system administrators. The account payment information would be one type of content data in the context of EDI transactions. Another example of a different kind of content data is the inventory information on raw materials and finished products in a manufacturing facility; this data is often transmitted among clients and servers throughout such a facility for access by production engineers and business planning personnel. The transaction data—also referred to as the connection data—means, in the present disclosure, any information that depicts the state of the network connection between a client and a server and the data transmission between them. It comprises, e.g., the information on user authorization state and method of authentication, among other things.

Data Compression and encryption, as referred to in this disclosure, may be implemented according to the typical industry practice. A variety of specifications and algorithms for compression/decompression and encryption/decryption are well known in the art and many related products are publicly or commercially available; they may be utilized in the methods and systems according to the various embodiments of this disclosure.

A user interface, as used herein, refers to any kind of computer applications or programs that enables interactions with a user. A user interface may be a graphical user interface (GUI), such as a browser. Examples of such a browser include Microsoft Internet Explorer™ and Netscape Navigator™. A user interface also may be a simple command line interface in alternative embodiments. A user interface according to this disclosure may also include plug-in tools that extend the existing applications and support interaction with standard desktop applications such as Microsoft Office, ERP systems etc. Further, a user interface in certain embodiments may also refer to any point of information entry, such as, inter alia, a keypad, a PDA, a microphone, or any type of biometric input unit.

A radar connector, as used herein, refers to a module that is capable of monitoring and controlling the network connections. It may be connected to a client, a server, or an injector, according to the various embodiments of this disclosure. The radar connector in certain embodiments is further capable of detecting the lost connection and initializing contact to the server thereby reestablishing the connection. On the client side, it first looks to connect to a port; thereafter, it continuously monitors the network connections and when a loss of connection is detected, it attempts to reestablish the connection by calling the server. On the server side, the radar connector may remain active at all times, monitoring the state of connections between various clients and the network server.

Pervasive computing, as used in this disclosure, refers to the increased and widespread use of network computers or other digital devices in people's business and personal lives. The rapid growth of digital and web-enabled electronics (e.g., digital mobile phone, digital TVs, PDAs, etc.) and the omnipresence of the broadband Internet connections manifest the era of pervasive computing.

Pervasive security, as used in the various embodiments, refers to a network security platform that delivers security on demand, using one or more network connecting devices. Connected to the pervasive security, the user centric security according to certain embodiments of this disclosure refers to that the system secures the one or more users instead of one or more devices employed by the users to connect to the network server. The pervasive and user-centric security may be instituted in one embodiment using the systems and methods of this disclosure anywhere, anytime, using any network device.

Datagram is defined as "a self-contained, independent entity of data carrying sufficient information to be routed from the source to the destination computer without reliance on earlier exchanges between this source and destination computer and the transporting network." See, Encyclopedia of Technology Terms, Whatis.Com, QUE, November 2001. Datagram and packet can be used interchangeably. Id.

The term "intelligent data carrier" is used interchangeably with the term "client" in various embodiments of this disclosure. An intelligent data carrier comprises at least (i) one memory, capable of storing digital information, (ii) one input-output apparatus, capable of inputting and outputting digital information, and (iii) one processor, capable of processing the digital information stored in the memory and connecting to a computer device thereby transmitting the digital information via the input-output apparatus. An intelligent data carrier is capable of establishing the identity of a user through an authentication and encryption scheme, according to certain embodiments of this disclosure. In one embodiment, the intelligent data carrier is mobile. The intelligent data carrier may be a USB key, a firewire device, Smart Card, Compact Disk, DVD, Smart Media, Compact Flash, PDA, Smart Digital Media, or a token device. A token device may be a software dongle such as a Serial Port dongle or a Parallel Port dongle, any onetime password generation device, or system access device. Other digital media reader may be implemented as intelligent data carriers according to this disclosure. They are capable of connecting to a variety of host devices through various ports or drives and in different manner. The intelligent data carrier bears all the data and faculties for establishing secure network connections on behalf of the user and launching applications on-demand, once the user is properly authenticated by the server. See infra the detailed discussion on a client as an intelligent data carrier.

A Client-Server-Injector Network Communication System

A client-server communication system is provided in one embodiment of this disclosure that includes one or more clients and one or more servers. Each client is an intelligent data carrier capable of supporting an authentication and encryption scheme for secure connections to a network server. See infra the discussion on a client as an intelligent data carrier. The system enables user centric security, as it authenticates and protects each user directly through an intelligent data carrier. No matter what kind of connecting devices or local host computers are used, a user may dock the intelligent data carrier to the host and launch an authentication session to connect to the target server. Thus, the focus point of access safeguard is not at the connecting device or local host machine but, rather, it is directly on the individual user who is issued an intelligent data carrier. The intelligent data carrier may be mobile; such mobility enhances the pervasiveness in the security solution afforded by the system. It is security on demand, using any connecting device or local host machine.

In another embodiment, an injector is included in the client-server communication system. The client-server-injector system enables convenient integration with existing network infrastructures and facilitates the overall security of data transmission and application sharing. See infra the detailed discussion on the injector connecting with the server and client. One or more clients, one or more servers, and one or more injectors may be instituted in such a network communication system. Each injector links to and communicates with one or more servers. Each server connects to and serves one or more clients. The multiple servers in the system may communicate with each other in managing data flows in the entire network.

FIG. 1 outlines the connections among an injector, a client, and a pair of peer servers. Each server, client, and injector has a radar connector, interfacing with the network. The radar connector constantly monitors the state of network connections. When a loss of connection is detected, the radar connector on the client side makes one or more attempts to reestablish the connection by calling the server. Since the client has recorded—and hence remembers—the parameters of the connection state for the most recent connection(s), the lost connection may be quickly restored with the desired accuracy. Consequently, the integrity of data transmission may be protected and the rate of failure may be reduced.

In addition to the radar connector, certain other modules and processes are common among the client, injector, and two peer servers depicted in FIG. 1. The permissions manager assigns and manages user permissions. The service facilitator ensures that specific applications or services are provided to the user as requested. A datagram parser engine is included in each client, server, and injector, as shown in FIG. 1. The parser engine constitutes the dynamic datagram switch of the system. See also, FIGS. 6, 7, and 8, a dynamic datagram switch and/or a frame parser is included in the client, server, and injector. The datagram switch operates in conjunction with the radar connector on both the client side and the server side to process multiple instances of datagram transmissions. The detailed discussion on the dynamic datagram switch is set forth below. The encryption engine processes encryption and decryption of the data transactions over the network. In the client, server, and injector system, the encryption engine is one level behind the radar connector that interfaces with the network. The parsing engine and the service facilitator implemented in both the servers and the injector enable the overall system to support a multitude of network services and applications as well as transmission of various types of data. Further details on these and other modules and processes are discussed in the separate sections below for the client, server, and injector.

Client as an Intelligent Data Carrier

A client is any computer or digital device that is capable of connecting to a server computer or digital device through a network, wired or wireless. A client may also refer to computer software that calls and connects to a server. A client may take the form of an intelligent data carrier according to this disclosure. A client or intelligent data carrier may be formed by executing a software, firmware, or flash memory on a device that provides or connects to a user interface. The user interface allows a user to monitor the network transactions and control the data transmission once the user connects to a network server through the intelligent data carrier. For example, the user interface provides a login form for the user to login the network, which may require entries in a textual or object format. The user interface also allows a user to issue instructions for controlling the network transaction and data transmission.

An intelligent data carrier may be mobile according to one embodiment of this disclosure. In various embodiments, an intelligent data carrier may be a USB key, Compact Flash, Smart Media, Compact Disk, DVD, PDA, firewire device, token device such as Serial Port dongle or Parallel Port dongle, or any other alternative digital device or medium reader. Three main components may be included in an intelligent data carrier: a memory that is capable of storing digital information, an input-output apparatus that is capable of inputting and outputting digital information, and a processor that is capable of processing the digital information stored in the memory and connecting to a computer device—e.g., a network server—thereby transmitting the digital information via the input-output apparatus. The memory or the digital data storage of the intelligent data carrier may be any form of computer readable media, including, for example, CDs, floppy disks, DVDs, Erasable Programmable Read-Only Memory (EPROM), flash memories (Compact Flash, Smart Media, USB key), among other things. The input-output apparatus of the intelligent data carrier is capable of connecting to a host computer device via any kind of IO connection or port, including, for example, mouse ports, keyboard ports, serial ports (USB ports or ASB ports), parallel ports, infrared ports, and firewire connections (IEEE 1394), among other things. The IO connection may be wired or wireless in various embodiments. For example, in one embodiment, short-range wireless connection may be established between the intelligent data carrier and a host device pursuant to Bluetooth specification. See, www.bluetooth.org. The processor of the intelligent data carrier comprises an Application-Specific Integrated Circuit (ASIC) in one embodiment. The processor supports and controls the execution of the preloaded applications on the intelligent data carrier as well as the applications installed on the host computer device or those made available from the remote server. See infra for detailed discussions on application delivery.

The intelligent data carrier according to this disclosure is capable of establishing the identities of a user through an authentication and encryption scheme. The intelligent data carrier locates the server and presents itself to the server by initiating the authentication process. See infra the discussions on authentication and encryption. In the secure network system of this disclosure, each user is issued an intelligent data carrier that allows the user to connect to the network server and access the data and applications thereon. A user may use the intelligent data carrier to connect, disconnect, and reconnect to the server at will and as needed. The connection may be made from any network host device and at any time in one embodiment. The data access is private and secure with regard to each user. See infra the discussion on Encrypted Virtual File System. The intelligent data carrier of this disclosure thus affords great mobility and enhanced, user-centric security to network client-server communication systems.

Applications may be delivered to an intended user through an intelligent data carrier in a secure, controlled manner. In one embodiment, certain licensed applications may be preloaded to the intelligent data carrier that is issued to an authorized user, one who is registered with the server. The user may run the application off the intelligent data carrier upon proper authentication by the server, irrespective of what local host the intelligent data carrier is docked to. That is, for example, the user may insert a USB key to a computer—which is connected to the Internet—at one location and launch the application off the USB key once successfully connected to the server-also sitting on the Internet. The user may close the application and save the file onto the server or the USB key. The files are stored in an Encrypted Virtual File System (EVFS) connected to the network server. See infra the discussions on EVFS. When at another location, the user may launch the application—upon proper authentication by the server—off the USB key using a different computer host and continue working on the same file. Such secure, mobile, and user-centric connectivity between the intelligent data carrier and the network server thus provides a paradigm for managing and controlling not only data access but also application delivery.

In one embodiment, the intelligent data carrier (IDC) delivers standalone applications or operating systems. The user is issued IDC with applications and/or an operating system on the IDC that is read only and copy protected. The user may use the IDC to boot a host system that does not have an operating system or storage device installed thereon and to access server-based applications and preloaded applications on the IDC.

In another embodiment, the IDC is used to deliver applications and media content. The user is provided with an IDC containing the application that is copy protected and read only as well as a unique serial number to permit the initial installation of the application. When the install is completed, the IDC requests the system name, MAC number, processor serial number, or any other static system based information, so as to create an anti-copying code that is then stored on the IDC in the form of an encrypted code hidden from the user. This code ensures that the application is only installed on the original host device.

In yet another embodiment, the IDC is used for media specific distribution.

Each user is issued an IDC that works with one or more specific decoders authorizing access to specific digital media sources, such as DVD, CD, or MP3 data files. Such access and usage may be tracked by the server through the IDC.

The application delivery paradigm according to this disclosure may be especially useful for large software applications and valuable proprietary IT tools, such as specialized database applications, data analysis tools, and various Customer Relation Management (CRM) and Enterprise Resource Planning (ERP) packages, among other things. The controlled delivery directed to the individual user, coupled with the rigorous authentication and encryption safeguard as well as the centralized, yet user-friendly management of data and files makes this paradigm a practical rivalry to the existing software licensing schemes—e.g., enterprise licenses and floating licenses—for computer software applications.

Figure 5:
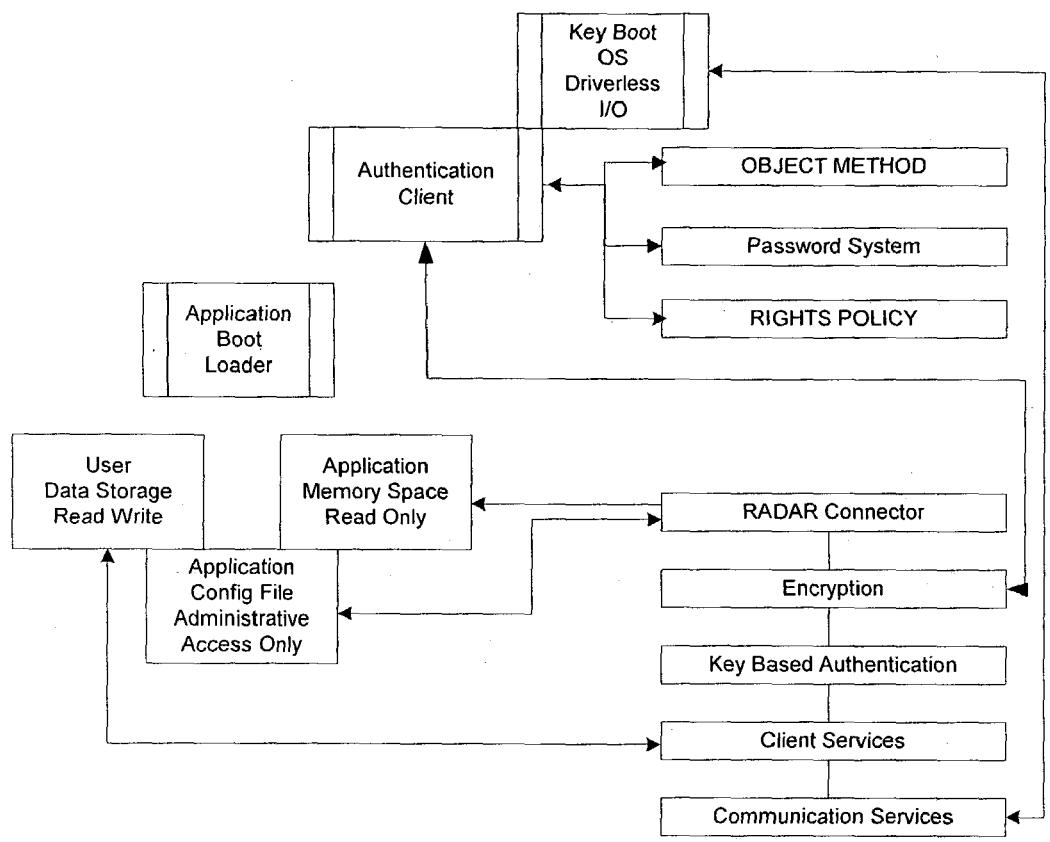
FIG. 5 illustrates an intelligent data carrier, the various modules and processes implemented therein according to another embodiment of this disclosure.

Referring to FIG. 5, an intelligent data carrier implements a number of modules and processes according to one embodiment of this disclosure. For example, an Application Boot Loader allows System Integrators (SIs) and Original Equipment Manufacturers (OEMs) to create custom boot calls to applications that are stored on the intelligent data carrier or applications installed on the host computer. The Boot Loader may call a config file, a SYS file, or an executable file, among other things, to boot the application. The memory of the intelligent data carrier may be partitioned—by the SIs or OEMs—into user data storage, application data storage, and administrative config partition. The user data storage is read-and-write enabled. The application data storage is read-only. And the administrative config partition is hidden. This information is stored on the intelligent data carrier in such a way that it is not in the user's view nor directly accessible by the user. Additional modules are also included, including an On Device Authentication Client module for user authentication, a radar connector for monitoring and control of network connections, and an Encryption module, among other things.

Figure 6:
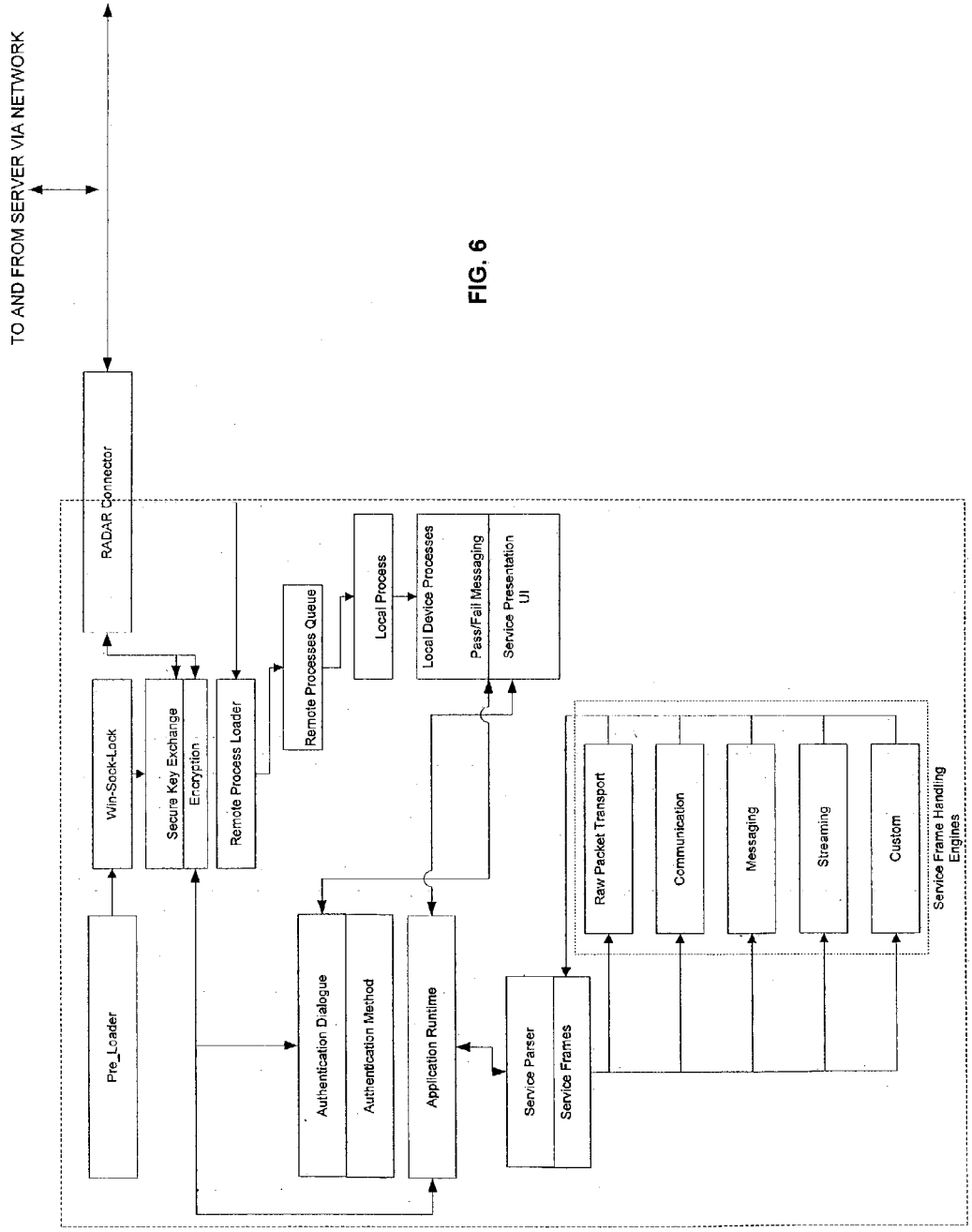
FIG. 6 depicts a client according to another embodiment of this disclosure, including the various components, modules, and processes involved therein.

FIG. 6 provides another illustration of a client according to one embodiment of this disclosure. Various modules and components are also depicted, as are the processes involved. For example, depending on the connection with the server, the client supports different type of communications, including, for example, messaging, streaming, and other custom communications. A datagram parser (service parser) is employed, corresponding to that of the datagram switch in the network server according to one embodiment. See infra the discussion on the server with a dynamic datagram switch. SKE and encryption is implemented in the client. See infra the discussion on authentication and encryption. Randomization is utilized in connection to the authentication and encryption scheme. See infra the discussion on randomization in the creation and analysis of data objects. Additionally, a radar connector is included as part of the client, linking the client to the server. The radar connector monitors the connections between the client and the server. The connection may be through a public network such as the Internet. It can also be established within a private, enterprise network, especially one that involves distributive computing.

Server with a Dynamic Datagram Switch

A server can be any computer or digital device that sits on an open—e.g., the Internet—or closed—e.g., an institutional environment—network that is capable of connecting to a client, authenticating the client, and providing data and application access to the client. The network may be wired, or in part or in whole wireless. The server defines the permissions or rights of the various clients or users in the system. The permissions may be compiled and issued based on the authenticated user identities—e.g., according to biometrics measurements—and the physical location—e.g., local host names, or the time of day, or any other detectable parameters. Once the client is successfully authenticated, the server accepts the connection from the client and allows access to the data that is owned by the user or that the user is authorized to access. The data files are in an EVFS that provides secure, private access to each user. See infra the discussion on EVFS. In other embodiments, the server may deliver applications to the authorized user once the connection is established, as discussed supra.

Figure 7:
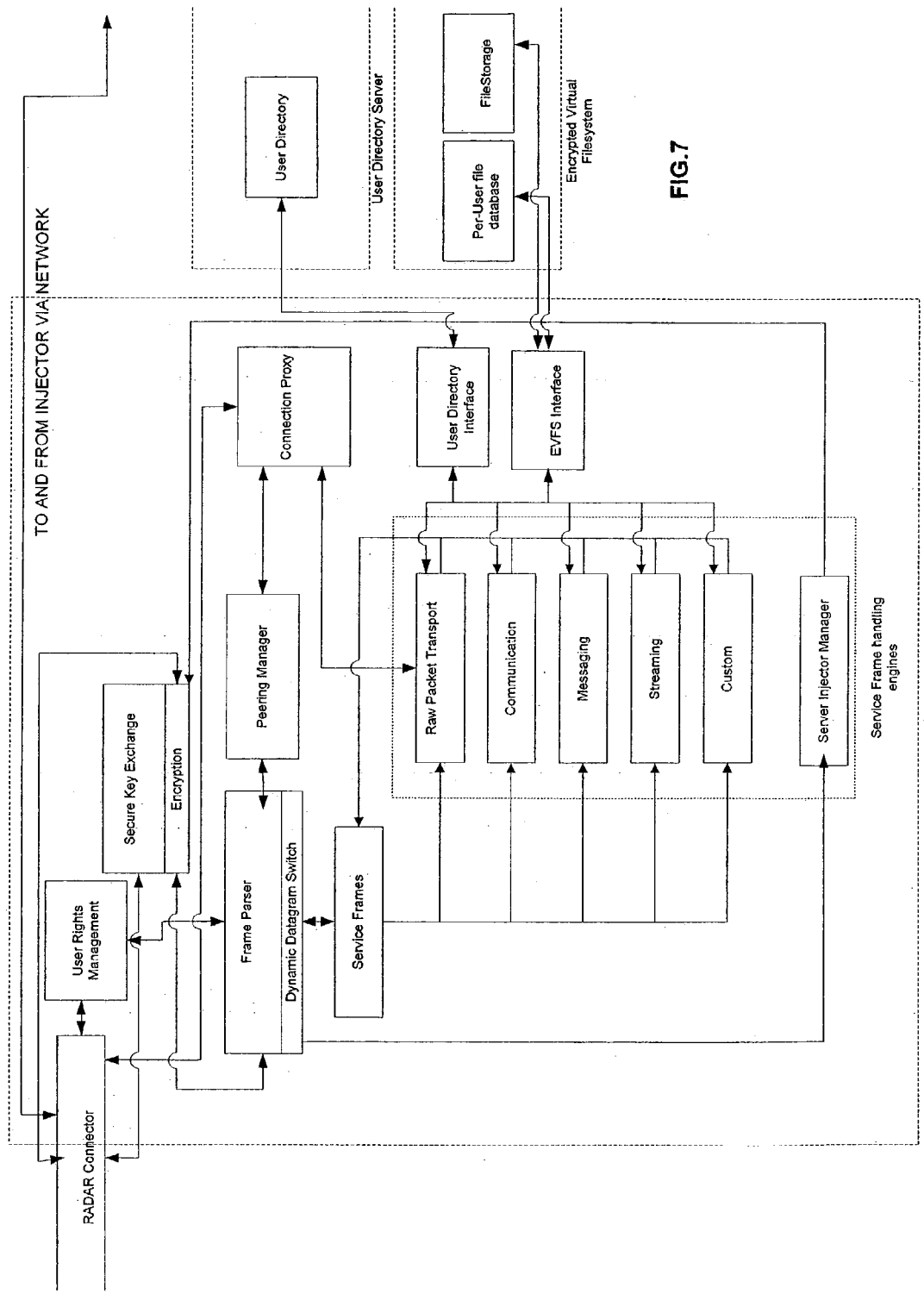
FIG. 7 depicts a server according to another embodiment of this disclosure, including the various components, modules, and processes involved therein.

As shown in FIG. 7, a server according to one embodiment of this disclosure includes a set of modules and components, some of which are analogous to that included in the client, shown in FIG. 6. For example, SKE and encryption are implemented in the server. Randomization is also utilized in connection with the authentication and encryption scheme. As discussed supra, an EVFS is linked to the server, providing each client a virtual private file system for data access and storage. The EVFS links to the server via an EVFS interface. See infra for detailed discussions. Further, a radar connector is included as part of the server, interfacing with the radar connector at the client side. The network connection between the client and server with a radar connector on each side enables effective monitoring and control of the network connection. The radar connector may also detect lost connections and reestablish the connection when needed, according to another embodiment of this disclosure.

In certain embodiments, the data transmission between the client and the server is effectuated by a dynamic datagram switch based on a datagram schema. See infra Example 1. All the data—whether he content data or transaction data—destined for transport through the server is formatted into a datagram. Each datagram is carried within a TCP packet according to one embodiment. In alternative embodiments, other network protocols such as UDP, HTTP, and HTTPS may be used. Multiple datagram types are defined in the datagram schema according to one embodiment of this disclosure. A major datagram type may have a plurality of minor or sub types. A minor datagram type may further comprise lower level datagram subtypes in alternative embodiments. A set of methods and functions may be defined for each datagram type or subtype. Each datagram type or subtype is capable of supporting one or more specific applications and carrying one or more specific kinds of data. The various types may require different and specific privileges and/or permissions. Datagrams are processed in the server by the dynamic datagram switch. The dynamic datagram switch is capable of creating, allocating, and processing datagrams in real time. Datagram allocation and de-allocation are performed dynamically. In one embodiment, the same memory space is used when one datagram is de-allocated while another is allocated. Memory pointers are used for two or more datagrams. When one datagram is in service, its pointer points to the allocated memory. The use of memory pointer provides a high level of efficiency and speed in deploying multitudes of network applications and supporting network transmission of manifold content data, in service to one or more users. The switch of datagrams may be implemented, in certain embodiments, within a network connection through one port; and in alternative embodiments, the switch of datagrams maybe implemented in connection with multiple ports.

Figure 3:
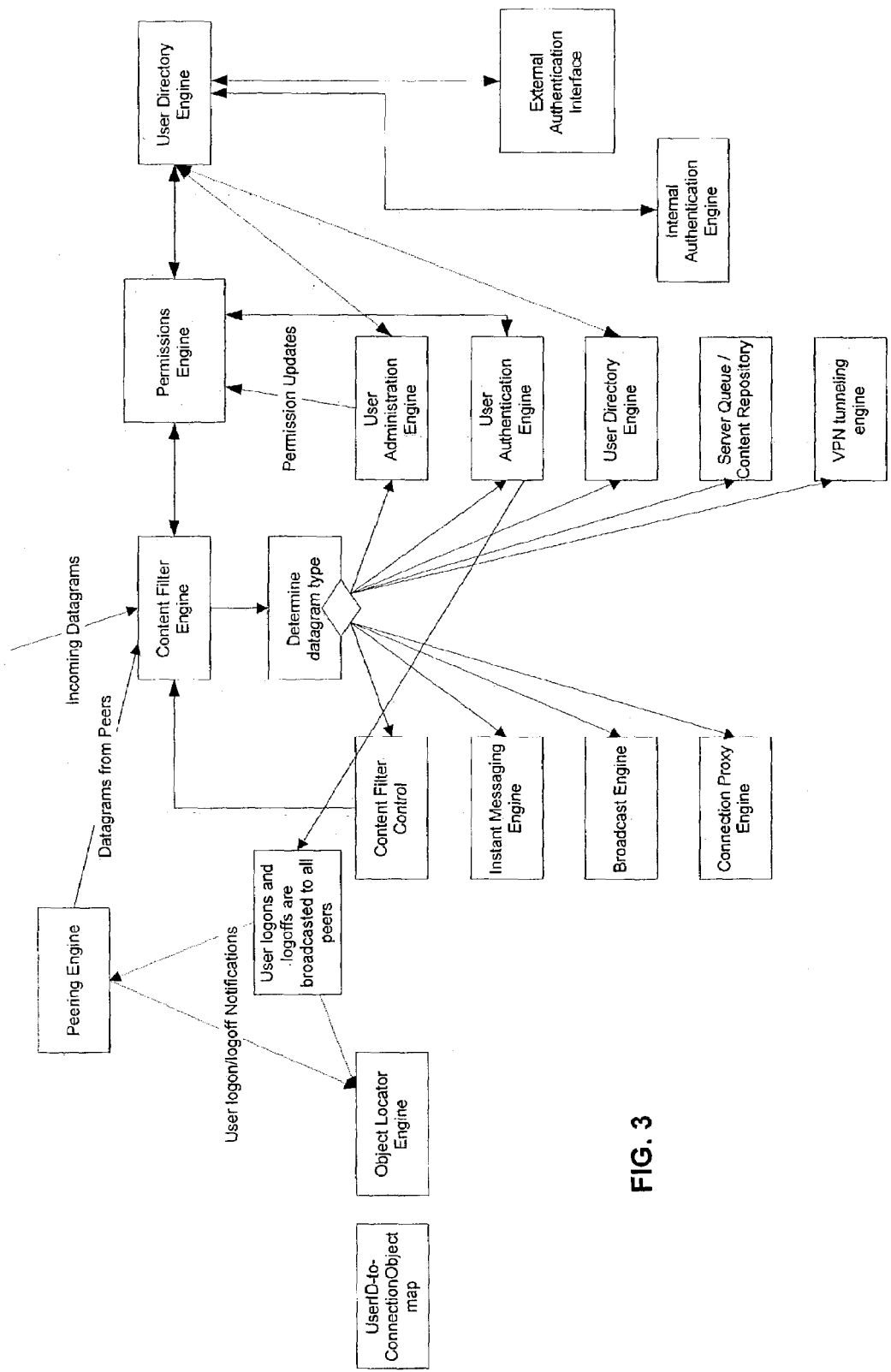
FIG. 3 depicts a datagram parser according to another embodiment of this disclosure, including the various components, modules, and processes involved therein.

The dynamic datagram switch has a datagram parser engine with a parser, which filters the datagrams based on their major and minor types. For example, data are first read from the socket and are appended to the in-queue for that socket. The parser engine then checks to see whether that socket has a complete datagram in the queue. If not, it goes back to sleep and waits for the next packet to arrive at the socket. If yes, it removes the completed datagram from the socket's in-queue and sends it to a decryption and parsing unit to be decrypted and parsed. The parser engine then asks whether the datagram passes decryption and validation. If no, it checks to see whether the datagram show any signs of alternation or injection. If no, the datagram is discarded. If yes, the datagram is discarded and the user who sends the datagram is disconnected. If the datagram is successfully decrypted and validated, the parser engine then tries to determine the intended recipient of the datagram. If it is intended for another connected server, the datagram is then forwarded to the peer parser engine on that connected server. If it is targeted for the local server, the datagram is then passed on to the local parser. If parser then checks whether the sender has the permission to send that particular type of datagram. This is performed using the object classifier in one embodiment. See infra Example 2 and the discussion on authentication and encryption. If no, the datagram is discarded and a log file is created. If yes, the parser further checks to see whether the sender has permissions to send the datagram and whether the recipient has the permission to receive the datagram. If no, and if the negative permission is permanent, then the datagram is discarded and a log file is created. If no, but if the negative permission is temporary, then the datagram may be stored for later retrieval and processing. If the sender has permissions to send the datagram and the recipient has the permission to receive the datagram, the parser then proceeds to determine the datagram type. FIG. 3 shows the relevant processes and steps in a parser according to one embodiment. Each datagram type has a corresponding processing engineer, such as instant messaging engine, broadcast engine, connection proxy engine, etc. Peering engine refers to the peer parser engine residing at another connected server. User logons and logoffs are broadcasted to all peers. User access to each peer servers may be coordinated and managed as desired. For example, an existing connection the user has to a server may be terminated when the user is successfully authenticated by and connected to a peer server that grants higher level of access privilege. The permission engine manages and records the permissions for all the users. Other modules or processes may be included in other embodiments that provide various functionalities as needed, including, for example, the VPN tunneling engine.

Figure 4:
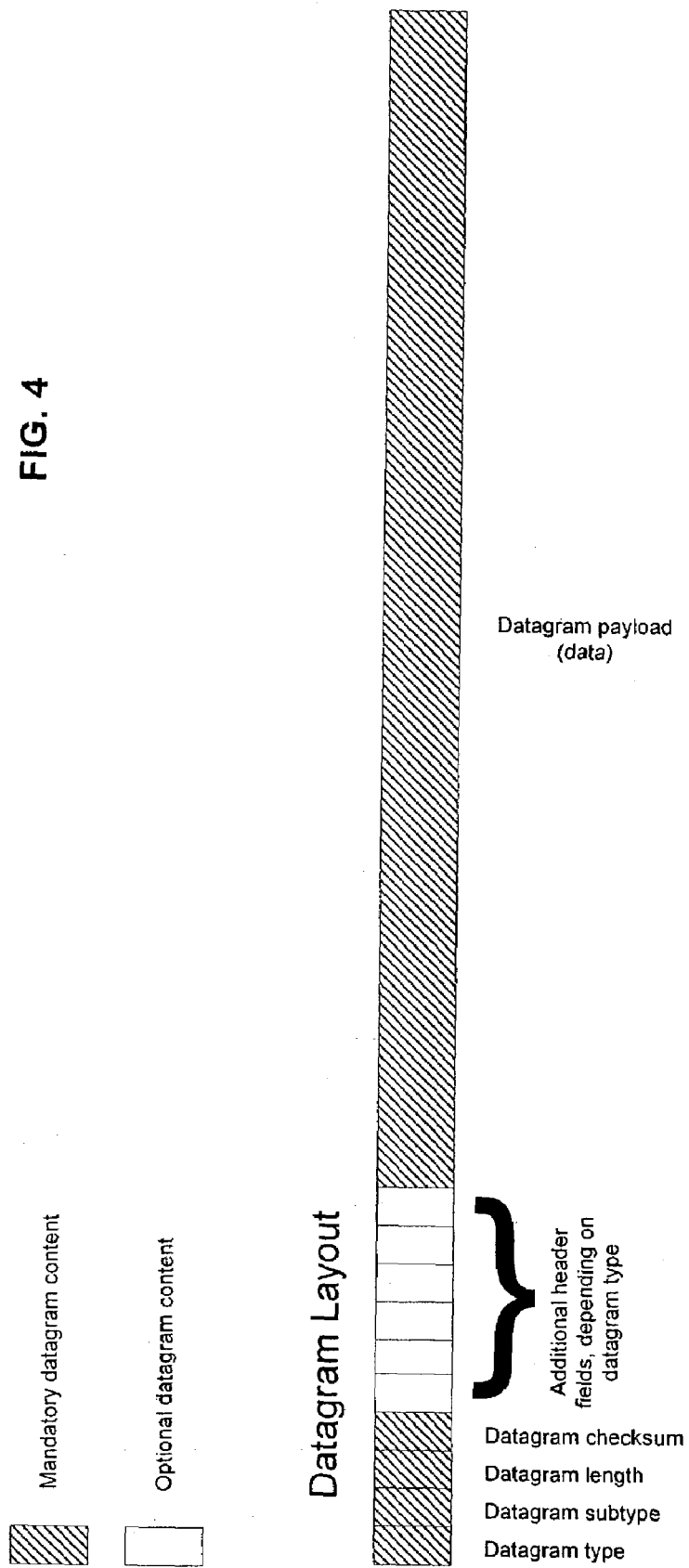
FIG. 4 is a generic layout of a datagram according to another embodiment of this disclosure.

In one embodiment, the server may dynamically process a matrix of datagram types. The matrix comprises a first predetermined number (e.g., 256) of major datagram types—each of which having a second predetermined number (e.g., 256) minor datagram types. In alternative embodiments, the parser is capable of parsing a matrix of datagram types that has more than two dimensionalities or levels. The parsing may be implemented, therefore, according to the datagram types and fields and the layers thereof. The appropriate functions or methods may be executed for each datagram once the datagram is properly parsed out, according to the generic layout of the datagram. FIG. 4 provides a generic layout of the datagrams in one embodiment of this disclosure. The datagram layout includes the payload and the header fields such as the major datagram type, the minor datagram type or subtype, the datagram length, and the datagram checksum. The payload carries the content data in transmission. Additional header fields may be included for different datagram types.

Referring to Example 1 infra, in one embodiment, the major datagram types include, among other things: the server messages and connection control datagram, capable of authenticating and controlling user connections; the content datagram, capable of managing the transmission of the content data; the broadcast datagram, capable of managing the real-time point-to-point, point-to-multipoint, and multi-point-to-multipoint data transmission; and the connection proxy datagram, capable of passing proxy data between the network server and the intelligent data carrier. The server messages and connection control datagram includes minor datagram types such as: the authentication request datagram, capable of initiating an authentication request; the authentication reply datagram, capable of sending a response upon a request of authentication; and the authentication result datagram, capable of sending the result of an authentication session. The content datagram includes minor datagram types such as: the normal content datagram, capable of transmitting the content data; the remote logging datagram, capable of communicating with the network server and establishing a login session; and the remote data collector datagram, capable of transmitting data from a remote connection; the content approval request datagram, capable of requesting verification of the content data transmitted; and the content approval reply datagram, capable of responding to a request of verification of the content data transmitted. The connection proxy datagram includes minor datagram types such as: proxy data to server, capable of passing proxy data to the network server from the intelligent data carrier; and proxy data from server, capable of passing the proxy data from the network server to the intelligent data carrier. Another example of major datagram type is the instant message type. It includes minor datagram types such as the file transmission type, the audio-video transmission type, the instant mail message type, and the remote data collection type.

Injector Connecting with Server and Client

In one embodiment, the secure network system of this disclosure includes an injector, which is capable of connecting the server to an existing network infrastructure and applications. It can be software or firmware that provides network connectivity. The injector converts physical connection data into logical network resources. It allows convenient integration with the existing networks and reduces the need to modify the existing IT infrastructures.

Figure 8:
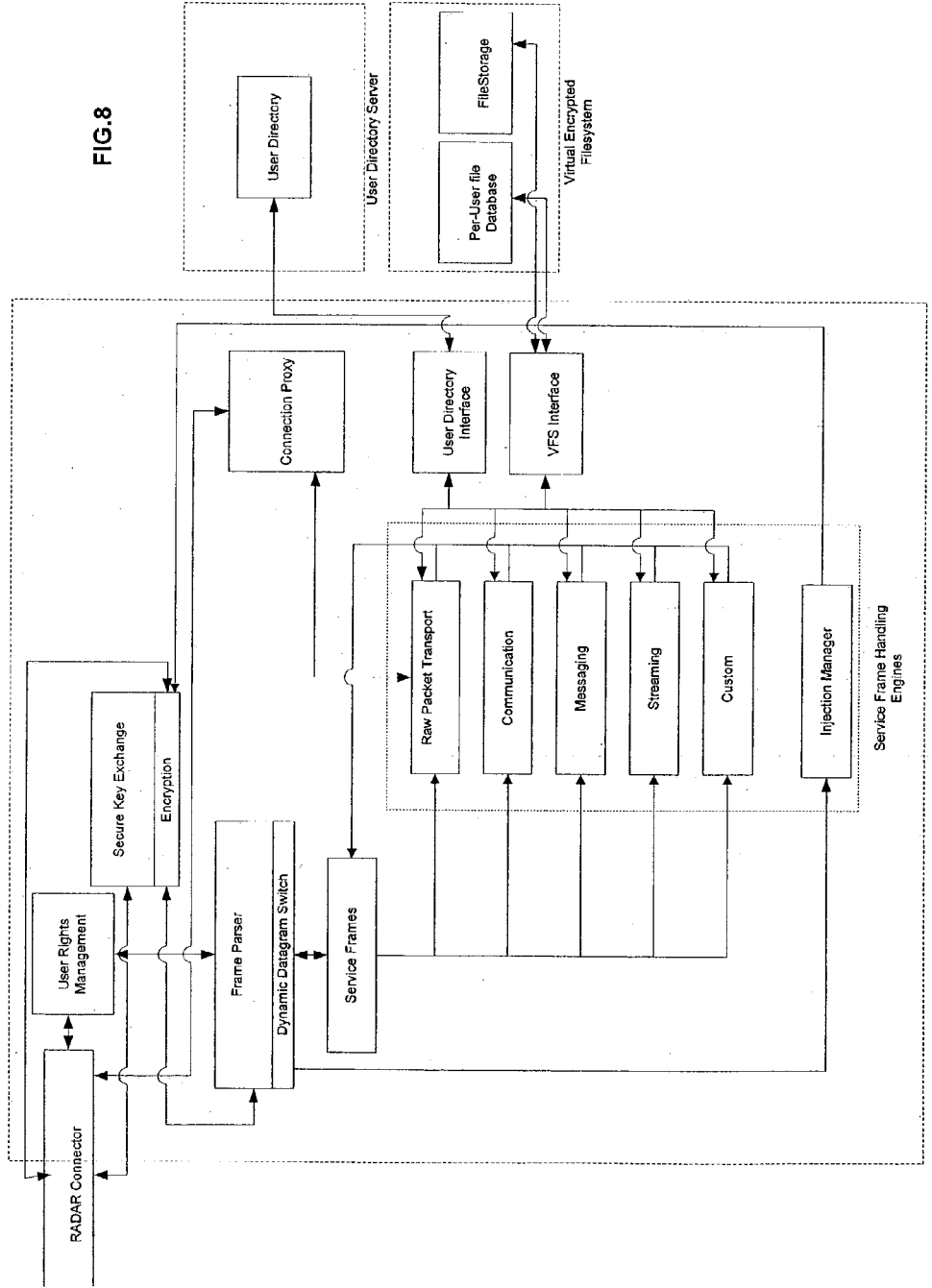
FIG. 8 depicts an injector according to another embodiment of this disclosure, including the various components, modules, and processes involved therein.

Referring to FIG. 8, an injector in one embodiment includes similar modules and processes as that in a client (FIG. 6) or a server (FIG. 7). For example, SKE and encryption is implemented in the injector. Randomization is also utilized in connection to the authentication and encryption scheme. Like the server, the injector is also linked to an EVFS, providing the users a virtual private file system for accessing data from the other connecting networks. The EVFS links to the injector via a Virtual File System (VFS) interface. The injector, like the client and the server, also supports different types of communications, including, for example, messaging, streaming, and other custom communications.

Moreover, the injector employs a dynamic datagram switch. The datagram switch includes a datagram parser (service parser or frame parser), corresponding to the datagram switch in the network server. A radar connector is also included as part of the injector, interfacing with the radar connector at the server side. The radar connector monitors and controls the network connection between the injector and the server. The radar connector may also detect lost connections and reestablish the connection when needed, according to another embodiment.

Authentication and Encryption

In various embodiments of this disclosure, the secure network system may employ a variety of authentication and encryption methods, including, for example, an encrypted or non-encrypted ASCII string, a single classifier model, or a super classifier model. Symmetrical and asymmetrical multi-cipher encryption may be used. Encryption may be altered over time by output feedback, cipher feedback, cipher block chaining, cipher forwarding, or any other method that alters the cipher and/or key in a manner that both the encryption or decryption engine can predict or reproduce. In certain embodiments, Secure Key Exchange (SKE) is employed. SKE is based on the generation of random key pairs that are only used once and thereafter discarded. SKE ensures that no keys are stored on any device or system except the public-private key pair owned or controlled by the server. It differs from Public Key Infrastructure (PKI), which requires a public key storage system to serve multiple users. The omission of an intermediate public key storage system—a typical target for network hackers—allows for enhanced network security.

The SKE module in the secure network system according to certain embodiments use various public key systems, such as the Commercial off the Shelf (COTS) systems. In one embodiment, Advanced Encryption Standard (AES) Rijndael is used. See, Federal Information, Processing Standards Publication 197, Announcing the Advanced Encryption Standard, November 2001, (http://csrc.nist.gov/publications/fips/fips197/fips-197.pdf). See also, http://csrc.nist.gov/CryptoToolkit/aes/; http://csrc.nist.gov/CryptoToolkit/aes/rijndael/; and http://csrc.nist.gov/CryptoToolkit/aes/rijndael/rijndael-ip.pdf. In another embodiment, a 163 bit Elliptic Curve Cryptography (ECC) key may be used. The ECC technology is known. See, e.g., Tatsuaki Okamoto et al., PSEC: Provably Secure Elliptic Curve Encryption Scheme, (Submission to P1363a), March 1999 (http://grouper.ieee.org/groups/1363/P1363a/contributions/psec.pdf). See also, http://world.std.com/~dpj/elliptic.html; http://csrc.nist.gov/cryptval/dss/fr000215.html. And, in alternative embodiments, various encryption methods may be employed on a random base and in combination. For example, the alternative ciphers include, among others: Gost, Cast128, Cast256, Blowfish, IDEA, Mars, Misty 1, RC2, RC4, RC5, FROG, SAFER, SAFER-K40, SAFER-SK40, SAFER-K64, SAFER-SK64, SAFER-K128, SAFER-SK128, TEA, TEAN, Skipjack, SCOP, Q128, 3Way, Shark, Square, Single DES, Double DES, Triple DES, Double DES16, Triple DES 16, TripleDES24, DESX, NewDES, Diamond II, Diamond II Lite and Sapphire II. The alternative hashes include, among others: MD4, SHA, SHA-2, RipeMD128, RipeMD160, RipeMD256, RipeMD320, Haval (128, 160, 192, 224 and 256 bits) with Rounds, Snefru, Square, Tiger, and Sapphire II (128, 160, 192, 224, 256, 288 and 320 bits).

According to various embodiments, the authentication may be based on data at the event level—an authenticating event such as a mouse click, a keystroke, a touch on a screen, or an utterance—or data generated pre- or post-event, or any combination thereof. The use of a super classifier involves three aspects, the classification (see infra Appendix 1), analysis (see infra Appendix 2), and decision (see infra Appendix 3). A super classifier function is a feature extraction of know or unknown vector (input) data, which can be binary or non-binary. See, e.g., appendix 3. In one embodiment, an object vector based super classifier is used. See infra, Example 2. Randomization is applied in the super classifier based object analysis according to one embodiment of this disclosure as discussed in the next section.

Authentication is performed each time when a client or an intelligent data carrier attempts to connect to a network server. According to one embodiment, an authentication and encryption scheme is enabled in the intelligent data carrier. A series of steps constitute such scheme. First, the user sends, via the client or the intelligent data carrier a request to the network server, requesting to be authenticated. The initiation of an authentication session is thus from the client or the intelligent data carrier. Second, the server sends to the intelligent data carrier a list or set of authentication methods that are available, from which the user selects one through an event—e.g., a click of mouse, a touch on a screen, an utterance, a keystroke, or any other suitable notification means. Input from a digitizer such as a camera or biometric device would be another example of suitable notification means. Third, based on the selected authentication method, the server sends the intelligent data carrier a demand for authentication data. The demand may be for a password, true random or pseudo-random in various embodiments. The pseudo random password is generated based on a mathematically pre-calculated list, and a true random password is generated by sampling and processing a source of entropy outside of the system. Fifth, the server transforms the authentication data received from the intelligent data carrier into one or more data objects or object vectors. Sixth, the server performs the object analysis on the data object, using one or more classifiers or a super classifier. A super classifier based on biometrics measurements may be used. And finally, the result of the analysis or the decision based on the classifier is sent from the server to the intelligent data carrier, which either affirms the proper authentication of the user thereby permitting the connection of the intelligent data carrier to the server or declares that the authentication attempt failed.

Randomization in the Creation and Analysis of Data Vector Objects

Randomization techniques are well known in the field of theoretical and applied mathematics. They are often applied in the decision-making processes where no apparent common denominator exists. The use of randomization is facilitated by the vast computing power available today. Randomization typically involves the use of a seed. Random number generators generate pools of random numbers based on the supply of one or more seeds. Depending on the characteristics of the seed, randomization may be classified into pseudo random or true random. Most random generators are pseudo-random number generators. They are based on a mathematical pre-calculated list, one that can be compromised. By contrast, true random numbers are usually generated by sampling and processing a source of entropy outside the computer systems or network involved. One must figure out the source of the entropy and how the entropy generated the seed in order to break a true randomizer.

Randomization may be used in computer or network security. The current application of randomization in data security is largely in a static manner. For example, a random number may be generated by a client, a server, or a like unit, and subsequently passed onto a computer by the user. If the number matches a number within the random number "frame" allowed by the system specific random generator, the user will be granted access. This is similar to a Public Key Infrastructure (PKI) where two secretly generated keys are matched and validated at a system shared validation point. One problem with this paradigm is that the shared validation point may be compromised relatively easily: At the system shared validation point is a random generator that contains a frame of numbers (or any desired output combination such as alpha digits) based on a given seed. Although the random generator seems to generate an infinite number of random numbers, the total number of random numbers to be generated is pre-determined once the generator is created (seeded). That is, what is random is only the order in which the random numbers are generated; such randomization is static. Therefore, each random number is theoretically predictable.

Randomization according to certain embodiment of this disclosure is utilized in a non-static manner. Randomization is implemented in data objects through one or more classifiers or super classifiers. See infra Example 2. A true random generator is seeded to provide random numbers for the analysis of data vector objects. In one embodiment, the object analysis involves a number of steps in which true random numbers are used: First, the server generates a true random number based on the seed. Second, the client receives the random number, which becomes a private key 1 (PK1) of the user. Third, at the event level, the client executes the random number by a suitable means, such as a click of mouse, a touch on a screen, a keystroke, or an utterance. The execution of the event may be based on a predetermined recording time. Fourth, the event level act transforms the original PK1 into a data object PK1, which is a different data image (such as a phonetic image) compared to the original PK1. The data object is then sent to the server. In some embodiments, multiple data objects (or an object encompassing multiple data images) are derived as more than one data images may be obtained from multiple such events. These data objects may be used for the subsequent classification and decision analysis. Fifth, N classifiers are selected based on the features extracted from the data objects (see also, FIG. 2 and Example 2 infra), either randomly or via a predetermined rule. And, respectively, a random or superior sum may be calculated from the N classifiers. Sixth, the data object PK1, at the server, uses a seed to generate another true random number, which becomes the private key 2 (PK2). PK2 becomes the rule set for the object analysis and the object based decision-making. See infra, Examples 3, 4, and 5. The classifier models might differ in the various embodiments, depending on the type of object analyses required. And finally, the resulting decision from the analysis is posted to the server and sent to the client, signifying a successful or failed authentication session.

Thus, two separate private keys are generated based on true random values. These two keys do not contain any information based on the initial random number, because the data object transforms the number into a value or a data image, based on entropy outside the computer at the event level. It is therefore outside the environment of the randomizer or random generator and becomes non-static. Since what is used for the randomization-based object transformation is itself a key, it becomes possible to match the two unknowns (private keys) and make them known. In alternative embodiments, more than two private keys may be similarly generated and used. Moreover, any numbers of private keys may be generated by the object in the classifier, and thereby makes the number of private keys unknown.

According to this embodiment, randomization is implemented for both (i) challenging to the authenticator (i.e., the user or the client) based on a true random generator and (ii) selecting the object analysis to be performed and performing the selected analysis.

A typical pre-programmed random generator may take the following form:

$$y_{i+1} = \frac{1}{N} \sum_{j=1}^{N} \frac{(a_j x_{i,j} + c_j) \bmod m_j}{m_j}$$

See, e.g., Numerical Recipes, W.H. Press et al., Cambridge University Press. Whether simple linear congruential generators or improved generators are used, multiple random generators may be employed—thereby creating a combinatorial problem—so as to prevent the calculation of the seed from, for example, observing a number of random numbers generated in sequence. In certain embodiments, the least significant digits are truncated in the sequence, in order to minimize the revelation of potential hints. In other embodiments, besides the seed, the generator specific constants a, c and m are also provided according to the above formula. When the constants are chosen using some noise input, this approach will result in more robust randomizers. It is noted that the constants a and m may not be chosen arbitrarily; a table with a large number of possible values may be created. In still other embodiments, a number of pre-chosen random generators may be used in connection with N independent seeds. A simple sum may be used as follows:

$$y_{i+1} = \frac{1}{N} \sum_{j=1}^{N} \frac{(a_j x_{i,j} + c_j) \bmod m_j}{m_j}$$

An example of a useful algorithm for combining two linear congruential generators with a combined period of about $2.3 \times 10^{18}$ is the ran2 described in Numerical Recipes. The algorithm may be modified using two independent seeds. It may be further modified using 3 or N generators. According to certain embodiments, at least one seed is obtained from an indeterministic source, which a perpetrator does not have easy access to. The indeterministic source may be anything outside of the randomizer and beyond the network system of interest, such as, e.g., the use of an external device, external occurrence, a third party, and bits derived from the recent history of the computer, among other things.

When one specific classifier is used in the analysis of an object-based vector, the predictability may be relatively high such that it is easy for a perpetrator to solve the classifier and the seed. In certain embodiments, an ensemble of classifiers—i.e., multi classifiers or super classifier—are used, where lower predictability may be achieved. The dimensionality of the feature vectors may be reduced as the variations that are not class discriminative are discarded. See infra, Appendices 1 and 2.

Therefore, true randomization according to this embodiment improves the protection on data access. The enhanced network security is achieved when randomization is utilized in the creation of a data object as well as the object analysis. Such objects are based on specific values—such as those of biometrics measurements—that are only known by the user at the event level; therefore, the improved security according to the present disclosure focus individually on the user—hence user centric—rather than the devices. The data objects transformed at the event level—based on biometrics—in a true randomized manner and analyzed in a super classifier, according to this embodiment, provides a superior foundation for establishing and verifying the user identities.

Encrypted Virtual File System (EVFS)

An EVFS according to the various embodiments of this disclosure is a per-user (or group of user), per-client virtual file system, also referred to as a file repository. It is a server-based file system or file and data storage facility, which allows the users of a network system to store files or data away from their local hosts or client carriers. An EVFS may be useful when, for example, the storage capacity is deficient at the local host. Examples of the use and implementation of EVFSs are shown at various web sites, for example, www.microsoft.com/technet/treeview/default.asp?url=/TechNet/prodtechnol/windows2000serv/deploy/confeat/nt5efs.asp; www.serverwatch.com/tutorials/article-.php/2106831; and www.freebsddiary.org/encrypted-fs.php.

According to one embodiment of this disclosure, the server of the secure network system is connected to an EVFS through an EVFS interface, as shown in FIG. 7. The EVFS comprises a user directory, a per-user file database, and file storage. The user directory contains relevant information for all the users, including password, login parameters, biometric profile, physical or geographic location, online and offline status, public ECC key used to encrypt files which are stored in the EVFS. The users are the individuals who have connected to the network server through a client or an intelligent data carrier and have used or are using certain applications supported by the network. The applications may be delivered and run off the intelligent data carrier according to one embodiment of this disclosure. The applications may also run on a host computer or device to which the intelligent data carrier or the client is connected. Or, alternatively, the applications may run remotely on the server on behalf of the client.

The server uses a user directory interface—which resides in the server—to access the user directory. The file storage is a digital medium that has stored thereon the files and any other digital information of interest to the users. It may be any kind of computer memories. This is the physical location where the files or data generated from or modified by the applications the user runs off the intelligent data carrier, the host computer, or remotely on the server are stored. The file storage may be optimized for speed and convenient access according to certain embodiments of this disclosure.

The per-user file database contains user file information such as the original file name, date and time, and an encrypted representation of the encryption key used to encrypt the file. All files stored within the EVFS are assigned true random names as well as true random encryption keys; they are mixed among each other in the file storage. The data access is private and secure with respect to each user. Each individual user may only see and access those files or data that the user has ownership of or that the user has obtained the permissions to access. The level of access the user has with respect to each file or document is controlled by the server. That is, a user may only be permitted to read and edit a file, but not to move or copy it off the server—or the intelligent data carrier if the application is run off the intelligent data carrier—in certain embodiments. As such, each user virtually has a private database—hence per-user database—connected to the server.

The EVFS used in the secure network system disclosed herein provides enhanced protection to the data and application belonging to each user. In case of physical compromises, i.e., the intelligent data carrier is lost or stolen, the data stored in the EVFS will be unreadable—or not in view—to anyone but the properly authenticated user, the owner of the file who has the access to the private ECC encryption key that can unlock the file.

The provision of EVFS thus enhances the user-centric aspect of the secure network system according to the various embodiments of this disclosure. Along with encryption, authentication, and other features discussed throughout the present disclosure, the EVFS enables the secure delivery and stand-alone operation of applications through an intelligent data carrier.

The various embodiments are further described by the following examples, which are illustrative of the disclosed embodiments but do not limit the same in any manner.

EXAMPLE 1

Datagram Examples and Specifications of Major and Minor (Sub) Datagram Types

---
Data Gram Examples
---
Instant Message types
   Instant Message
   Remote logging
   Remote data-collection ---
-continued Data Gram Examples
---
   Execute remote command
   File Transmission
   Audio-video communication
   EDI transaction
Broadcast types
   Non real-time point-to-multipoint transmission
   Non real-time multipoint-to-multipoint transmission
      Channel-based chat (IRC style)
   Real-time point-to-point transmission
      User-to-user chat
      Audio-video conference
   Real-time point-to-multipoint transmission (broadcast)
      Audio-video broadcast
   Real-time multipoint-to-multipoint transmission
      Audio-video conference
User Directory Types
   Query
   Update
Content Filter Control
   Filter status
   Filter statistics
   Filter update (add/remove rules)
   Filter set
   Filter reset

---

Mandatory Datagram Fields
The beginning of each datagram may be laid out as follows:

| Byte size | Populated by | Content |
|---|---|---|
| 1 | Client | Datagram major type |
| 1 | Client | Datagram minor type (sub type) |
| 8 | Server | Datagram received at server (timestamp) |
| 4 | Server | Data gram originator (Client-ID of sender) |
| 1 | Client | Signature/CRC type |
| n | Client | Signature/Checksum field (e.g., ECC Signature, MD4, MD5, SHA, SHA1 etc.) |

Additional header fields may be appended to the aforementioned fields, depending on the type of the datagram. The additional header fields are typically populated by the client, and may be validated by the server.

---
Major Type 0; Server Messages And Connection Control
---

The datagram type is used for the server to send messages, error notifications, and server-client specific information over the network connection.

Subtype 1: Authentication Request

Upon connecting to the server, the server may issue a Type 0, 1 datagram, requiring the client to identify itself. This datagram informs the connected client on the authentication method required to be authenticated by the server.

Subtype 2: Authentication Reply

This datagram is used by the client to validate the user.
A plurality of authentication methods may be used in connection to as these subtypes of datagrams, exemplified in the following list:

| | |
|---|---|
| 0 | Username and password |
| 1 | Username and password + x.509 Client certificate signature (see, e.g., www.webopedia.com/TERM/X/X_509.html) |
| 2 | Username and password + ECC signature |
| 3 | Password |
| 4 | Password + x.509 Client certificate signature |
| 5 | Password + ECC signature |
| 6 | One-time password (S-Key style, predefined, ordered list of passwords) |
| 7 | One-time password + x.509 Client certificate signature |
| 8 | One-time password + ECC signature |
| 9 | Voicekey |
| 10 | Voicekey + x.509 Client certificate signature |
| 11 | Voicekey + ECC signature |
| 12 | Biometric hash |

| | Data Gram Examples |
|---|---|
| 13 | Biometric hash + x.509 certificate signature |
| 14 | Biometric hash + ECC signature |
| 15 | x.509 Client certificate (signature) |
| 16 | ECC signature |
| 17 | Content Transfer (TID) |

The specific authentication method used determines the number of additional data fields in these datagrams. The examples of various fields when certain methods are used are shown below:

| Byte Size | Description |
|---|---|
| | Method 0 |
| 1 | Length of UserName field |
| n | Usrname |
| 1 | Length of Password field |
| n | Password |
| | Method 1 |
| 1 | Length of UserName field |
| n | Username |
| 1 | Length of Password field |
| n | Password |
| n | x.509 signature on username and password fields |
| | Method 2 |
| 1 | Length of UserName field |
| n | Username |
| 1 | Length of Password field |
| n | Password |
| n | ECC signature on username and password fields |
| | Method 8 |
| 1 | Length of password field |
| n | One-time Password |
| n | ECC Client certificate signature |
| | Method 11 |
| 1 | Length of ECC signature |
| n | ECC signature on Voicekey data |
| n | Voicekey data |
| | Method 12 |
| n | Biometric hash |
| | Method 14 |
| 1 | Length of ECC signature |
| n | ECC signature on Biometric hash |
| n | Biometric hash |
| | Method 16 |
| n | ECC signature on Challenge |

Subtype 3: Authentication Result
After the authentication request is processed, the client will receive a 0, 3 datagram which delivers the authentication result. This datagram has certain static fields:

| Byte Size | Description |
|---|---|
| 1 | 1 = Granted, 0 = Denied |

For successful authentication, additional fields may be included:

| Byte Size | Description |
|---|---|
| 1 | User Profile sent |
| 4 | If profile sent, indicates length of profile field |
| n | Mime-encoded User Profile |

Subtype 4: Generic Error
If the server encounters any error during a client session, this type of datagram captures the error. The fields included are:

| Byte Size | Description |
|---|---|
| n | Error message |

Subtype 5: Invalid Datagram
If the datagram passed to the server are considered invalid for any reason, this type of datagram will contain the reason in its payload.

| Byte Size | Description |
|---|---|
| n | Error description |

Subtype 6: Improper Permissions
This datagram denotes that the network access is denied.

| Byte Size | Description |
|---|---|
| 1 | Major Type |
| 1 | Minor Type |
| n | Error Message |

Subtype 7: Keep-Alive
This datagram is sent by the server and/or the client to each other in a predetermined interval, to keep the TCP connection open. This is useful when the system is running through various proxy-firewalls (e.g., FW-1) or running over a dial-up connection (e.g., through a dial-up router). This type of datagram is also useful for the server to request that the client return a keep-alive datagram, so as to detect whether the client is alive. The server may disconnect when no response is received from the client.

| Byte Size | Description |
|---|---|
| 0, 1 | 0 = No answer needed; 1 = Please reply |

Major Type 1: Content Datagram
Subtype 1: Normal Content Datagram
This datagram contains the actual content data to be transmitted.

| Byte size | Content |
|---|---|
| 4 | Final Recipient-ID |
| n | Mime encoded data |

Subtype 2: Remote Logging
This datagram contains log-entries from a connecting device, with a "log-collector" client installed, destined for a logging server, which may itself be a client to another network, according to certain embodiments.

| Byte Size | Content |
|---|---|
| 8 | Final Recipient-ID |
| n | Mime encoded log-data |

Subtype 3: Remote Data-Collector
This datagram represents a query for a client from the "Remote Data Collector" engine at the server, to acquire data from the client for establishing the connection.

| Byte Size | Content |
|---|---|
| 8 | Final Recipient-ID |
| 1 | Data gram type (query or answer) |
| n | Mime encoded data |

-continued

Data Gram Examples

Subtype 4: Content Approval Request
This datagram is used for requesting approval of the content data transmitted, such as, signing off documents, expense reports, and approving an electronic financial transaction.

| Byte Size | Content |
|---|---|
| 8 | Final Recipient-ID |
| n | Mime encoded and XML formatted content for approval |

Subtype 5: Content Approval Reply
This datagram is used to reply to Content Approval Requests (Subtype 4).

| Byte Size | Content |
|---|---|
| 8 | Final Recipient-ID |
| 1 | Approve or reject |
| 1 | Length of signature field |
| n | ECC Signature on the data-field of the "Type 8" packet. |

Major Type 2: Broadcast Datagram

This type of datagrams is used for a variety of conferencing and broad-casting applications. A number of subtypes may be implemented, including: non real-time point-to-multipoint transmission; real-time point-to-point transmission (e.g., user-to-user chat, audio-video conference); real-time point-to-multipoint transmission (e.g., stock ticker, audio-video broadcast); real-time multipoint-to-multipoint transmission (e.g., audio-video conference).

Major Type 3: Connection Proxy

The Connection Proxy datagrams are used to carry raw connection data and send the same from an embedded or built-in application on the client to a network server.
Proxy Connections are typically requested over a control-channel, i.e., the first connection to the server, and established when a new connection to the server is opened upon the request, which is successfully processed. A "Proxy Connection-ID" is then given, also used for authentication purposes. In alternative embodiments, the Proxy Connections may be established over the control-channel directly. This supports data transmission via a single connection. It lightens the load on the server and client if the proxy connection carries very little data, such as the case when a Terminal Server or telnet connection is used.

Connection types

Different types of connection protocols may be used.

| 0: | TCP |
|---|---|
| 1: | UDP |

Subtype 1: Proxy data from client
These datagrams carry the actual data for the proxy connection, coming form the client end. One user may have one or more proxy connection open at the same time.
A Connection ID (CID) field is included to identify each connection.

| Byte Size | Description |
|---|---|
| 2 | Proxy ID Connection |
| n | Data |

Subtype 2: Proxy data to client
These are the connection data coming back from the proxy connection to the client (or the owner of the connection). No other field than the actual data is included, since the proxy connection only sends to and receives connection data to the owner of the connection. In order for the client to identify which remote connection (i.e., server) responded, the CID is included in the originator field of the datagram.

| Byte Size | Description |
|---|---|
| N | Data |

-continued

Data Gram Examples

| Type | Sender | Description |
|---|---|---|
| 0: | Server | Remote Socket Connected. |
| 1: | Server | Remote Socket Disconnected. |
| 2: | Client | Disconnect Remote Socket but keep Proxy Connection (CID). |
| 3: | Client | Terminate Proxy Socket Connection (complete teardown). |
| 4: | Server | Proxy Socket Terminated (complete teardown). |

EXAMPLE 2

Object Vector Based Super Classifier and Biometrics

Figure 2:
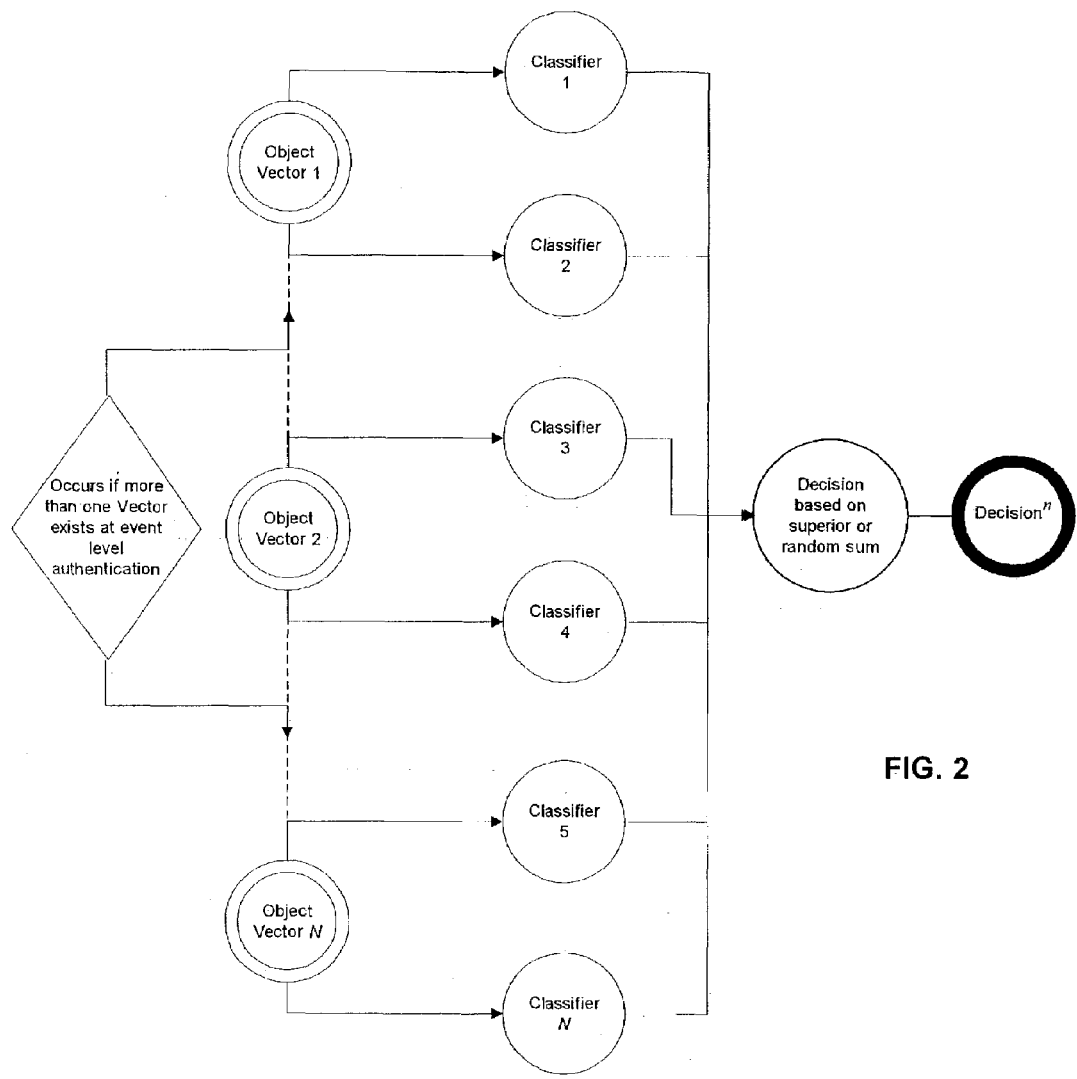
FIG. 2 illustrates an object vector super classifier according to another embodiment of this disclosure.

Referring to FIG. 2, an object vector super classifier (also may be referred to as multi classifiers) is shown. More than one data object vectors exist for event level authentication. The classification decisions are derived based on superior or random sum computed from the data vector objects, including Object Vector 1, 2, and 3 in FIG. 2. Here, each object vector is connected to one or more classifiers from classifiers 1 to N. Therefore, when super classifier is used according to one embodiment of this disclosure, feature extractions may be made from the object vector and then transformed into a set of classifiers and hence, collectively, a super classifier. Such event specific transform is advantageous due to its relatively simple distributions characterizing event-based features.

Biometrics provides a useful example for user authentication using super classifiers. In certain embodiments of this disclosure, the super classifier is used for physical biometrics, which comprises voice recognition, fingerprints, handprints, blood vessel patterns, DNA tests, retinal or iris scan, and face recognition, among other things. In other embodiments, the super classifier is used for performance biometrics, which comprises habits or patterns of individual behavior.

Further, as discussed supra, randomization can be implemented, according to one embodiment of this disclosure, in an authentication session at the event level. And, transferring the vectors derived as such into objects increases the likelihood at the analysis level to identify and derive binary structures. When adding such binary structures to a super classifier, the authentication session may be measured with an advantageously high probability rate.

It is to be understood that the description, specific examples and data, while indicating exemplary embodiments, are given by way of illustration and are not intended to limit the various embodiments of the present disclosure. All references cited herein for any reason, are specifically and entirely incorporated by reference. Various changes and modifications within the present disclosure will become apparent to the skilled artisan from the description and date contained herein, and thus are considered part of the various embodiments of this disclosure.

Appendix 1: Object Classification In Speaker Verification

Classification and Probability Density Estimation

Speaker verification is a classification problem like any other data object vector involving two classes: target speakers (*I*) (user of object) and impostors (*-I*) (perpetrator of object). In order to do classification, in this case, a set of measurements derived from recordings of a speakers voice are needed. These measurements are conveniently represented as D-dimensional vectors:

$$(\vec{x} \in R^D)$$

Each speaker is characterized by a probability density function:

$$p(\vec{x}|I)$$

which measures the likelihood of observations. The probability density is characterized by $$p(\vec{x}|I) \geq 0, \forall \vec{x} \qquad \text{Equation: 1.1}$$

$$p(\vec{x}) = p(\vec{x}|I)P(I) + p(\vec{x}|\neg I)P(\neg I) \qquad \text{Equation: 1.2}$$

$$\int_{\vec{x}} p(\vec{x})d\vec{x} = 1 \qquad \text{Equation: 1.3}$$

where P(I) and P(-I) are the a priori probabilities of respectively target speaker trials and impostor trials. For speaker verification, the a posteriori probability of the claimed speaker, I, given an observation, $\vec{x}$, is of interest.

The a posteriori probability can be computed by Bayes rule $$P(I|\vec{x}) = \frac{P(I)p(\vec{x}|I)}{p(\vec{x})} \qquad \text{Equation: 1.4}$$

Since *I* and *-I* are mutually exclusive we have $$P(I|\vec{x}) + P(\neg I|\vec{x}) = 1 \qquad \text{Equation: 1.5}$$

i.e. the probability that the identity claim was correct given the observation, $\vec{x}$, plus the probability of some other speaker (not I) was speaking sum to one. It is attractive to use the a posteriori probability $P(I|\vec{x})$ for classification purposes: the identity claim is accepted or rejected by the rule:

$$\text{Decide} \begin{cases} \text{accept} & \text{if } P(I|\vec{x}) \geq P(\neg I|\vec{x}) \\ \text{reject} & \text{otherwise} \end{cases}$$

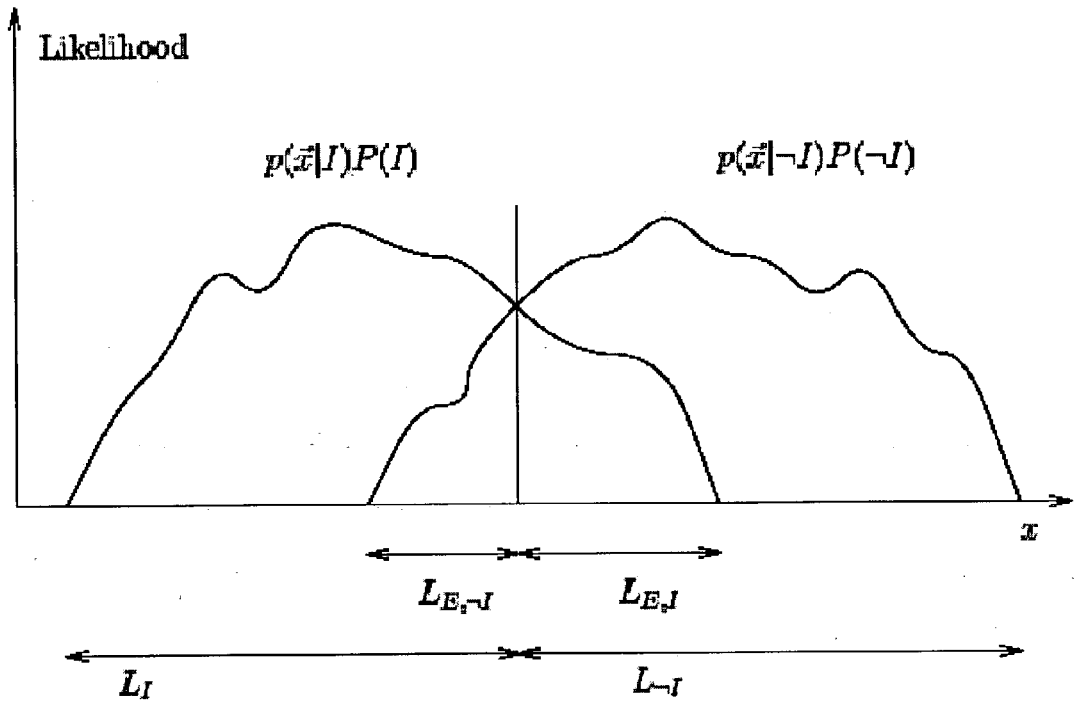

Figure: 1 Probability densities for the two classes, I and -I. The densities overlap in the regions:

$$L_{E,I} \text{ \& } L_{E,\neg I};  \quad\quad\quad\quad\quad\quad\quad\quad\quad\quad\quad\quad \text{Equation: 1.6}$$

this causes the Bayes error rate to be greater than 0. A classifier that uses this decision rule is called a Bayes classifier. The error rate of a Bayes classifier is equal to $$E_{Bayes} = \int_{L_I} P(\neg I|\vec{x})p(\vec{x})d\vec{x} + \int_{L_{\neg I}} P(I|\vec{x})p(\vec{x})d\vec{x} \quad \text{Equation: 1.7}$$
$$\quad\quad\quad\quad\quad\quad\quad\quad\quad\quad\quad\quad\quad\quad\quad\quad\quad\quad\quad\quad\quad\quad\quad\quad \text{Equation: 1.8}$$
$$= \int_{L_I} P(\neg I)p(\vec{x}|\neg I)d\vec{x} + \int_{L_{\neg I}} P(I)p(\vec{x}|I)d\vec{x} \quad \text{Equation: 1.9}$$

where $$L_I = \{\vec{x} \mid P(I|\vec{x}) \geq P(\neg I|\vec{x})\} \quad \text{Equation: 1.10}$$
$$L_{\neg I} = \{\vec{x} \mid P(I|\vec{x}) < P(\neg I|\vec{x})\} \quad \text{Equation: 1.11}$$

In practice the probability functions:

$$P(I|\vec{x}) \text{ and } P(\neg I|\vec{x})$$

are unknown and can only be approximated. Hence, the error rate of any practical decision strategy is bound to have an error rate which on average is not less than the Bayes error rate.

A Priori Probabilities & Risk Minimizations

The average error consists of two terms; rejections of target speakers (TA errors):

$$E_I = \int_{L_{\neg I}} P(I) p(\vec{x}|I) d\vec{x} \quad \text{Equation: 1.12}$$

and acceptances of impostors (IR errors):

$$E_{\neg I} = \int_{L_I} P(\neg I) p(\vec{x}|\neg I) d\vec{x} \quad \text{Equation: 1.13}$$

Using a posteriori probabilities to classify samples is essentially the same as classifying according to maximum likelihood. The overall error rate is, however, dependent on the relative number of impostor and target speaker trials. If impostor trials are much more frequent than target speaker trials, then it pays of too classify some samples as class -$I$ even if class $I$ is more likely, because the overall absolute error is more dependent on E-I than on EI. In other words, E-I is minimized at the expense of EI. The way to balance these error rates optimally is by fixing the a priori probabilities to reflect the relative number of impostor/target speaker trials (object attempts).

Assigning prior probabilities is only one way of balancing TA and IR errors. Generally the two types of errors may have different consequences and it may therefore be desirable to achieve a balance which reflects the cost of misclassification. In this case $P(I)$ and $P(-I)$ are replaced by:

$$C(I) = P(I)C(\neg I|I) \quad \text{Equation: 1.14}$$
$$C(\neg I) = P(\neg I)C(I|\neg I) \quad \text{Equation: 1.15}$$

where $C(I|\neg I)$ is the cost of classifying an $\neg I$-sample as I. The classification is here according to risk and not a posteriori probability:

$$R(I|\vec{x}) = \frac{C(I|\neg I) P(I) p(\vec{x}|I)}{p(\vec{x})} \quad \text{Equation: 1.16}$$

Analogously to equation 1.6 we have the decision rule:

$$\text{Decide} \begin{cases} \text{accept} & \text{if } R(I|\vec{x}) \geq R(\neg I|\vec{x}) \\ \text{reject} & \text{otherwise} \end{cases} \longleftarrow \text{Equation: 1.17}$$

A more pragmatic approach to the problem of balancing TA and IR errors is to decide a priori an acceptable error rate for either $E_I$ or $E_{\neg I}$, and then use this to determine the decision surfaces (and by extension P(I) and P(-I)). Whatever way is chosen, the real problem of estimating the class likelihoods, $$p(\vec{x}|I)$$

and $$p(\vec{x}|\neg I)$$

remains the same.

Probability Estimation

One approach to implementing a decision rule is to separately estimate the probability densities and $$p(\vec{x}|I)$$

and $$p(\vec{x}|\neg I)$$

in the test situation - use Bayes rule to convert likelihoods to probabilities, which can be used in place of $$P(I|\vec{x})$$

This solution, however, is more extensive than required, since the verification (which by virtue of it's utterance translation becomes a binary data object) problem only depends on the likelihood ratio:

$$(\text{LR}(\vec{x})):$$

$$\Updownarrow \quad \begin{aligned} & P(I|\vec{x}) \geq P(\neg I|\vec{x}) \\ & \text{LR}(\vec{x}) = \frac{P(I)}{P(\neg I)} \frac{p(\vec{x}|I)}{p(\vec{x}|\neg I)} \geq 1 \end{aligned}$$

In terms of LR(~x), the decision function 2.6 becomes:

$$\text{Decide} \begin{cases} \text{accept} & \text{if } \text{LR}(\vec{x}) \geq 1 \\ \text{reject} & \text{otherwise} \end{cases} \quad \longleftarrow \text{Equation: 1.18}$$

The Bayes decision surface between class *I* and class *-I* is characterised by:

$$\text{LR}(\vec{x}) = 1.0$$

For classification purposes we only need to know on which side of the decision surface the test sample $\vec{x}$ falls. In the example given in figure 2.1, this surface is the simplest possible: a single point $x = t$, where $t$ is the decision threshold.

A distinction is made between parametric and non-parametric classification. The difference lies in the prior assumptions that are made about the class distributions. Parametric classification assumes that the samples to be classified belong to a narrowly defined family of probability density functions, whereas non-parametric classification makes only weak assumptions about the prior distributions. Hence, non-parametric classification is more general, whereas parametric classifiers are easier to construct, because they have fewer degrees of freedom.

Parametric Classification

As an example of parametric classification, we might assume that the classes $(j = 1, 2)$ are characterised by normal probability densities:

$$\mathcal{N}(\vec{v}; \vec{\mu}_j, \mathbf{S}_j) = \frac{1}{(2\pi)^{D/2}|\mathbf{S}_j|^{1/2}} \exp\left(-0.5(\vec{v}-\vec{\mu}_j)^T \mathbf{S}_j^{-1}(\vec{v}-\vec{\mu}_j)\right)$$

Equation: 1.19

In this case:

$$\text{LR}(\vec{x})$$

is given by:

$$\ln\left(\text{LR}(\vec{x})\right) = g(\vec{x}) \quad \longleftarrow \text{Equation: 1.20}$$

$$g(\vec{x}) = (\vec{x}-\vec{\mu}_2)^T \mathbf{S}_2^{-1}(\vec{x}-\vec{\mu}_2)$$
$$- (\vec{x}-\vec{\mu}_1)^T \mathbf{S}_1^{-1}(\vec{x}-\vec{\mu}_1) + 2\ln\left(\frac{|\mathbf{S}_2|^{1/2}}{|\mathbf{S}_1|^{1/2}}\right)$$

Equation: 1.21

This is a quadratic function. If we furthermore assume that the two distributions share the same covariance matrix *S1* = *S2* = *S*, this simplifies to $$g(\vec{x}) = \vec{a}(\vec{x} - \vec{\mu})$$ ← Equation: 1.22

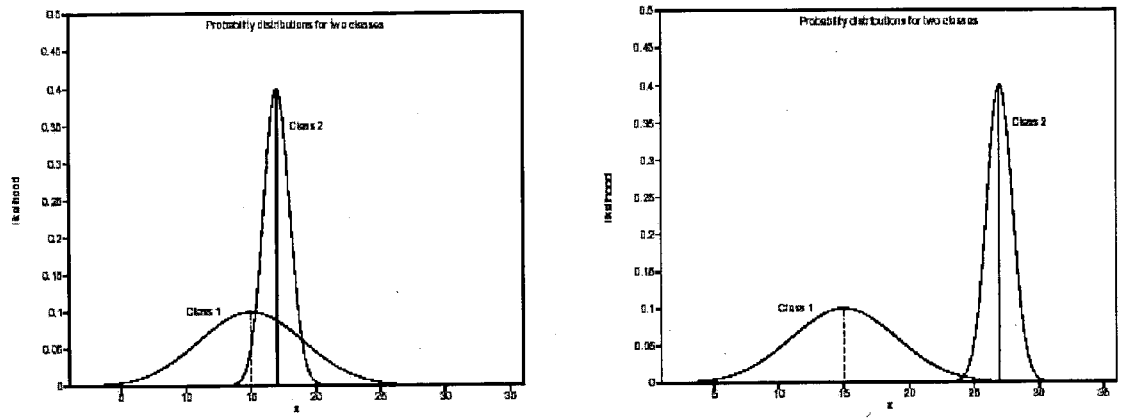

Figur 2 Two classes were the Bayes classifier uses quadratic decision surfaces.

Left: The classes have similar means:

$$\mu_1 = 15, \mu_2 = 17.$$

Right: The classes have different means:

$$\mu_1 = 15, \mu_2 = 27$$

In the right example, the Bayes decision surface can be approximated well by a linear function.

where $$\vec{a} = \mathbf{S}^{-1}(\vec{\mu}_1 - \vec{\mu}_2)$$ ← Equation: 1.23

$$\vec{\mu} = \frac{1}{2}(\vec{\mu}_1 + \vec{\mu}_2)$$ ← Equation: 1.24

This is a linear function. In discriminate analysis equation 1.22 is known as Fisher's linear discriminate function. As we have seen, this discriminate function is optimal for normally distributed classes characterized by the same covariance matrices, but its usefulness goes beyond this. It is a robust function, which (although not optimal) can be used with good results if the class distributions have the form of "spherical clouds". In fact, even if it is known that equation 1.21 - and not equation 1.22 - is the optimal discriminate function, equation 1.22 may yield better results (Raudys and Pikelis 1980). The problem when
using equation 1.21 is that from a limited sample set, it is difficult to obtain good estimates for $S1$ and $S2$. This is especially true in high dimensional spaces.

The linear classifier is less sensitive to estimation errors since the dependence is primarily on the first order moments (the means):

$$\mu_1 \,\&\, \mu_2$$

which are easier to estimate than *S1* and *S2* (the second order moments). If needed, the linear classifier may be further simplified by assuming S to be diagonal, or even *S* equal to the identity matrix.

Example

Figure 2 shows two examples of 1-dimensional density functions for two normally distributed classes. In both examples the Bayes decision surfaces are quadratic, because the variances are different $$(\sigma_1^2 = 16, \sigma_2^2 = 1)$$

In case one the means are:
$$\mu_1 = 15, \mu_2 = 17$$
and in case two:

$$\mu_1 = 15, \mu_2 = 27$$

Assuming equal priors, we can determine a decision rule using equation 1.21:

$$LR(x) = 1 \quad \longleftarrow \quad \text{Equation: 1.25}$$

$$\Updownarrow$$

$$\left(\frac{1}{\sigma_2^2} - \frac{1}{\sigma_1^2}\right)x^2 + \left(\frac{2\mu_1}{\sigma_1^2} - \frac{2\mu_2}{\sigma_2^2}\right)x + \frac{\mu_2^2}{\sigma_2^2} - \frac{\mu_1^2}{\sigma_1^2} - 2\ln\left(\frac{\sigma_1}{\sigma_2}\right) = 0$$

Equation: 1.26

Hence we have the decision rule:

$$\text{Decide} \begin{cases} \text{Class 1} & \text{if } x \leq 15.3 \;\; \vee \;\; x \geq 18.9 \\ \text{Class 2} & \text{otherwise} \end{cases}$$

The error rate is $$E = \frac{1}{2}\left(E_1 + E_2\right)$$
$$= \frac{1}{2}\left(0.30 + 0.07\right)$$
$$\approx 18.8\%$$

In the linear case we have from 1.22:

$$LR(x) = 1 \quad \longleftarrow \text{Equation: 1.27}$$

$$\Updownarrow$$

$$x = \frac{1}{2}(\mu_1 + \mu_2) \quad \longleftarrow \text{Equation: 1.28}$$

which leads to the decision rule $$\text{Decide} \begin{cases} \text{Class 1} & \text{if } x \leq 16.0 \\ \text{Class 2} & \text{otherwise} \end{cases}$$

With the error rate $(0.40 + 0.16)/2 \approx 28\%$. The Quadratic classifier is here significantly better than the linear classifier. In case 2 the corresponding decision rule becomes $$\text{Decide} \begin{cases} \text{Class 1} & \text{if } x \leq 24.2 \ \lor \ x \geq 31.4 \\ \text{Class 2} & \text{otherwise} \end{cases}$$

for the quadratic classifier and $$\text{Decide} \begin{cases} \text{Class 1} & \text{if } x \leq 21.0 \\ \text{Class 2} & \text{otherwise} \end{cases}$$

for the linear classifier. The average error rates are respectively 0.007% and 0.03%, which very small for both decision rules. Relatively, the quadratic decision rule is, however, still significantly more accurate. This is not because it is quadratic: a linear decision rule such as $$\text{Decide} \begin{cases} \text{Class 1} & \text{if } x \leq 24.2 \\ \text{Class 2} & \text{otherwise} \end{cases}$$

has the same small error rate as the quadratic decision rule. Hence, the difference in performance is here caused by the assumptions about the prior distributions.

Linear versus Non-Linear Decision Surfaces

Assuming a priori that the solution to $$LR(\vec{x}) = 1 \qquad \text{Equation: 1.29}$$

is linear in $\vec{x}$ simplifies the design of a classifier. Non-linear classifiers are more powerful, because they allow the solution to 1.29 to be drawn from a larger set (which usually includes the linear solution as a special case). There is, however, nothing limiting about assuming linear decision surfaces, since the linearity refers to $\vec{x}$, but the vector $\vec{x}$ may be "preprocessed" before being given to the classifier. Assume, for instance, that the optimal decision surface - in a given 2D problem $$(\vec{x} = (x_1, x_2)^T)$$

has the form $$Ax_1^2 + Bx_2^2 + Cx_1x_2 + Dx_1 + Ex_2 + F = 1$$

A linear classifier is able to implement this decision surface if the classification, rather than in terms of $x_1$ and $x_2$ is done in terms of $$(\phi_1(\vec{x}), \phi_2(\vec{x}), \phi_3(\vec{x}), \phi_4(\vec{x}), \phi_5(\vec{x}))^T$$

where $$\begin{aligned}
\phi_1(\vec{x}) &= x_1^2 \\
\phi_2(\vec{x}) &= x_2^2 \\
\phi_3(\vec{x}) &= x_1 x_2 \\
\phi_4(\vec{x}) &= x_1 \\
\phi_5(\vec{x}) &= x_2 \qquad \text{Equation: 1.30}
\end{aligned}$$

In other words, the 2D quadratic decision function can be implemented by a linear function in a 5D space.

Non-parametric Classification

Figure 3 shows a realistic example of what the class (speaker or the object) distributions in a speaker recognition system or an object recognition engine might look like.

The assumption that the observations from a given speaker are drawn from a normal distribution is here reasonable.

Fisher's discriminate function is suitable for discrimination between any two speakers (and in this case comparative to object containing any given data source), but is obviously a poor model (in 2D) for discriminating between one target speaker and the remaining speakers in the population (a line can not be drawn which separates an individual speaker from most of the other speakers in the population). In fact, the impostor class is too complicated to be modeled well by any simple parametric distribution. This is a common situation for many pattern classification problems. A number of techniques exist for non-parametric classification and probability density estimation.

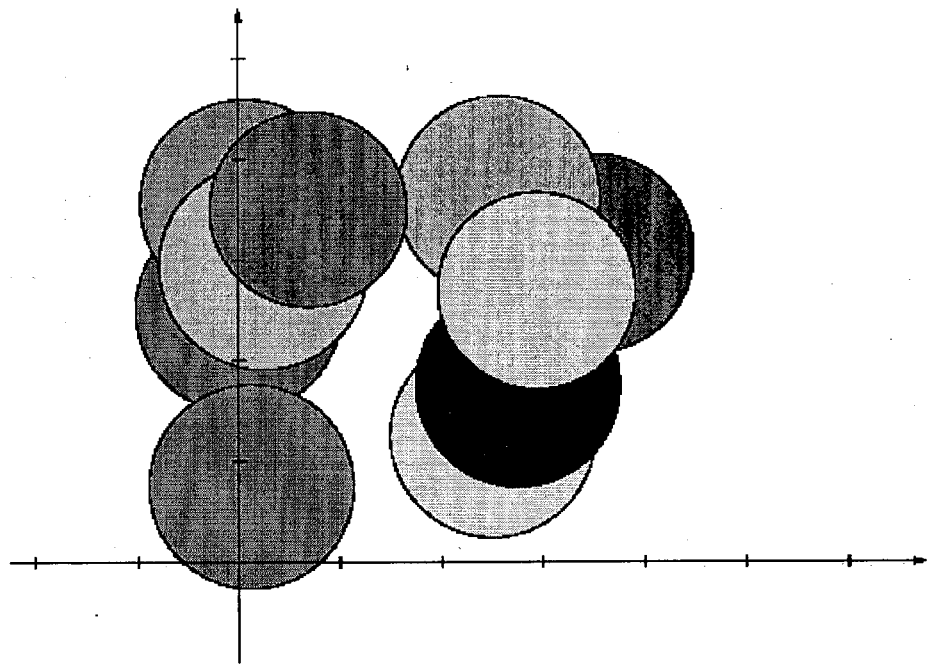

Figur 3 Probability distribution of 2D samples drawn from a set of ten different

*Non-parametric Probability Density Estimation*

Given a training set of samples with known class membership, non-parametric probability density estimation is the problem of constructing a PDF, that approximates the real PDF characterizing the classes without assuming anything about this function other than it exists.

*Histogram Rules*

The simplest approach to non-parametric density estimation is to divide the feature space into volumes $v$ of size $h^D$, where h is the side length of a D-dimensional hypercube. The likelihood of a given test sample, $\vec{x}$, can then be computed by identifying the volume, $v(\vec{x})$, to which it belongs, and computing the relative number of training samples that fall in this volume:

$$\hat{p}(\vec{x}) = \frac{n(v(\vec{x}))}{Nh^D}$$ ← Equation: 1.31 where $n(v(\vec{x}))$ is the number of samples that fall in the volume, $v(\vec{x})$, to which $\vec{x}$ belongs, and $N$ the total number of samples in the training set. 1.2.2 k-Nearest Neighbour.

Nearest neighbour PDF estimation removes the problem of selecting the parameter h by letting the sizes of the different volumes vary so that a fixed number of training samples (k) fall in each volume. The result is a so called Voroni partition (tessellation) of the feature space. An example (k = 1) is given in figure 4

Like the histogram rule, however, the probability density estimate is discrete:

two neighbouring samples on different sides of a cell boundary generally have different likelihoods, despite the fact that the distance between them may be

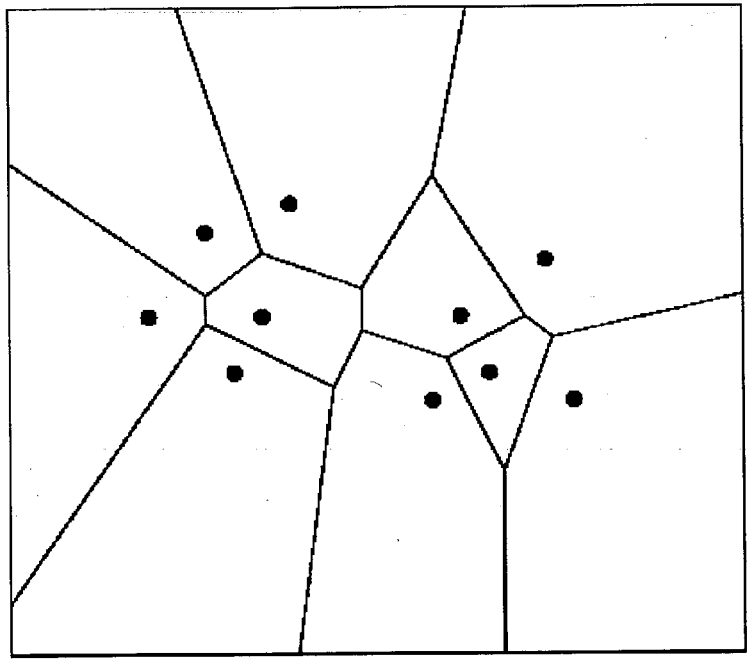

Figur 4: Voroni partition of the feature space resulting from a 1-nearest neighbour Rule arbitrarily small. The Voroni partition also has a boundary problem, because some cells may have an infinite volume, which means that samples falling in these cells have an estimated likelihood of zero.

*Kernel Functions*

An alternative generalisation of the histogram rule is to compute $\hat{p}(\vec{x})$ as a sum of kernel functions (Hand 1982):

$$\hat{p}(\vec{x}) = \frac{1}{N} \sum_{i=1}^{N} \frac{1}{h^D} K\left(\frac{\vec{x} - \vec{\mu}_i}{h}\right) \quad \text{Equation: 1.32}$$

The shape of the kernel $K(\vec{x})$ determines the characteristics of $\hat{p}(\vec{x})$. For instance a uniform kernel $$K(\vec{x}) = \begin{cases} 1 & \text{if } \vec{x} \in [-1; 1]^D \\ 0 & \text{otherwise} \end{cases} \quad \text{Equation: 1.33}$$

essentially leads to the histogram rule, whereas if $K(\vec{x})$ is a continuous function then $\hat{p}(\vec{x})$ is continuous as well. Gaussian kernels are a popular choice:

$$K(\vec{x}) = \frac{1}{\sqrt{2\pi}} \exp\left(-0.5 \sum_{i=1}^{D} x_i^2\right) \quad \text{Equation: 1.34}$$

Since $\hat{p}(\vec{x})$ approximates a PDF, it is convenient to require $$\int_{\vec{x}} K(\vec{x}) d\vec{x} = 1 \quad \text{Equation: 1.35}$$

$$K(\vec{x}) \geq 0, \forall \vec{x} \quad \text{Equation: 1.36}$$

because this automatically means that $\hat{p}(\vec{x})$ is a PDF.

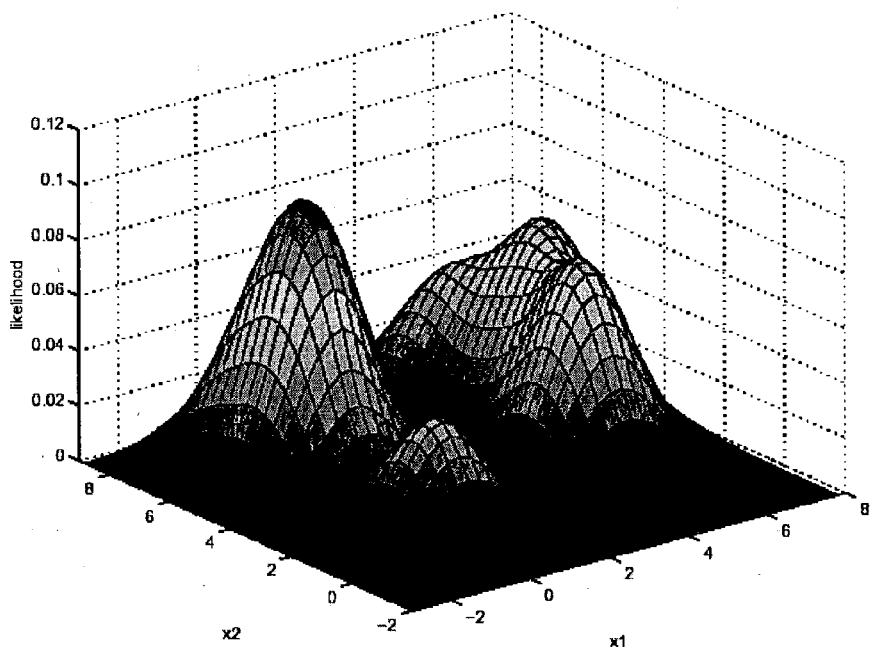

Figure 5: Likely Hood

Likely hood

Figure 5: Kernel estimate of the density function corresponding to figure 3 The kernel functions are generally placed non-uniformly in the feature space. Hence, as opposed to the simple histogram rule, some regions of the feature space are not "modelled" at all, and in others - where the density function is complicated - several kernel functions may overlap in order to model the density.

For instance, to approximate the density function shown in figure 3, it would be reasonable to use 10 kernels, with the centers corresponding to the center of each of the circular regions into which samples of a specific speaker fall. In this case h should reasonably correspond to the standard deviation of a given speakers data. An example of this is shown in figure 1.5, where Gaussian kernels have been used.

*Non-parametric Classification*

The purpose of estimating PDF's is to be able to compute a postheory probabilities, which can be used in decision rule 1.6. It is possible, however, to implement 1.6 directly, without this intermediate step. The way to do this is, basically, to partition the feature space into regions and label each region according to which class samples falling in this region (probably) belong to.

It is not hard to see how the k-Nearest Neighbour rule can be used for classification: simply label each Voroni cell according to which class the majority of the k samples in the cell belong. The resulting decision surfaces will be piece wise linear.

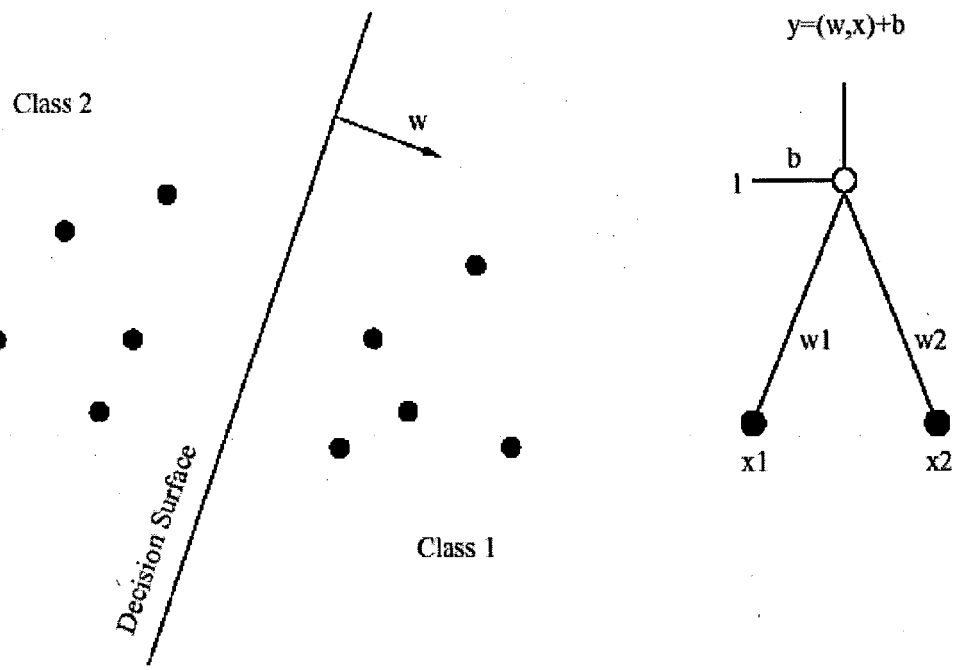

Figur 6: The perceptron (right) forms a hyper plane and classifies samples according to which side of the hyper plane they fall.

Classifiers can also be based on kernel functions. In this case the requirements to the kernel functions K() are less restrictive, because the constraints of a PDF do not have to be fulfilled. The Radial Basis Function (RBF) network is an example of a classifier based on kernel functions.

Basis Function Radius Maximisation

For RBF networks a structure can be imposed on the basis functions by considering the radii of the basis functions:

$$B(\vec{x}) = K\left(\left|\frac{\vec{x} - \vec{\mu}}{h}\right|\right) \quad \longleftarrow \quad \text{Equation: 1.59}$$

the smaller $h$ is the more "spiked", is the basis function. A spiked basis function is only sensitive to a very small region of feature space and may well signify over training. Wide basis functions ($h$ large) cover a large volume of the feature space; the larger h is the more the basis function resembles a simple bias which is always active. Hence, a network trained to have large radii is more likely to be able to generalise; the radii should be expanded to the point where it does not significantly impair the classification performance on the training set.

Classifier Ensembles

It is a problem for many models - in particular neural networks - with even just a limited complexity, that the training algorithms used for estimating their parameters are unable to determine the global minimum of the optimization criteria, but only succeeds in determining a local minimum. For this reason it can be useful to train several classifiers on the same data, and use these networks to create a new "super" classifier. The combination of different networks can not easily be done in the parameter domain, but networks representing different local minima are likely to model different parts of the problem, and a classifier defined as the average output of the individual classifiers will in general perform better than any of the individual classifiers: if the individual mean square error rates (equation 1.40) of $N$ classifiers is denoted, $$E_1, \ldots, E_N$$

t can be shown that the expected mean square error rate of the ensemble of classifiers is given by (Perrone and Cooper 1994):

$$E_{ensemble} = \frac{1}{N^2} \sum_{i=1}^{N} E_i \qquad \longleftarrow \text{Equation: 1.60}$$

provided the networks make errors independently. Hence, as long as the errors are uncorrelated, the performance of the classifier ensemble can be improved by adding more networks: the mean square error rate is cut in half each time the number of networks is doubled.

For perceptron type models, networks representing different local minima can be created simply by initializing the weights differently (Hansen and Salamon 1990; Battiti and Colla 1994). In Benediktsson et al. (1997) individual networks (perceptrons) are trained on data that has been transformed using different data transforms. Ji and Ma (1997) propose an algorithm specifically for selecting and combining weak classifiers (perceptrons).

Speaker Verification

Speaker verification and object handling in a randomized environment is a pattern recognition problem, and conceptually it is a very simple, since only two classes (patterns) need to be discriminated: target speakers or object and impostors. However, it is not easy to separate the two classes in the feature space. The class distributions are complex and must in practice be modelled using non-parametric techniques. Neural networks are attractive classifiers for problems of this kind: their discriminative training schemes enable them to focus the modelling on the regions of feature space that discriminate speakers or objects well.

A problem with many training or object learning algorithms, however, is that they are unable to guarantee optimal values of the model parameters. In this case structural risk minimization techniques can be used for placing constraints on the models that enhance their ability to generalize. A different approach to the problem with -sub-optimal- parameters is to use ensemble techniques: An ensemble of simple sub-optimal classifiers can be combined to form a new more powerful and robust classifier. Ensemble methods are attractive, because the error rate of the classifier ensemble, in principle, is inversely proportional to the number of ensemble members.

Appendix 2: Object Analysis Exemplified By RBF Based Phoneme Modeling

This example presents a classifier architecture, which can be applied for speaker verification at the event level, however it is to be viewed as example of a method that could be used for any given object data type. The classifier -a RBF network - is itself not ableto identify the events on which it operates and relies on the feature extractionprocess to do this. Figure 1.1 shows the classifier architecture schematically.Hidden Markov Models are used for segmenting the speech signal. A hidden Markov phoneme model, models the phoneme segments as a mixture of normaldistributions, where the means and covariances of the mixtures change at discrete points in time: at the state transitions. The discrete changes should ideally be continuous, but this is difficult to model.

After the phoneme segments have been identified, a new feature extraction is performed (section 1.1), whereby each individual phoneme segment is re-presented by a single vector of features. A feature vector representing an entirephoneme observation will here be referred to as a phoneme vector:

$$(\vec{\phi})$$

When the phoneme vectors have been extracted, the signal no longer contains time information; the fact that the phoneme vectors were measured sequentially over a period of time is irrelevant and contains no information about the speaker
identity. Further[1] the binary form of the voice print is *"created"* on a (true) random utterance model, which makes the binary object entirely unique. What this essentially means is that the vector model becomes a random vector$n$ The basic feature representation used here is in terms of filter bank energies and the phoneme vectors therefore need to be normalised in order to eliminate the signal gain (section 1.2). Following this they are subjected to a transformation 1 :

$$\vec{\vartheta} = T(\vec{\phi})$$

before finally being passed as input to the RBFnetwork, which computes the speaker probability:

$$P(I|\vec{\vartheta})$$

Frame Selection

Phoneme durations are a function of phoneme context, overall speech tempo and other factors; phoneme durations are highly variable. For a static modelling approach it is necessary to represent the phonemes by a fixed number of features. This can be done by using the Markov segmentation, where each phoneme is segmented into a number of sub-segments corresponding to the different emitting Markov states in the phoneme model. Possible representation schemes are:

1. Compute a new "variable" frame segmentation (and speech parameterisation), where the new frame length is adjusted to be an integer fraction of the total phoneme segment. Computationally this may be relatively expensive, but the advantage is that the entire phoneme segment is used.

2. Select a fixed number ($N$) of the existing frames as representatives of the phoneme segment. Several frame selection strategies may be considered:

a. Linear selection: select $N$ linearly spaced frames from the phoneme segment.
    b. Sub-segment selection: select one frame from each sub-honeme segment. In order to promote homogeneity of representation, the selection should be done consistently; e.g. by always selecting the center frames in each sub-phoneme segment modelled by separate HMM states. This is motivated by the hypothesis that center frames represent the same point in the "moving average" transition which the speech signal undergoes in the phoneme segment.
    c. Maximum Likelihood Selection: select the frame from each sub-phoneme segment that has the highest likelihood.

After the relevant frames have been identified, the corresponding feature vectors are "concatenated" to form one long vector.

Selection schemes 2A and 2B are quite similar; it has here been chosen to use 2B as the frame selection strategy, because in connection with ensemble methods (see section 2.7) variations in the frame selection strategy can be used for generating "different" phoneme models for the same phoneme. Selection scheme 2B can easily be varied by selecting, e.g. the right or left most frames in each sub segment instead of the center frame.

Normalisation

A problem with the filter bank representation of the speech signal is that the signal gain is not well controlled. The signal gain depends on the speakers speaking level, the distance to the microphone, the angle between the mouth and the microphone and the recording equipment. This effectively means that the absolute gain cannot be used for speaker recognition, and must be normalised. As is usual for speech processing, a logarithmic filter bank representation is used here. This means that the logarithm of the energy output from each filter

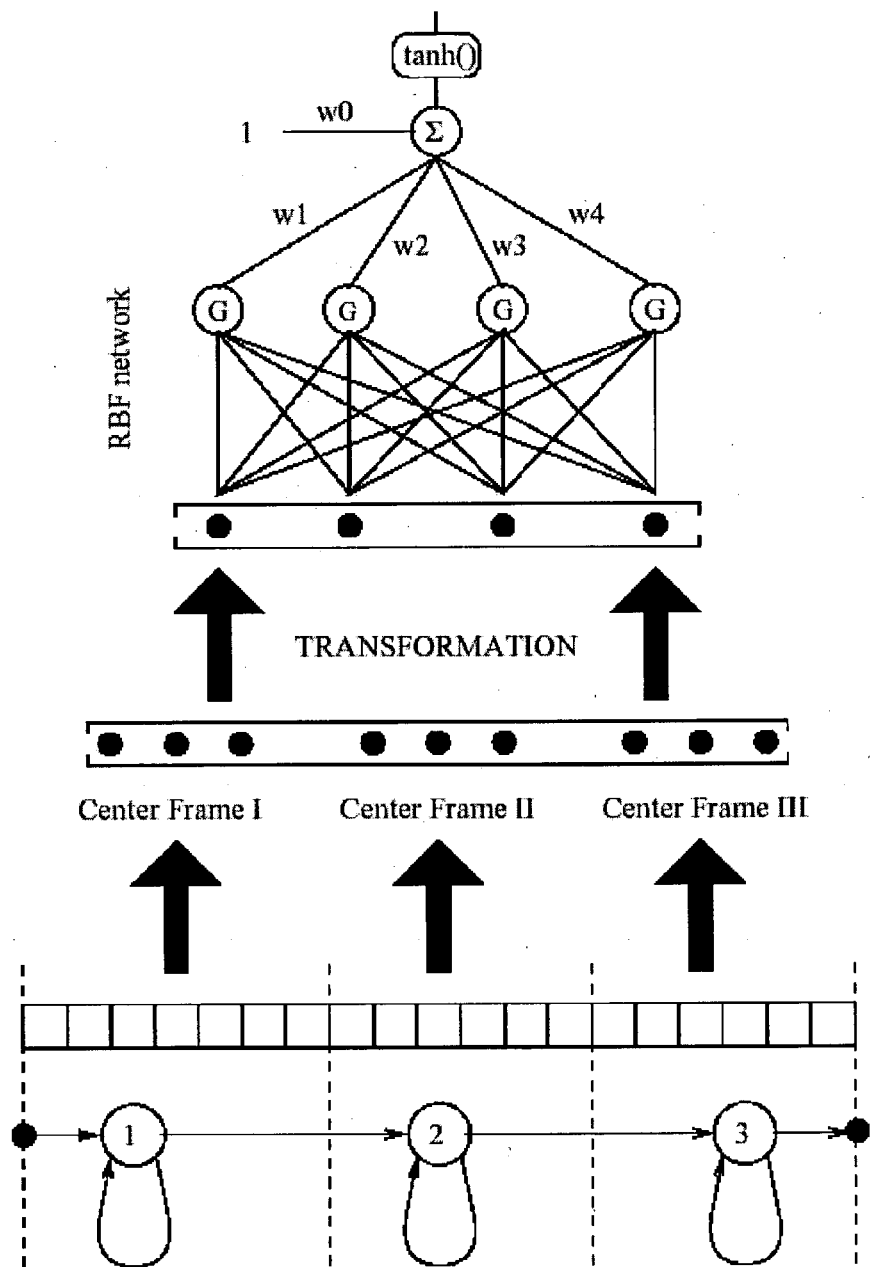
Figur 7: RBF network
bank is used. Energy outputs below one are discarded; they most likely represent noise and due to the singular behaviour$^2$ of the log function, it is best not to model these energies.

In the logarithmic energy domain, the gain factor becomes an additive bias:

$$\log(S\vec{x}) = \log(S) + \log\vec{x} \quad \longleftarrow \text{Equation: 1}$$

Taking the log() of a vector here means that the log() function is applied to every vector element. Likewise, addition (multiplication) of a scalar and a vector means that the scaler is added (multiplied) to every vector element. Since scale is not relevant, phoneme vectors are assumed to have norm 1:

$$\|\vec{x}\| = \sqrt{\sum_{i=1}^{D} x_i^2} = 1 \quad \longleftarrow \text{Equation: 2}$$

after scaling the norm is $$\|S\vec{x}\| = S\sqrt{\sum_{i=1}^{D} x_i^2} = S \quad \longleftarrow \text{Equation: 3}$$

The gain can therefore be removed by computing the norm of, $$\|S\vec{x}\|$$

and subtracting the logarithmic norm from the filter banks put out:

$$\vec{y} = \log(S\vec{x}) - \log\|S\vec{x}\| = \log\vec{x} \quad \longleftarrow \text{Equation: 4}$$

To further homogenise the data, the vector:

$$\vec{y}$$

is here normalised to have norm 1

If an independent gain factor is associated with each filter bank channel, this results in a bias *vector* being added to the feature vectors. This type of gain can
not be eliminated by looking at one particular feature vector, but can instead be compensated for by estimating the average energy output over one utterance.

Bias removal is a useful heuristic in practise, but is actually a non-trivial problem because the bias which is estimated depends on the phonetic content of the utterance (Zhao 1994). This heuristic is not used here.

RBF Training:

The normalised phoneme vectors are subjected to a transformation before being input to a phoneme, ($\Phi$)

and speaker dependent RBF network, which is used for computing the function:

$$g_\Phi(\vec{\phi}) = \tanh\left[S \sum_i w_i u_i(\vec{\phi})\right]$$ ← Equation: 5 where S is the activation function scale and $$u_i(\vec{\phi}) = \exp\left(-\frac{C_i}{2} \sum_{k=1}^{D} \left(\frac{x_k - \mu_{ik}}{\sigma_{ik}}\right)^2\right)$$ ← Equation: 6 were $D$ is the dimensionality of the input vectors. The basis function scales, $C_i$, and the variances, $$\vec{\sigma}^2$$

, are constrained by:

$$E = \sum_{p=1}^{N} \frac{1}{2}\left(g(\vec{\phi}_p) - t_p\right)^2$$ ← Equation: 7 which ensures that the network will approximate the optimal Bayes Discriminant function:

$$g_{\Phi,\text{Bayes}}(\vec{\phi}) = P(I|\vec{\phi}) - P(\neg I|\vec{\phi})$$

A number of techniques can be used for this (Press et al. 1995; Bishop 1995). In this case, the simplest approach is to use gradient descent, because the gradient here is easy to compute; because of the size of the network the training algorithm converges so fast that conjugate gradient, or Quasi-Newton methods are not required. Gradient descent is an iterative technique, where the parameters in iteration $t$ are updated according to:

$$w_i^{(t)} = w_i^{(t-1)} - \eta(t)\frac{\partial E}{\partial w_i} \quad \text{Equation: 8}$$

$$\mu_{ik}^{(t)} = \mu_{ik}^{(t-1)} - \eta(t)\frac{\partial E}{\partial \mu_{ik}} \quad \text{Equation: 9}$$

$$\sigma_{ik}^{(t)} = \sigma_{ik}^{(t-1)} - \eta(t)\frac{\partial E}{\partial \sigma_{ik}} \quad \text{Equation: 10}$$

$$C_i^{(t)} = C_i^{(t-1)} - \eta(t)\frac{\partial E}{\partial C_i} \quad \text{Equation: 11}$$

$$S^{(t)} = S^{(t-1)} - \eta(t)\frac{\partial E}{\partial S} \quad \text{Equation: 12}$$

where $$\sum_{t=1}^{\infty} \eta(t) = \infty \wedge \sum_{t=1}^{\infty} \eta^2(t) < \infty \quad \text{Equation: 13}$$

and $$\frac{\partial E}{\partial w_i} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} u_i(\vec{\phi}_p') \quad \text{Equation: 14}$$

$$\frac{\partial E}{\partial \mu_{ik}} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} \left(\frac{x_{kp} - \mu_{ik}}{\sigma_{ik}^2}\right) C_i w_i u_i(\vec{\phi}_p')$$

$$\frac{\partial E}{\partial w_i} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} u_i(\vec{\phi}_p') \quad \text{Equation: 14}$$

$$\frac{\partial E}{\partial \mu_{ik}} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} \left(\frac{x_{kp} - \mu_{ik}}{\sigma_{ik}^2}\right) C_i w_i u_i(\vec{\phi}_p) \quad \text{Equation: 15}$$

$$\frac{\partial E}{\partial \sigma_{ik}^2} = \sum_{p=1}^{N}\left(g(\vec{\phi}_p') - t_p\right)\frac{\partial \tanh(\Upsilon(\vec{\phi}_p'))}{\partial \Upsilon(\vec{\phi}_p)}\left(\frac{(x_{kp}-\mu_{ik})^2}{\sigma_{ik}^4}\right)C_i w_i u_i(\vec{\phi}_p')$$ Equation: 16

$$\frac{\partial E}{\partial C_i} = \sum_{p=1}^{N}\left(g(\vec{\phi}_p') - t_p\right)\frac{\partial \tanh(\Upsilon(\vec{\phi}_p'))}{\partial \Upsilon(\vec{\phi}_p)}\left(-\sum_{k=1}^{D}\left[\frac{x_k - \mu_k}{\sigma_i}\right]^2\right)Sw_i u_i(\vec{\phi}')$$ Equation: 17

$$\frac{\partial E}{\partial S} = \sum_{p=1}^{N}\left(g(\vec{\phi}_p') - t_p\right)\frac{\partial \tanh(\Upsilon(\vec{\phi}_p'))}{\partial \Upsilon(\vec{\phi}_p)}S\sum_i w_i u_i(\vec{\phi}')$$ Equation: 18 and $$\frac{\partial \tanh(\Upsilon(\vec{\phi}'))}{\partial \Upsilon(\vec{\phi}')} = \frac{4}{\left(\exp(\Upsilon(\vec{\phi}')) + \exp(-\Upsilon(\vec{\phi}'))\right)^2}$$

$$\Upsilon(\vec{\phi}') = \sum_i w_i u_i(\vec{\phi}')$$

The gradients are here shown to be computed as the summation over all the training samples. In order to speed the training process up, this requirement is usually relaxed so that subsets or even individual samples are used as the basis for computing the gradient and updating the parameters. This is reasonable if the training data is "periodic"[1].

The form of the gradient equations are relatively easy to understand. The gradient equations have some common terms and some specific terms.

Common Terms All gradients include the error term, $$(g(\vec{\phi}_p') - t_p)$$

which is zero unless samples are misclassified. Hence, the parameters are not updated if samples are classified correctly. In case of misclassifications, the error term is positive if the target output is negative and negative if the target output is positive. The error term can be given a class dependent weight in order to emphasise one class error rate over the other. For instance, target speaker patterns may be given a higher weight, because the training set contains relatively

---

[1] The period should here be at least two so that a target speaker pattern and an impostor speaker pattern is presented in each period. More generally the –period- could be increased so that each update is based on a set of distinct phoneme observations -for instance corresponding to different phoneme contexts. If this this is not done the learning can tend to be "erratic": the network becomes biased to the most recently presented training token and –forgets- some of the information it has previously been taught.

few target speaker patterns, and hence the classifier is more likely to "over learn" these patterns than it is the abundant impostor speaker patterns.

A second term which is present in all gradients is, $$\frac{\partial \tanh(\Upsilon(\vec{\phi}_p))}{\partial \Upsilon(\vec{\phi}_p)},$$

This term has the effect of preventing parameter changes if, $$|\Upsilon(\vec{\phi}_p)| \gg \dot{0}$$

i.e. if the parameters, $$\vec{\phi}_p,$$

is misclassified by a large margin. Intuitively this is useful if the training set contains outliers, which can not be correctly classified by a small change of the existing parameters.

A third term shared by all gradients is the basis function output, $$u_i(\vec{\phi}),$$

which is a value between zero and one. Hence, the parameters related to a given basis function are not updated unless the sample, $$\vec{\phi},$$

falls in the hyper elliptical region where, $$u_i(\vec{\phi})$$

is activated.

Weights
Weights are updated so that for misclassified samples, the weight is increased if the target output is positive and decreased otherwise. In the final classifier, basis functions with a positive weight represent class $l$ and basis functions with a negative weight represent class $\bar{l}$.

Means
Basis functions representing the target class, $$(\text{sign}(w_i) = \text{sign}(t_p)),$$

are moved closer to the misclassified sample and basis functions representing the opposite class are moved away. The step size depends on how "activated" the individual basis functions, $$u_i(\vec{\phi}_p)$$

are, the radius of the basis functions, $$C_i, \vec{\sigma}^2$$

the distance to the misclassified point and as usual the size of the classification error.

Basis Function Scales

The width of the basis functions are controlled by $$C_i$$

For basis functions representing the target class, $$C_i$$

is decreased (the width is increased) so as to include that sample in the sphere of influence of those basis functions. For basis functions representing the opposite class, $$C_i$$

is increased (the width is decreased) so as to exclude the sample from the sphere of influence of these basis functions.

Updating the variances has the same effect of widening the width of the basis functions for the basis functions representing the target class and decreasing the width of the basis functions representing the opposite class.

Variances

The variances, $$\vec{\sigma}^{-2}$$

specify the relative variance of the individual feature elements. The variances do not necessarily correspond to the statistical variances of the individual elements, but rather to the importance of the features. Feature components that have little importance for the classification, may be given a large "variance" so that they have relatively less influence on the activation of the basis function.

Activation Function Scale

The scale of the activation function $S$ is increased for samples on the correct side of the hyper plane implemented by the perceptron, and decreased for samples on the incorrect side. The classification of samples, however, is not improved or changed by updating $S$. Consequently the learning algorithm does not change the value of $S$ for the purpose of minimising the error rate. The activation function scale may, however, be adjusted subsequently in order to improve the RBF model as a probability estimator.

Initialisation

The iterative training algorithm requires initial estimates of the network parameters. The parameters of a RBF network are much easier to interpret than the weights of a MLP, and consequently it is not necessary to initialise using random values. Specifically, a clustering algorithm can be used for computing reasonable basis functions representing respectively the target speaker and the cohort speakers. The weights corresponding to target speaker basis functions can be initialised to $$w_i^{(I)} = \frac{N_i^{(I)}}{\sum_j N_j^{(I)}} \quad \text{Equation: 19}$$

where $$N_i^{(I)}$$

is the number of training samples falling in the $i$th target speaker cluster. Likewise the weights corresponding to cohort speaker basis functions can be initialised to:

$$w_i^{(\neg I)} = \frac{N_i^{(\neg I)}}{\sum_j N_j^{(\neg I)}} \quad \text{Equation: 20}$$

The bias weight, $$(w_0)$$

should be initialised to a value less than zero: if the network is presented with a phoneme vector that does not activate any basis functions, the classification should be $\neg I$ (rejection).

The convergence of the training algorithm depends critically on the initialisation of the basis functions, but is in practise insensitive to the weight initialisation. Hence, the weights may simply be initialised to random values (in the range [-1; 1]).

Posterior Probabilities

The RBF networks are trained to minimise the mean square error rate on the training set (equation 1.9). Minimisation of this error criteria causes the RBF network to approximate the optimal (Bayes) discriminant function given by:

$$g_{Bayes}(\vec{\phi}) = P(I|\vec{\phi}) - P(\neg I|\vec{\phi}) \quad \text{Equation: 21}$$

This important fact has been proved by several authors (Ruck et al. 1990;

Richard and Lippmann 1991; Gish 1990a; Ney 1991).

Even though $g_\Phi(\vec{\phi})$ approximates the optimal discriminant function, it still remains to answer whether or not it, in principle, is capable of exactly implementing this function. The squashing function, tanh(), present in the output, of the RBF network limits the number of mappings from $R^D$ to [-1;1] that can be implemented. For instance, a general function such as $$h(\vec{\phi}) = a\tanh(\Upsilon_1(\vec{\phi})) + b\tanh(\Upsilon_2(\vec{\phi}))$$

can not be implemented by an RBF network of the above type, even if it had an infinite number of basis functions. It would be unfortunate if $g_{Bayes}(\vec{\phi})$ was of this type, because that would mean that it could not, even in principle, be computed.

The underlying function $\Upsilon(\vec{\phi})$ is, however, very flexible. By application of the Stone-Weierstrass Theorem it can in fact be shown that this function can approximate any mapping from $R^D$ to $R^1$ arbitrarily well (Hornik 1989; Cotter 1990). Since tanh(x) is a monotone function which can take on any value in the interval [0;1], it is up to          to approximate the function:

$$\Upsilon(\vec{\phi}) = \operatorname{arctanh}\left(P(I|\vec{\phi}) - P(I|\vec{\phi})\right) \qquad \longleftarrow \text{Equation: 22}$$

The choice of tanh(x) as activation function is, however, not arbitrary. Consider, for instance, that in a 2-class classification problem, the two classes to be discriminated are characterised by Gaussian probability distributions:

$$p(\vec{\phi}|I) = \frac{1}{(2\pi)^{D/2}|U_I|^{1/2}} \exp\left(-\frac{1}{2}(\vec{\phi}-\vec{\mu}_I)^T U_I^{-1}(\vec{\phi}-\vec{\mu}_I)\right) \qquad \longleftarrow \text{Equation: 23}$$

$$p(\vec{\phi}|\neg I) = \frac{1}{(2\pi)^{D/2}|U_{\neg I}|^{1/2}} \exp\left(-\frac{1}{2}(\vec{\phi}-\vec{\mu}_{\neg I})^T U_{\neg I}^{-1}(\vec{\phi}-\vec{\mu}_{\neg I})\right) \qquad \longleftarrow \text{Equation: 24}$$

According to Bayes rule, the a posteriori probability of class *I* is given by:

$$P(I|\vec{\phi}) = \frac{p(\vec{\phi}|I)P(I)}{p(\vec{\phi}|I)P(I) + p(\vec{\phi}|\neg I)P(\neg I)}$$

$$= \frac{1}{1 + \frac{P(\neg I)p(\vec{\phi}|\neg I)}{P(I)p(\vec{\phi}|I)}}$$

$$= \frac{1}{1 + \exp(-2a)}$$

$$= \frac{1}{2}\tanh(a) + \frac{1}{2}$$

← Equation: 25 where $$-2a = \ln\left(\frac{P(I)|\mathbf{U}_I|^{1/2}}{P(\neg I)|\mathbf{U}_{\neg I}|^{1/2}}\right)$$
$$+ 0.5(\vec{\phi} - \vec{\mu}_I)^{\mathrm{T}}\mathbf{U}_I^{-1}(\vec{\phi} - \vec{\mu}_I))$$
$$- 0.5(\vec{\phi} - \vec{\mu}_{\neg I})^{\mathrm{T}}\mathbf{U}_{\neg I}^{-1}(\vec{\phi} - \vec{\mu}_{\neg I})$$

← Equation: 26

This is exactly the form we would like it to have, since if the RBF network approximates the discriminant function:

$$g(\vec{\phi}) = P(I|\vec{\phi}) - P(\neg I|\vec{\phi})$$ ← Equation: 27 then we have (using 2.5):

$$P(I|\vec{\phi}) = \frac{1}{2}g(\vec{\phi}) + \frac{1}{2}$$ ← Equation: 28

$$P(\neg I|\vec{\phi}) = -\frac{1}{2}g(\vec{\phi}) + \frac{1}{2}$$ ← Equation: 29 where $$g(\vec{\phi}) = \tanh(\Upsilon(\vec{\phi}))$$ ← Equation: 30

Adjusting the Activation Function Scale

As probability estimates, equations 33 and 34, are somewhat crude. If a steep activation function (large activation function scale S) is used, the output is essentially a binary variable. The *activation function scale (S)* may be adjusted by first estimating the empirical activation function from - ideally - an independent test set:

$$G(\vec{\phi}) = \frac{1}{N_I} \sum_{i=1}^{N_I} \Theta\left(\Upsilon(\vec{\phi}) - \Upsilon(\vec{\phi}_i)\right) - \left[1 - \frac{1}{N_{\neg I}} \sum_{j=1}^{N_{\neg I}} \Theta\left(\Upsilon(\vec{\phi}) - \Upsilon(\vec{\phi}_j)\right)\right]$$

$$= \frac{1}{N_I} \sum_{i=1}^{N_I} \Theta\left(\Upsilon(\vec{\phi}) - \Upsilon(\vec{\phi}_i)\right) - \frac{1}{N_{\neg I}} \sum_{j=1}^{N_{\neg I}} \Theta\left(\Upsilon(\vec{\phi}_j) - \Upsilon(\vec{\phi})\right)$$

← Equation: 31 where $\Theta(x)$ is a step function:

$$\Theta(x) = \begin{cases} 1 & \text{if } x \geq 0 \\ 0 & \text{otherwise} \end{cases}$$ ← Equation: 32 and where $\vec{\phi}_{1,I}, \ldots, \vec{\phi}_{N_I,I}$ and $\vec{\phi}_{1,\neg I}, \ldots, \vec{\phi}_{N_{\neg I},\neg I}$ are the phoneme vectors in the independent test set. Now the value, $G(\Upsilon_{P_I})$, for which $P(I) = P_I$ is identified (i.e. $G(\Upsilon_{P_I}) = 2P(I) - 1$)) and the activation function scale adjusted so that $$\tanh(S''\Upsilon_{P_I}) = P_I$$ ← Equation: 33

This is done by choosing:

$$S'' = \frac{\text{arctanh}(P_I)}{\Upsilon_{P_I}}$$ ← Equation: 34 where $$\operatorname{arctanh}(x) = \frac{1}{2}\ln\left(\frac{1+x}{1-x}\right)$$ ← Equation: 35

An alternative, and potentially more accurate approach is to simply replace tanh() by the empirical activation function (equation 36).

An alternative, and potentially more accurate approach is to simply replace tanh() by the empirical activation function (equation 36).

Adjusting the Bias

Training a RBF network from a limited training set is diffcult. The problem is usually not the impostor part of the training set, but rather the target speaker part. This, of course, can in itself make it diffcult to train a speaker model, but in particular it makes it diffcult to adjust the model so that it achieves the desired balance between the TA and IR errors. The balance can to some extent be controlled by various training parameters, eg. by scaling the error term $(g(\vec{\phi}_p) - t_p)$ differently for target speaker samples and cohort speaker samples, by presenting target/cohort patterns with different frequencies, or by the way the models are constrained using weight/radii penalties. These means are, however, fairly crude, and a more accurate approach is to adjusting the bias $(w_0)$ of the RBF models. This can be done by estimating the mean and variance of $\Upsilon(\vec{\phi})$ given the target speaker, $\Upsilon(\vec{\phi}|I)$, and given the impostor speakers, $\Upsilon(\vec{\phi}|\neg I)$.
Assuming a Gaussian distribution of these two variables, the bias is reduced $(b_{new} = b_{old} - \Delta b)$, so that, $$\frac{\mathcal{N}\left(\Upsilon(\vec{\phi}); \overline{\Upsilon(\vec{\phi}|I)}, \operatorname{var}(\Upsilon(\vec{\phi}|I))\right)}{\mathcal{N}\left(\Upsilon(\vec{\phi}|\neg I); \overline{\Upsilon(\vec{\phi}|\neg I)}, \operatorname{var}(\Upsilon(\vec{\phi}|\neg I))\right)} = B$$ ← Equation: 36

This solution can be found by determining the roots of: ← Equation: 37

$$\left(\frac{1}{\sigma_2^2} - \frac{1}{\sigma_1^2}\right)x^2 + \left(\frac{2\mu_1}{\sigma_1^2} - \frac{2\mu_2}{\sigma_2^2}\right)x + \frac{\mu_2^2}{\sigma_2^2} - \frac{\mu_1^2}{\sigma_1^2} - 2\ln\left(\frac{\sigma_1}{\sigma_2}\right) - \ln B = 0$$

where the following shorthand was used:

← Equation: 38

$$x = \Upsilon(\vec{\phi})$$

$$\mu_1 = \overline{\Upsilon(\vec{\phi}|I)} \quad \longleftarrow \text{Equation: 39}$$

$$\mu_2 = \text{var}(\Upsilon(\vec{\phi}|I)) \quad \longleftarrow \text{Equation: 40}$$

For B = 1 this is the same equation as equation 1.26, (the example on object classification. The solution we are interested in is the one between $\Upsilon(\vec{\phi}|I)$ and $\Upsilon(\vec{\phi}|\neg I)$.

An alternative - if the Gaussian assumption is poor - is to use the empirical activation function (equation x.36). If a different balance, B, of errors is desired, the bias can be adjusted according to:

$$\frac{G(\Upsilon(\vec{\phi})) + 1}{-G(\Upsilon(\vec{\phi})) + 1} = B \quad \longleftarrow \text{Equation: 41}$$

$$\Updownarrow \quad \longleftarrow \text{Equation: 42}$$

$$G(\Upsilon(\vec{\phi})) = \frac{B-1}{B+1} \quad \longleftarrow \text{Equation: 43}$$

Hence, to adjust the odds ratio to have balance B, the solution, $\Delta b = \Upsilon(\vec{\phi})$, to equation 48 is determined and subtracted from the bias:

$$w_{0,\text{new}} = w_{0,\text{old}} - \Delta b$$

For $B = 1$ the equal error rate is approximated, for $B < 1$ the number of TA errors is minimised at the expense of the IR errors, and for $B > 1$ the IR errors are minimised at the expense of the TA errors.

Figure 8 shows an example where the class conditional empirical distribution functions, $$P(\Upsilon(\vec{\phi}|I))$$

and $$P(\Upsilon(\vec{\phi}|\neg I))$$

and the empirical activation function, $$G(\Upsilon(\vec{\phi}))$$

for a set of speaker models. The figure shows the functions both

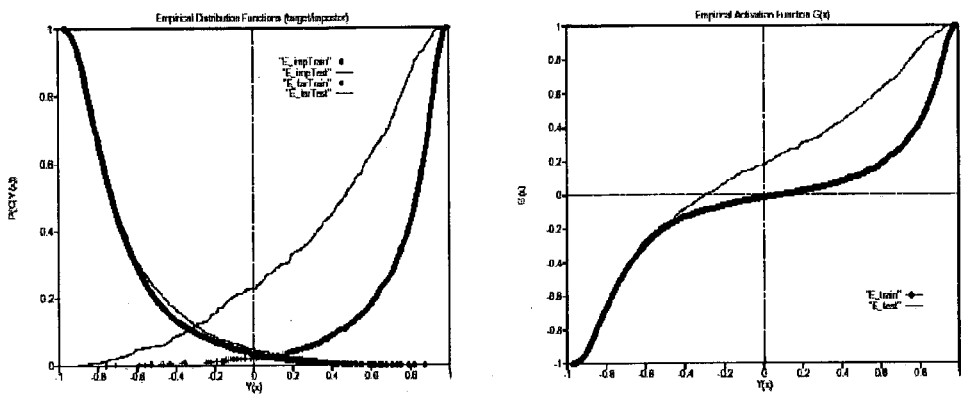

Figur 8 Empirical distribution functions

For the training data, respectively 1622 and 6488 local target speaker and impostor speaker decisions were used. For the test data, respectively 394 and 1576 local decisions were used.

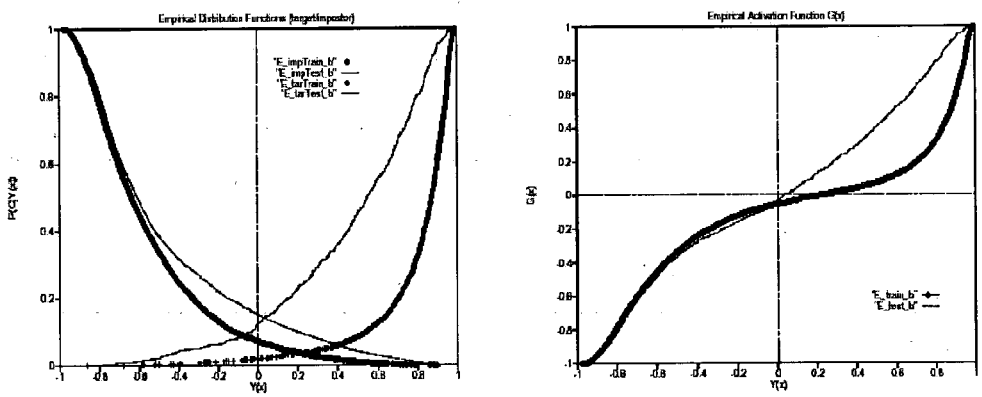

Figur 9 Empirical distribution functions after bias compensation for the training data and for the test data. For the training data the empirical activation function is approximately zero for $\Upsilon(\vec{\phi}) = 0$, but not for the test data (the speaker models are "overtrained"). Figure 9 shows the same functions as Figure 8, but after bias compensation.

In summary, a phoneme based speaker model has been described. The model uses HMM's as "feature extractors" that represent phoneme observations as fixed vectors (phoneme vectors) of spectral feature elements; this part of the model is speaker independent. The phoneme vectors are transformed and finally passed as input to a phoneme dependent RBF network, trained to estimate the speaker probability from the phoneme vectors. The speaker probability can be used directly for producing a (local) speaker verification decision, or it can be combined with other speaker probabilities estimated from other phoneme observations in order to produce a more robust decision. The input vector (phoneme) is only stated to exemplify what an object based i.e. verification could be. Any other type of biometric vectors could be used with training filters accordingly.

Appendix 3: Object Based Decision Making Exemplified By Speaker Verification

Object verification – or in this case speaker verification is a binary decision problem, and can therefore in the end be reduced to computing a score and verifying identity claims by determining whether or not the score is greater or less than a given threshold, $t$:

$$\text{Decide} \begin{cases} \text{accept} & \text{if score} > t \\ \text{reject} & \text{otherwise} \end{cases}$$

equation: 1

When computing this score or i.e. an object value, each phoneme segment in the speech signal makes a contribution (even when phonemes are not explicitly modelled). In a conventional text independent speaker verification algorithm, the contribution of the different phonemes to the overall score (e.g. utterance likelihood) is unknown; the overall score depends on the particular frequency with which the phonemes are represented in the test utterance, and on the duration of each phoneme segment.

This is clearly not optimal, since no regard is taken to the extent that local scores contributed by individual phoneme segments express speaker identity and the extent to which different phonemes express the same information about the speaker; e.g. a nasal and a vowel presumably represent information which is largely complimentary whereas two back vowels, say, represent highly correlated information about the speaker.

The algorithm described here has two parts: first phoneme segments are identified and the speaker identity modelled for each phoneme segment independently. The result of this is a number of local scores -one for each different phoneme in an utterance - which subsequently must be combined in order to produce a global verification decision or a class of object data.

Combining Scores

An RBF networks are trained to approximate the discriminant function:

$$g_\Phi(\vec{\phi'}) = P(I|\vec{\phi'}) - P(\neg I|\vec{\phi'})$$

equation: 2 where $$\vec{\phi'}$$

is a phoneme observation. Since:

$$P(I|\vec{\phi}) + P(\neg I|\vec{\phi}) = 1$$

equation: 3 we have $$P(I|\vec{\phi}) = \frac{1}{2}g_\Phi(\vec{\phi}) + \frac{1}{2}$$

$$P(\neg I|\vec{\phi}) = -\frac{1}{2}g_\Phi(\vec{\phi}) + \frac{1}{2}$$

equation: 4 & equation: 5 which can be used for implementing a decision rule for a single phoneme observation. When several independent phoneme observations are available, more robust decisions can be made by combining the local scores into a global score. Two basically different approaches can be followed: ensemble combination and probability combination.

Ensemble Combination

One approach to combining local verification scores is simply to "average" the local scores:

$$\text{score} = \frac{1}{\sum_{i=1}^{\#\Phi} \#\Phi_i} \sum_{i=1}^{\#\Phi} \sum_{j=1}^{\#\Phi_i} g_{\Phi_i}(\vec{\phi}_{ij})$$

equation: 6 where $$\#\Phi$$

is the number of different phonemes in the alphabet, $$\#\Phi_i$$

the number of observations of phoneme $\Phi_i$ and $\vec{\phi}_{ij}$ the $j$'th observation (phoneme vector) of phoneme $\Phi_i$. It is a characteristic of this scoring rule that for an increasing number of observations, the score will converge to a value in the range [-1; 1]; The magnitude is not directly affected by the number of observations.

Probability Combination

An alternative to ensemble combination is to exploit the fact that the networks compute a posteriori probabilities. When several independent observations, $\Phi^{(r)} = \vec{\phi}_1, \ldots, \vec{\phi}_r$ are made, the confidence of the classification is expected to rise. This can be expressed by defining the *odds ratio*:

$$\mathcal{R}(\Phi^{(r)}) = \prod_{i=1}^{r} \frac{P(I|\vec{\phi}_i')}{P(\neg I|\vec{\phi}_i')} = \prod_{i=1}^{r} \frac{g_\Phi(\vec{\phi}_i') + 1}{-g_\Phi(\vec{\phi}_i') + 1}$$

equation: 7 since $$P(I|\Phi^{(r)}) + P(\neg I|\Phi^{(r)}) = 1$$

equation: 8 it follows that $$P(I|\Phi^{(r)}) = \frac{1}{1 + \mathcal{R}^{-1}(\Phi^r)}$$

$$P(\neg I|\Phi^{(r)}) = \frac{1}{1 + \mathcal{R}(\Phi^r)}$$

equation: 9 & equation: 10

Hence, an alternative scoring strategy is to use $$\text{score} = P(I|\Phi^{(r)}) - P(\neg I|\Phi^{(r)})$$

equation: 11

It is a characteristic of this scoring rule that in practise it will converge to either -1 or +1 when more phoneme observations are added.

The difference between equation 6 and 11 is mainly the assumption about the independence of the observations. Suppose for a given phoneme vector, $(\vec{\phi}')$ the speaker probability is estimated to, say, $P(I|\vec{\phi}') = 0.7$ If equation 11 (probability combination) is used we assume that the probability is only 0.7 and not 1.0, because the observation $(\vec{\phi}')$ has been affected by "random" noise, whereas if equation 1.6 (ensemble combination) is used, we assume that a certain proportion of the impostor population is capable of producing phoneme vectors like $(\vec{\phi}')$.

This distinction is important, because noise can be "averaged" (derived) away, whereas obtaining more observations (of the same event) cannot be expected to improve the probability estimate, if the same impostor speakers are fundamentally able to produce the same phoneme vectors as the target speaker.

A problem with both equation 1.6 and 1.11 is, however, that the overall score will be dominated by the most frequently occurring phoneme. This is unreasonable to the extent that different phonemes can be regarded as different sources of speaker information (Olsen 1997b; Olsen 1996b).

In practise it is, however, possible to use equation 1.6 and 1.11 with good results, because "pathological" sentences that are dominated by a specific class of phonemes are not frequently occurring. Any reasonable sentence will typically have a broad selection of phonemes represented, but it should still not be left to chance how to weight the evidence provided by each phoneme observation.

Committee Machines

Each phoneme model can be regarded as a speaker verification expert given a specific type of information: observations of a specific phoneme. Since individual experts are assumed to model different "aspects" of the speaker, it makes sense to limit the influence each expert can have on the global score. One approach to this is to use either equation 1.6 or 1.11 for combining the local scores from the same expert into a phoneme level local score. A local binary decision - with an empirically known probability of being correct - can then be made for each phoneme represented in the test utterance:

$$D_L(\Phi_i) = \begin{cases} 1 & \text{if } P(I|\Phi_i) \geq 0.5 \\ -1 & \text{otherwise} \end{cases}$$

equation: 12

Following this approach, the simplest way of combining local decisions into a global decision, is by making a "majority" vote:

$$\text{score} = \sum_{i=1}^{\#\Phi} D_L(\Phi_i)$$

equation: 13

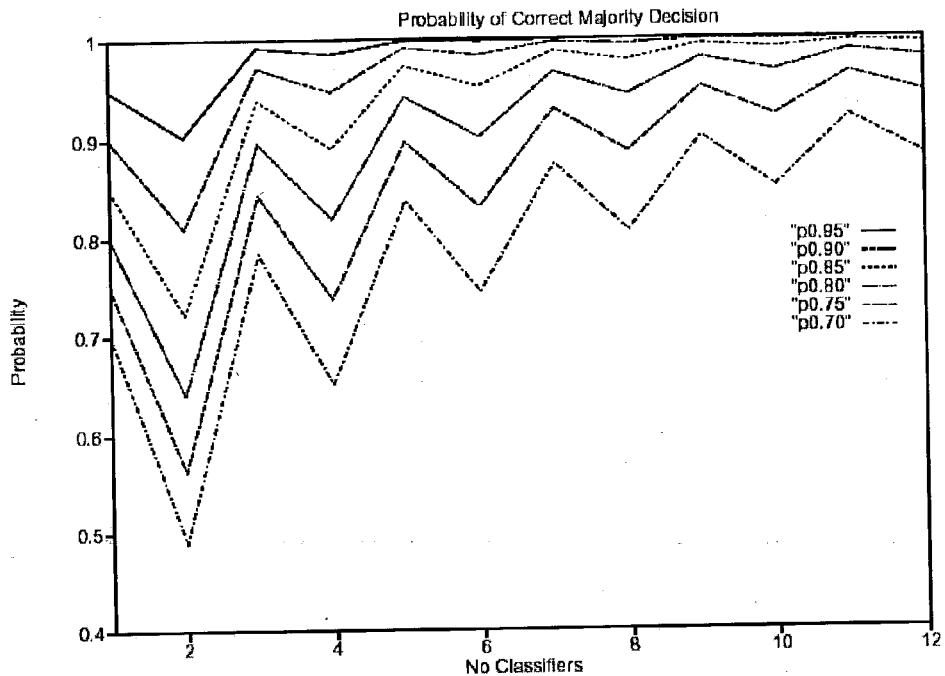

Figure: 1 The probability of a committee machine making a correct decision as a function of the number of committee members.

where $\#\Phi$ is the number of different phonemes represented in the test utterance. This type of global classifier is called a committee machine (Nilsson 1965; Mazurov et al. 1987).

If the individual decisions are independent and all have the same probability, $P$, of making a correct decision, the probability of the committee machine making a correct decision is given by:

$$P_{comm}(N) = \sum_{k=\lfloor N/2 \rfloor +1}^{N} \binom{N}{k} P^k (1-P)^{N-k}$$

equation: 14 where $N$ is the number of committee members. The probability function $P_{comm}(N)$ is shown in figure 1. The graph is "rippled" because for even $N$, a tie $(k = N/2)$ is counted as an error even though the error probability is actually only 50%. As long as the errors are uncorrelated, the performance of the committee machine can be improved by adding more members. Provided $P > 0.5$, the committee machine always performs better than the individual committee members.

This is not necessarily the case if the individual classifiers have different classification accuracies, but the model is nevertheless remarkably robust in this case. Assume, for instance, that three classifiers with individual accuracies $P1$, $P2$ and $P3$ are to be combined. The committee machine performs at least as well as the most accurate of the individual classifiers (say $P1$), provided:

$$P_1 < P_1P_2P_3 + P_1P_2(1-P_3) + P_1(1-P_2)P_3 + (1-P_1)P_2P_3$$

$$\Updownarrow$$

$$P_1 < \frac{P_2P_3}{1+2P_2P_3-P_2-P_3}$$

equation: 15 & equation: 16

For instance if *P2* = *P3* = 0.9, then *P1* must have an accuracy higher than 0.99 if it alone is supposed to be more accurate than the combination of *P1*, *P2* and *P3*.

Expert Weighting

Votes from different experts are not equally important; the different phoneme dependent speaker models have different accuracies. The basic voting scheme can therefore be improved by weighting the individual votes differently. A "static" approach to this would be to simply weight each vote by the expected equal accuracy rate, $A_{EER}$ = 1 - EER, of the corresponding classifier:

$$D_L(\Phi_i) = \begin{cases} A_{EER} & \text{if } P(I|\Phi_i) \geq 0.5 \\ -A_{EER} & \text{otherwise} \end{cases}$$

equation: 17

The corresponding "dynamic" weighting scheme would be to weight each vote by the differential speaker probability computed by the classifier:

$$D_L(\Phi_i) = P(I|\Phi_i) - P(\neg I|\Phi_i)$$

equation: 18

Even if the probability estimate $P(I|\Phi_i)$ is somewhat crude, the advantage here is that the weight is dependent on the actual phoneme observations.

Expert Grouping

Phonemes can be divided into different groups, e.g. nasals, fricatives, plosives, vowels etc. Two experts specialising on, say, two nasal phonemes are intuitively likely to show correlations in the voting domain, whereas two experts specialising of different phonemes, say, respectively a nasal and a fricative phoneme, are less likely to show correlations. It may therefore be reasonable to divide the experts into groups representing different phoneme classes. A speaker verification score, $D_{C;L}$ can then be computed for each phoneme group*(C)*:

$$D_{C,L}(\Phi_i) = \begin{cases} 1 & \text{if } \sum_{i=1}^{\#C} P(I|\Phi_i) \geq t_C \\ -1 & \text{otherwise} \end{cases}$$

equation: 19 where #C denotes the number of phonemes in group C. Equation 19 effectively defines a new set of experts. The global verification decision can then be made as before by combining the votes from the group experts, rather than from the "phoneme" experts. In principle this decision strategy can be extended, to include several layers of experts, where the experts at the lowest level represent different individual phonemes and experts at the upper levels represent broader sound classes (nasals, vowels, fricatives, etc.).

Modelling Expert Votes

An attractive way of combining N expert votes is to train a network (RBF or MLP) to learn the empirically best combination strategy (Wolpert 1992). This way both the accuracy of the individual experts and the correlation between different expert votes can be taken into account directly. When this approach is followed, all that has taken place up to the point where the expert votes must be combined is essentially regarded as feature extraction; the feature vectors are here decision vectors:

$$\vec{D}_L(\vec{\Phi}^{(r)}) = \left(D_L(\Phi_1^{(r_1)}), \ldots, D_L(\Phi_N^{(r_N)})\right)^T$$

equation: 20

There are, however, two problems with this approach.

- The first problem is that the "super" network, which combines local expert votes, can not be trained on decision vectors produced simply by evaluating the local experts on the data on which they were trained -the experts are likely to be over trained and their - training data votes- are therefore too "optimistic". Hence, either additional training data must be provided or alternatively the super network must be speaker independent.

- The second problem is that here the local expert votes represent different phonemes and the phonetic make of different test utterances can vary a lot, and this makes it impossible to train a network that optimally combines the votes resulting from particular test utterances.

Given a limited number of training utterances, it is of course possible to simulate a much larger number of decision vectors by combining relevant expert decisions extracted from different training utterances. However, the number of possible phoneme combinations that can occur is still very large. Suppose, for instance, that in any given utterance, exactly 15 different phonemes out of 30 possible will be represented. Then up to $$\binom{30}{15} = \frac{30!}{15!(30-15)!} \approx 1.6 \cdot 10^8$$

different vote combinations would have to be considered. This calculation ignores that votes may be based on more than one phoneme observation – and hence be more reliable - and that the actual number of different phonemes may be more or may be less than 15.

A possible solution to this dilemma is to make the super classifier utterance specific, i.e. to postpone the training until the moment it is decided which prompting text to issue next - or even more convenient: until a phoneme segmentation has been computed for the actual speech utterance. The super classifier may in this case be a simple perceptron, and the training is therefore not in itself a serious Computational problem. Figure 2 shows an example of this.

Alternatively - in order to avoid the iterative perceptron training algorithm - Fisher's linear discriminant function can be used for learning the individual expert weights.

In summary, this example discusses how local speaker probabilities estimated from individual phoneme observations (which essentially is an object can be combined in order to produce global speaker verification decisions. Successful combination schemes must take into account that on the one hand some specific phonemes are more informative than others, and on the other hand that different phonemes to some extent provide complimentary information about a speaker.

The main difficulty faced when deciding how to weight each local decision is that -unless the prompting texts given to speakers are seriously constrained - the total number of different phoneme combinations that can occur in test utterances is extremely large. Hence, these weights can not easily be computed a priori.

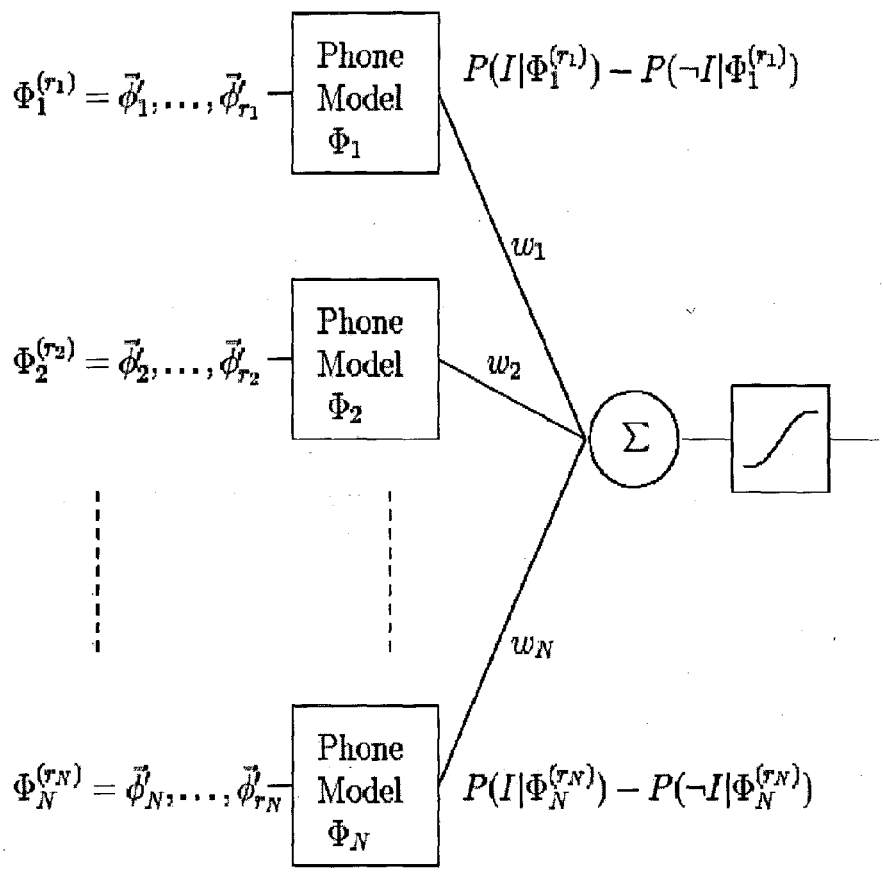
Figure: 2 A super classifier
The classifier takes the differential speaker probabilities from the individual phoneme models as input and combines them into a global score:
$$P(I|\Phi_1^{(r_1)},\ldots,\Phi_N^{(r_N)}) - P(\neg I|\Phi_1^{(r_1)},\ldots,\Phi_N^{(r_N)})$$

We claim:

1. A system of secure network connectivity between one or more users and at least one network server, wherein said secure network connectivity is user-centric and supports pervasive security, wherein said user-centric refers to that the system secures the one or more users instead of one or more devices employed by the users to connect to the network server, and wherein said pervasive security is security on demand, using one or more connecting devices, said system comprising:
- at least one intelligent data carrier, issued to said one or more users, wherein said intelligent data carrier comprises at least (i) one memory, capable of storing digital information, (ii) one input-output apparatus, capable of inputting and outputting digital information, and (iii) one processor, capable of processing the digital information stored in said memory and connecting to a computer device thereby transmitting the digital information via said input-output apparatus, and wherein said intelligent data carrier is capable of establishing the identities of said one or more users through an authentication and encryption scheme; and
- a dynamic datagram switch for dynamic allocation and swapping of datagrams for a multiplicity of applications in service to said one or more users, wherein said dynamic datagram switch comprises a datagram schema and a parser, wherein said datagram schema comprises two or more datagrams, belonging to one or more datagram types, wherein each datagram type comprises a plurality of functions, and wherein said parser is capable of parsing the one or more datagram types.

2. The system of claim 1, wherein said intelligent data carrier is mobile.

3. The system of claim 1, wherein said intelligent data carrier is selected from the group consisting of USB key, Compact Flash, Smart Media, Compact Disk, DVD, PDA, firewire device, and token device.

4. The system of claim 1, wherein said authentication and encryption scheme comprises the following sequential steps:
- (a) a request being caused to forward from the intelligent data carrier to the network server that the intelligent data carrier be authenticated;
- (b) the network server presenting to the intelligent data carrier a plurality of authentication methods;
- (c) the intelligent data carrier selecting one authentication method from said plurality of authentication methods through an event;
- (d) the network server sending the intelligent data carrier a demand, based on said selected method, for authentication data from the intelligent data carrier;
- (e) the network server transforming said authentication data received from the intelligent data carrier into one or more data authentication objects, wherein each of said one or more data authentication objects is a data vector object, capable of being analyzed using one or more classifiers;
- (f) the network server analyzing said data authentication objects, according to said one or more classifiers, thereby determining a result of the authentication; and
- (g) the network server sending said result to the intelligent data carrier, indicating a successful or failed authentication attempt.

5. The system of claim 4, wherein said event in step (c) comprises at least one of a click of a mouse, a touch on a screen, a keystroke, an utterance, and any suitable notification means.

6. The system of claim 4, wherein said demand in step (d) comprises at least one of a pseudo random and a true random password, wherein a pseudo random password is generated based on a mathematically pre-calculated list, and wherein a true random password is generated by sampling and processing a source of entropy outside of the system.

7. The system of claim 6, wherein the pseudo random or the true random password are generated with at least one seed from an indeterministic source, wherein said indeterministic source is a source that is not capable of being predicted from the parameters surrounding the network server or the intelligent data carrier.

8. The system of claim 6, wherein the pseudo random or the true random password are generated with one or more random generators and one or more independent seeds.

9. The system of claim 4, wherein said analyzing in step (f) comprises one or more analysis rules.

10. The system of claim 9, wherein said one or more analysis rules comprises classification according to the one or more classifiers of step (e).

11. The system of claim 10, wherein a randomization in data vector objects is performed in connection with the one or more classifiers.

12. The system of claim 10, wherein said classification comprises speaker verification, wherein the data object vector involves two classes, the target speaker and the impostor, wherein each speaker is characterized by a probability density function, and wherein the determining in step (f) is a binary decision problem.

13. The system of claim 4, wherein said one or more classifiers in step (e) comprises a super classifier, wherein more than one data vector objects exist for event level authentication, and wherein the determining in step (f) is based on at least one of superior and random sum computed from the data vector objects.

14. The system of claim 13, wherein said super classifier is used for physical biometrics, comprising at least one of voice recognition, fingerprints, handprints, blood vessel patterns, DNA tests, retinal or iris scan, and face recognition.

15. The system of claim 13, wherein said super classifier is used for performance biometrics, comprising habits or patterns of individual behaviors.

16. The system of claim 4, wherein said determining in step (f) is performed by computing at least one of the sum, superiority, and probability from said one or more data authentication objects, based on the one or more classifiers of step (e).

17. The system of claim 1, wherein said authentication and encryption scheme comprises symmetrical and asymmetrical multi-cipher encryption.

18. The system of claim 17, wherein said encryption uses at least one of output feedback, cipher feedback, cipher forwarding, and cipher block chaining.

19. The system of claim 1, wherein said authentication and encryption scheme implements Secure Key Exchange.

20. The system of claim 19, wherein the Secure Key Exchange employs a public key system.

21. The system of claim 19, wherein the Secure Key Exchange employs Elliptic Curve Cryptosystem private keys.

22. The system of claim 19, wherein the encryption is based on Advanced Encryption Standard Rijndael.

23. The system of claim 1, wherein said multiplicity of applications is selected from the group consisting of window-based remote terminal server applications, applications on 3270/5250 terminal emulators for mainframe, directly embedded applications, digital video, audio, and text based communications, and wherein the directly embedded applications are selected from the group consisting of database applications, data analysis tools, Customer Relation Management tools, and Enterprise Resource Planning packages, and any combination thereof.

24. The system of claim 1, wherein said datagram schema comprises at least one major datagram type and within said one major datagram type, at least one minor datagram type.

25. The system of claim 1, wherein the parser is capable of parsing a matrix of datagram types, said matrix comprising a first multiplicity of major datagram types and in each major datagram type of said first multiplicity, a second multiplicity of minor datagram types.

26. The system of claim 25, wherein the first multiplicity is 256 and the second multiplicity is 256.

27. The system of claim 24, wherein the major datagram type is selected from the group consisting of (i) a server messages and connection control datagram, capable of authenticating and controlling user connections, (ii) a content datagram, capable of managing the transmission of the content data, (iii) a broadcast datagram, capable of managing the real-time point-to-point, point-to-multipoint, and multipoint-to-multipoint data transmission, and (iv) a connection proxy datagram, capable of passing proxy data between the network server and the intelligent data carrier.

28. The system of claim 27, wherein the server messages and connection control datagram comprises minor datagram types selected from the group consisting of: (i) an authentication request datagram, capable of initiating an authentication request, (ii) an authentication reply datagram, capable of sending a response upon a request of authentication, and (iii) an authentication result datagram, capable of sending the result of an authentication session.

29. The system of claim 27, wherein the content datagram comprises minor datagram types selected from the group consisting of: (i) a normal content datagram, capable of transmitting the content data, (ii) a remote logging datagram, capable of communicating with the network server and establishing a login session, and (iii) a remote data collector datagram, capable of transmitting data from a remote connection.

30. The system of claim 29, wherein the content datagram further comprises minor datagram types selected from the group consisting of: (iv) a content approval request datagram, capable of requesting verification of the content data transmitted, and (v) a content approval reply datagram, capable of responding to a request of verification of the content data transmitted.

31. The system of claim 27, wherein the connection proxy datagram comprises minor datagram types selected from the group consisting of: (i) proxy data to server, capable of passing proxy data to the network server from the intelligent data carrier, and (ii) proxy data from server, capable of passing the proxy data from the network server to the intelligent data carrier.

32. The system of claim 24, wherein each datagram in the datagram schema has a generic layout comprising:
(A) the header fields for (i) a major datagram type, (ii) a minor datagram type, (iii) a datagram length, and (iv) a datagram checksum, and
(B) a datagram payload, carrying the content data in transmission.

33. The system of claim 32, wherein the datagram comprises one or more additional header fields.

34. The system of claim 32, wherein the major datagram type is an instant message type and the minor datagram type is selected from the group consisting of file transmission type, audio-video transmission type, instant mail message type, and remote data collection type.

35. The system of claim 32, wherein each datagram in the datagram schema is carried within a TCP packet.

36. The system of claim 35, wherein the generic layout of the datagram follows a TCP header.

37. The system of claim 1, further comprising one or more radar connectors capable of monitoring and controlling network connections.

38. The system of claim 37, wherein each of said radar connectors is further capable of detecting the lost connection and initializing contact to the network server thereby reestablishing the connection.

39. The system of claim 37 or 38, wherein each of the network server and the intelligent data carrier is connected to one of said radar connectors.

40. The system of claim 37, further comprising one or more injectors capable of connecting one or more existing networks to the network server and transmitting data between said existing network and the intelligent data carrier via the network server, wherein said existing network is wired or wireless, comprising one or more digital devices.

41. The system of claim 40, wherein said digital device is at least one of a computer, a Personal Digital Assistant (PDA), a digital mobile phone, a digital audio-video player, and a digital camera.

42. The system of claim 40, wherein the one or more injectors is each connected to a radar connector.

43. A client-server communication system, comprising:
at least one server; and
at least one client, wherein each client is an intelligent data carrier, comprising at least (i) one memory, capable of storing digital information, (ii) one input-output apparatus, capable of inputting and outputting digital information, and (iii) one processor, capable of processing the digital information stored in said memory and connecting to a computer device thereby transmitting digital information via said input-output apparatus, wherein said intelligent data carrier is capable of establishing the identities of one or more users through an authentication and encryption scheme for secure data transmission between said server and said client, wherein said server further comprises a dynamic datagram switch for dynamic allocation and swapping of datagrams for a multiplicity of applications in service to said one or more users, wherein said dynamic datagram switch comprises a datagram schema and a parser, wherein said datagram schema comprises two or more datagrams, belonging to one or more datagram types, wherein each datagram type comprises a plurality of functions, and wherein said parser is capable of parsing the one or more datagram types.

44. The client-server communication system of claim 43, wherein said secure data transmission is characterized by user centric and pervasive security, wherein said user-centric security refers to securing one or more users instead of one or more devices employed by the users to connect to the network server, and wherein the pervasive security is security on demand, using one or more connecting devices.

45. The client-server communication system of claim 43 or 44, wherein the intelligent data carrier is mobile.

46. The client-server communication system of claim 43 or 44, wherein said intelligent data carrier is selected from the group consisting of USB key, Compact Flash, Smart Media, Compact Disk, DVD, PDA, firewire device, and token device.

47. The client-server communication system of claim 43 or 44, further comprising one or more injectors capable of connecting the server to one or more existing networks and transmitting data between said existing networks and the client via the server, wherein said existing network is wired or wireless, comprising one or more digital devices.

48. The client-server communication system of claim 47, wherein said digital device is at least one of a computer, a Personal Digital Assistant (PDA), a mobile phone, a digital audio-video player, and a digital camera.

49. The client-server communication system of claim 47, wherein each server, client, and injector is further connected to a radar connector, capable of monitoring and controlling network connections.

50. The client-server communication system of claim 49, wherein said radar connector is further capable of detecting a lost connection and initializing contact to the network server thereby reestablishing the connection.

51. The client-server communication system of claim 43 or 44, wherein the server further comprises an encrypted virtual file system, capable of secure storage of data in a virtual file system for each client.

52. An intelligent data carrier, comprising at least (i) one memory, capable of storing digital information, (ii) one input-output apparatus, capable of inputting and outputting digital information, and (iii) one processor, capable of processing the digital information stored in said memory and connecting to a computer device thereby transmitting digital information via said input-output apparatus, wherein said intelligent data carrier is capable of establishing the identities of one or more users through an authentication and encryption scheme for secure data transmission in a network, wherein said intelligent data carrier is capable of communicating with a server in the network, said server comprising a dynamic datagram switch for dynamic allocation and swapping of datagrams, wherein said dynamic datagram switch comprises a datagram schema and a parser, wherein said datagram schema comprises two or more datagrams, belonging to one or more datagram types, wherein each datagram type comprises a plurality of functions, and wherein said parser is capable of parsing the one or more datagram types.

53. The intelligent data carrier of claim 52, wherein said secure data transmission is characterized by user centric and pervasive security, wherein said user-centric security refers to securing one or more users instead of one or more devices employed by the users to connect to the network server, and wherein the pervasive security is security on demand, using one or more devices.

54. The intelligent data carrier of claim 52 or 53, said intelligent data carrier being mobile.

55. The intelligent data carrier of claim 52 or 53, said intelligent data carrier selected from the group consisting of USB key, Compact Flash, Smart Media, Compact Disk, DVD, PDA, firewire device, and token device.

56. A method for establishing user-centric, pervasive network security, wherein said user-centric refers to securing one or more users instead of one or more devices employed by the users to connect to a network server, and wherein the pervasive security is security on demand, using one or more connecting devices, said method comprising:

issuing to each of said one or more users an intelligent data carrier, wherein said intelligent data carrier comprises at least (i) one memory, capable of storing digital information, (ii) one input-output apparatus, capable of inputting and outputting digital information, and (iii) one processor, capable of processing the digital information stored in said memory and connecting to a computer device thereby transmitting the digital information via said input-output apparatus, and wherein said intelligent data carrier is capable of establishing the identities of said one or more users through an authentication and encryption scheme; and providing a dynamic datagram switch for dynamic allocation and swapping of datagrams for a multiplicity of applications in service to said one or more users, wherein said dynamic datagram switch comprises a datagram schema and a parser, wherein said datagram schema comprises two or more datagrams, belonging to one or more datagram types, wherein each datagram type comprises a plurality of functions, and wherein said parser is capable of parsing the one or more datagram types.

57. The method of claim 56, wherein said intelligent data carrier is mobile.

58. The method of claim 57, wherein said intelligent data carrier is selected from the group consisting of USB key, Compact Flash, Smart Media, Compact Disk, DVD, PDA, firewire device, and token device.

59. The method of claim 56, wherein said authentication and encryption scheme comprises the following sequential steps:

(a) a request being caused to forward from the intelligent data carrier to the network server that the intelligent data carrier be authenticated;

(b) the network server presenting to the intelligent data carrier a plurality of authentication methods;

(c) the intelligent data carrier selecting one authentication method from said plurality through an event;

(d) the network server sending the intelligent data carrier a demand, based on said selected method, for authentication data from the intelligent data carrier;

(e) the network server transforming said authentication data received from the intelligent data carrier into one or more data authentication objects, wherein each of said one or more data authentication objects is a data vector object, capable of being analyzed using one or more classifiers;

(f) the network server analyzing said data authentication objects, according to said one or more classifiers, thereby determining a result of the authentication; and (g) the network server sending said result to the intelligent data carrier, indicating a successful or failed authentication attempt.

60. The method of claim 59, wherein said event in step (c) comprises at least one of a click of a mouse, a touch on a screen, a keystroke, an utterance, and any suitable notification means.

61. The method of claim 59, wherein said demand in step (d) comprises at least one of a pseudo random and true random password, wherein a pseudo random password is generated based on a mathematically pre-calculated list, and wherein a true random password is generated by sampling and processing a source of entropy outside of the system.

62. The method of claim 61, wherein the pseudo random or the true random password are generated with at least one seed from an indeterministic source, wherein said indeterministic source is a source that is not capable of being predicted from the parameters surrounding the network server or the intelligent data carrier.

63. The method of claim 61, wherein the pseudo random or the true random password are generated with one or more random generators and one or more independent seeds.

64. The method of claim 59, wherein said analyzing in step (f) comprises one or more analysis rules.

65. The method of claim 64, wherein said one or more analysis rules comprises classification according to the one or more classifiers of step (e).

66. The method of claim 65, wherein randomization in data vector objects is performed in connection with the one or more classifiers.

67. The method of claim 65, wherein said classification comprises speaker verification, wherein the data object vector involves two classes, the target speaker and the impostor, wherein each speaker is characterized by a probability density function, and wherein the determining in step (f) is a binary decision problem.

68. The method of claim 59, wherein said one or more classifiers in step (e) comprises a super classifier, wherein more than one data vector objects exist for event level authentication, and wherein the determining in step (f) is based on at least one of superior and random sum computed from the data vector objects.

69. The method of claim 68, wherein said super classifier is used for physical biometrics, selected from the group consisting of: voice recognition, fingerprints, handprints, blood vessel patterns, DNA tests, retinal or iris scan, and face recognition.

70. The method of claim 68, wherein said super classifier is used for performance biometrics, comprising habits or patterns of individual behaviors.

71. The method of claim 59, wherein said determining of step (f) is performed by computing at least the sum, superiority, and probability from said one or more data authentication objects, based on the one or more classifiers of step (e).

72. The method of claim 56, wherein said authentication and encryption scheme comprises symmetrical and asymmetrical multi-cipher encryption.

73. The method of claim 72, wherein said encryption uses at least one of output feedback, cipher feedback, cipher forwarding, and cipher block chaining.

74. The method of claim 56, wherein said authentication and encryption scheme uses Secure Key Exchange and encryption.

75. The method of claim 74, wherein the Secure Key Exchange employs a public key system.

76. The method of claim 74, wherein the Secure Key Exchange employs Elliptic Curve Cryptosystem private keys.

77. The method of claim 74, wherein the encryption is based on Advanced Encryption Standard Rijndael.

78. The method of claim 56, wherein said multiplicity of applications is selected from the group consisting of window-based remote terminal server applications, applications on 3270/5250 terminal emulators for mainframe, directly embedded applications, digital video, audio, and text based communications, and wherein the directly embedded applications are selected from the group consisting of database applications, data analysis tools, Customer Relation Management tools, and Enterprise Resource Planning packages, and any combination thereof.

79. The method of claim 56, wherein said datagram schema comprises at least one major datagram type and within said one major datagram type, at least one minor datagram type.

80. The method of claim 79, wherein the parser is capable of parsing a matrix of datagram types, said matrix comprising a first multiplicity of major datagram types and in each major datagram type of said first multiplicity, a second multiplicity of minor datagram types.

81. The method of claim 80, wherein the first multiplicity is 256 and the second multiplicity is 256.

82. The method of claim 79, wherein the major datagram type is selected from the group consisting of (i) a server messages and connection control datagram, capable of authenticating and controlling user connections, (ii) a content datagram, capable of managing the transmission of the content data, (iii) a broadcast datagram, capable of managing the real-time point-to-point, point-to-multipoint, and multipoint-to-multipoint data transmission, and (iv) a connection proxy datagram, capable of passing proxy data between the network server and the intelligent data carrier.

83. The method of claim 80, wherein each datagram in the datagram schema has a generic layout comprising (A) the header fields for (i) a major datagram type, (ii) a minor datagram type, (iii) a datagram length, and (iv) a datagram checksum, and (B) a datagram payload, carrying the content data in transmission.

84. The method of claim 83, wherein the datagram comprises one or more additional header fields.

85. The method of claim 79 or 83, wherein each datagram in the datagram schema is carried within a TCP packet.

86. The method of claim 85, wherein the generic layout of the datagram follows a TCP header.

87. The method of claim 56, further comprising providing one or more radar connector, capable of monitoring and controlling network connections, wherein the network server and the intelligent data carrier is each connected to one of said one or more radar connectors.

88. The method of claim 87, wherein said radar connector is further capable of detecting a lost connection and initializing contact to the network server thereby reestablishing the connection.

89. The method of claim 56 or 87, further comprising providing one or more injectors capable of connecting one or more existing networks to the network server and transmitting data between said existing network and the intelligent data carrier via the network server, wherein said existing network is wired or wireless, comprising one or more digital devices.

90. The method of claim 89, wherein each of said digital devices is any one of: a computer, a Personal Digital Assistant (PDA), a digital mobile phone, a digital audio-video player, or a digital camera.

91. The method of claim 89, wherein said one or more injector each is connected to a radar connector.

92. A method for targeted delivering of one or more applications to an authorized user, comprising:
    issuing to said user an intelligent data carrier, wherein said intelligent data carrier comprises at least (i) one memory, capable of storing digital information, (ii) one input-output apparatus, capable of inputting and outputting digital information, and (iii) one processor, capable of processing the digital information stored in said memory and connecting to a computer device thereby transmitting the digital information via said input-output apparatus, wherein said intelligent data carrier is capable of establishing the identity of said user through an authentication and encryption scheme; and
    providing a computer device connecting to a network on which a network server sits, wherein the intelligent data carrier is capable of docking to said connecting device and being authenticated by said network server based on said authentication and encryption scheme, wherein said one or more applications are capable of being launched off said intelligent data carrier once the user is successfully authenticated, wherein said network server further comprises a dynamic datagram switch for dynamic allocation and swapping of datagrams for said one or more applications, wherein said dynamic datagram switch comprises a datagram schema and a parser, wherein said datagram schema comprises two or more datagrams, belonging to one or more datagram types, wherein each datagram type comprises a plurality of functions, and wherein said parser is capable of parsing the one or more datagram types.

93. The method of claim 92, wherein said one or more applications are preloaded on the intelligent data carrier or installed on said network server.

94. The method of claim 92, wherein said computer device is connected to the network via wired or wireless means.

95. The method of claim 92, wherein said computer device is at least one of a desktop or laptop computer, a personal digital assistant (PDA), a digital mobile phone, a digital TV, and any network-enabled digital audio-video device.

96. The method of claim 92, wherein said one or more applications are selected from the group consisting of database applications, data analysis tools, Customer Relation Management tools, Enterprise Resource Planning packages, window-based remote terminal server applications, applications on 3270/5250 terminal emulators for mainframe, digital video, audio, and text based communications, and any combination thereof.

97. The method of claim 92, wherein said intelligent data carrier is mobile.

98. The method of claim 92, wherein said intelligent data carrier is selected from the group consisting of USB key, Compact Flash, Smart Media, Compact Disk, DVD, PDA, firewire device, and token device.

99. The method of claim 92, wherein said authentication and encryption scheme comprises the following sequential steps:
  (a) a request being caused to forward from the intelligent data carrier to the network server that the intelligent data carrier be authenticated;
  (b) the network server presenting to the intelligent data carrier a plurality of authentication methods;
  (c) the intelligent data carrier selecting one authentication method from said plurality through an event;
  (d) the network server sending the intelligent data carrier a demand, based on said selected method, for authentication data from the intelligent data carrier;
  (e) the network server transforming said authentication data received from the intelligent data carrier into one or more data authentication objects, wherein each of said one or more data authentication objects is a data vector object, capable of being analyzed using one or more classifiers;
  (f) the network server analyzing said data authentication object, according to said one or more classifiers, thereby determining the result of the authentication; and
  (g) the network server sending said result to the intelligent data carrier, indicating a successful or failed authentication attempt.

100. The method of claim 99, wherein said event in step (c) comprises at least a click of a mouse, a touch on a screen, a keystroke, an utterance, and any suitable notification means.

101. The method of claim 100, wherein said demand in step (e) comprises at least a pseudo random and true random password, wherein a pseudo random password is generated based on a mathematically pre-calculated list, and wherein a true random password is generated by sampling and processing a source of entropy outside of the system.

102. A system of secure network connectivity between one or more users and at least one network server, wherein said secure network connectivity is user-centric and supports pervasive security, wherein said user-centric refers to that the system secures the one or more users instead of one or more devices employed by the users to connect to the network server, and wherein said pervasive security is security on demand, using one or more connecting devices, said system comprising at least one intelligent data carrier, issued to said one or more users,
  wherein said intelligent data carrier comprises at least (i) one memory, capable of storing digital information, (ii) one input-output apparatus, capable of inputting and outputting digital information, and (iii) one processor, capable of processing the digital information stored in said memory and connecting to a computer device thereby transmitting the digital information via said input-output apparatus,
  wherein said intelligent data carrier is capable of establishing the identities of said one or more users through an authentication and encryption scheme and supporting a multiplicity of applications in service to said one or more users, and
  wherein said authentication and encryption scheme comprises the following sequential steps: (a) a request being caused to forward from the intelligent data carrier to the network server that the intelligent data carrier be authenticated, (b) the network server presenting to the intelligent data carrier a plurality of authentication methods, (c) the intelligent data carrier selecting one authentication method from said plurality through an event, (d) the network server sending the intelligent data carrier a demand, based on said selected method, for authentication data from the intelligent data carrier, (e) the network server transforming said authentication data received from the intelligent data carrier into one or more data authentication object, wherein each said data authentication object is a data vector object, capable of being analyzed using one or more classifiers, (f) the network server analyzing said data authentication object, according to said one or more classifiers, thereby determining the result of the authentication, and (g) the network server sending said result to the intelligent data carrier, indicating a successful or failed authentication attempt.

103. A method for establishing user-centric, pervasive network security, wherein said user-centric refers to securing one or more users instead of one or more devices employed by the users to connect to a network server, and wherein the pervasive security is security on demand, using one or more connecting devices, said method comprising issuing to each of said one or more users an intelligent data carrier,
  wherein said intelligent data carrier comprises at least (i) one memory, capable of storing digital information, (ii) one input-output apparatus, capable of inputting and outputting digital information, and (iii) one processor, capable of processing the digital information stored in said memory and connecting to a computer device thereby transmitting the digital information via said input-output apparatus, wherein said intelligent data carrier is capable of establishing the identities of said one or more users through an authentication and encryption scheme and supporting a multiplicity of applications in service to said one or more users, and wherein said authentication and encryption scheme comprises the following sequential steps: (a) a request being caused to forward from the intelligent data carrier to the network server that the intelligent data carrier be authenticated, (b) the network server presenting to the intelligent data carrier a plurality of authentication methods, (c) the intelligent data carrier selecting one authentication method from said plurality of authentication methods through an event, (d) the network server sending the intelligent data carrier a demand, based on said selected method, for authentication data from the intelligent data carrier, (e) the network server transforming said authentication data received from the intelligent data carrier into one or more data authentication objects, wherein each of said one or more data authentication objects is a data vector object, capable of being analyzed using one or more classifiers, (f) the network server analyzing said data authentication object, according to said one or more classifiers, thereby determining the result of the authentication, and (g) the network server sending said result to the intelligent data carrier, indicating a successful or failed authentication attempt.

104. A client-server communication system, comprising:
at least one server; and
at least one client, wherein each client is an intelligent data carrier, comprising at least (i) one memory, capable of storing digital information, (ii) one input-output apparatus, capable of inputting and outputting digital information, and (iii) one processor, capable of processing the digital information stored in said memory and connecting to a computer device thereby transmitting digital information via said input-output apparatus,
wherein said intelligent data carrier is capable of establishing identities of one or more users through an authentication and encryption scheme for secure data transmission between said server and said client, and wherein said authentication and encryption scheme comprises the following sequential steps: (a) a request being caused to forward from the intelligent data carrier to the network server that the intelligent data carrier be authenticated, (b) the network server presenting to the intelligent data carrier a plurality of authentication methods, (c) the intelligent data carrier selecting one authentication method from said plurality through an event, (d) the network server sending the intelligent data carrier a demand, based on said selected method, for authentication data from the intelligent data carrier, (e) the network server transforming said authentication data received from the intelligent data carrier into one or more data authentication objects, wherein each of said one or more data authentication objects is a data vector object, capable of being analyzed using one or more classifiers, (f) the network server analyzing at least one of said data authentication objects, according to said one or more classifiers, thereby determining a result of the authentication, and (g) the network server sending said result to the intelligent data carrier, indicating a successful or failed authentication attempt.

105. The system of claim 1, wherein said dynamic allocation and swapping is performed in real time.

106. The system of claim 1, wherein said dynamic allocation and swapping comprises the use of memory pointers of two or more datagrams.

107. The method of claim 56, wherein said dynamic allocation and swapping is performed in real time.

108. The method of claim 56, wherein said dynamic allocation and swapping comprises the use of memory pointers of two or more datagrams.

* * * * *